(12) United States Patent
Asano

(10) Patent No.: US 7,757,082 B2
(45) Date of Patent: *Jul. 13, 2010

(54) EFFICIENT REVOCATION OF RECEIVERS

(75) Inventor: Tomoyuki Asano, Kanagawa (JP)

(73) Assignee: Sony Corporation, Tokyo ( * ) Notice: Subject to any disclaimer, the term of this patent is extended or adjusted under 35 U.S.C. 154(b) by 159 days.

This patent is subject to a terminal disclaimer.

(21) Appl. No.: 11/999,095

(22) Filed: Dec. 4, 2007

(65) Prior Publication Data

US 2008/0152134 A1 Jun. 26, 2008

Related U.S. Application Data

(63) Continuation of application No. 10/292,210, filed on Nov. 12, 2002, now Pat. No. 7,340,603.

(60) Provisional application No. 60/353,640, filed on Jan. 30, 2002, provisional application No. 60/381,299, filed on May 15, 2002.

(51) Int. Cl.
*H04L 9/14* (2006.01)
*H04K 1/00* (2006.01)

(52) U.S. Cl. ..................... 713/163; 380/45; 380/278

(58) Field of Classification Search ................. None
See application file for complete search history.

(56) References Cited

U.S. PATENT DOCUMENTS

| 5,592,552 A | 1/1997 | Fiat |
| 5,663,896 A | 9/1997 | Aucsmith |
| 5,712,800 A | 1/1998 | Aucsmith |
| 5,796,839 A | 8/1998 | Ishiguro |
| 5,930,805 A | 7/1999 | Marquis |
| 6,049,878 A | 4/2000 | Caronni et al. |
| 6,131,160 A | 10/2000 | Dillon et al. |

(Continued)

FOREIGN PATENT DOCUMENTS

JP 11/187013 7/1999

(Continued)

OTHER PUBLICATIONS

S.G. Akl and P.D. Taylor, "Cryptographic Solution to a Problem of Access Control in a Hierarchy," ACM Transactions on Computer Systems, vol. 1, No. 3, 1983, pp. 239-248.

(Continued)

*Primary Examiner*—Christopher A Revak
(74) *Attorney, Agent, or Firm*—Frommer Lawrence & Haug LLP; William S. Frommer; Thomas F. Presson

(57) ABSTRACT

Methods and apparatus for efficient revocation of receivers. In one implementation, a method of broadcast encryption includes: assigning a respective master key to each of a plurality of receivers, where each master key can be used to derive two or more of a plurality of sub keys; revoking one or more receivers, leaving one or more unrevoked receivers; for each master key of an unrevoked receiver, selecting the sub key that can be derived by that master key and derived by the most other master keys but not derived by a master key of any of the one or more revoked receivers; for each selected sub key, encrypting one ciphertext using that selected sub key; and sending the encrypted ciphertexts to the plurality of receivers.

14 Claims, 34 Drawing Sheets

U.S. PATENT DOCUMENTS

| | | | |
|---|---|---|---|
| 6,222,923 B1 | 4/2001 | Schwenk | |
| 6,295,361 B1 | 9/2001 | Kadansky et al. | |
| 6,347,145 B2 | 2/2002 | Kato et al. | |
| 6,389,136 B1 | 5/2002 | Young et al. | |
| 6,397,329 B1 | 5/2002 | Aiello et al. | |
| 6,735,313 B1 | 5/2004 | Bleichenbacher et al. | |
| 6,850,914 B1 | 2/2005 | Harada et al. | |
| 6,911,974 B2 | 6/2005 | Asano et al. | |
| 7,007,162 B1 | 2/2006 | Lotspiech | |
| 7,043,024 B1 | 5/2006 | Dinsmore et al. | |
| 7,093,128 B2 | 8/2006 | Asano et al. | |
| 7,143,289 B2 | 11/2006 | Denning et al. | |
| 7,167,564 B2 | 1/2007 | Asano et al. | |
| 7,224,804 B2* | 5/2007 | Ishiguro et al. | 380/279 |
| 7,336,791 B2* | 2/2008 | Ishiguro | 380/278 |
| 7,340,603 B2* | 3/2008 | Asano | 713/163 |
| 7,386,722 B2* | 6/2008 | Umezawa et al. | 713/156 |
| 7,487,349 B2* | 2/2009 | Ksontini et al. | 713/163 |
| 2001/0053222 A1 | 12/2001 | Wakao et al. | |
| 2002/0007454 A1* | 1/2002 | Tarpenning et al. | 713/156 |
| 2002/0111925 A1 | 8/2002 | Kambayashi | |
| 2002/0147906 A1 | 10/2002 | Lotspiech et al. | |
| 2002/0150250 A1 | 10/2002 | Kitaya et al. | |
| 2002/0154782 A1 | 10/2002 | Chow et al. | |
| 2003/0016827 A1 | 1/2003 | Asano et al. | |
| 2003/0076958 A1 | 4/2003 | Ishiguro et al. | |
| 2003/0185396 A1 | 10/2003 | Asano et al. | |
| 2005/0228809 A1* | 10/2005 | Asano et al. | 707/100 |
| 2007/0098177 A1 | 5/2007 | Asano et al. | |
| 2007/0124603 A1* | 5/2007 | Yamamichi et al. | 713/194 |
| 2007/0180497 A1* | 8/2007 | Popescu et al. | 726/4 |
| 2008/0205652 A1* | 8/2008 | Nakano et al. | 380/277 |
| 2009/0019468 A1* | 1/2009 | Ganesan et al. | 725/25 |

FOREIGN PATENT DOCUMENTS

| | | |
|---|---|---|
| WO | WO 01/03364 | 1/2001 |
| WO | WO 01/03365 | 1/2001 |

OTHER PUBLICATIONS

J. Anzai, N. Matsuxaki and T. Matsumoto, A Quick Group Key Distibution Scheme with Entity Revocation,: Advances in Cryptology—Asiacrypt '99, Lecture Notes in Compute Science 1716, Springer, 1999, pp. 333-347.

S. Berkovits, "How to Broadcast a Secret," Advances in Cryptology—Eurocrypt '91, Lecture Notes in Computer Science 547, Springer, 1991, pp. 535-541.

R. Canetti, T. Malkin and K. Nissim, "Efficient Communication-Storage Tradeoffs for Multicast Encryption," Advances in Cryptology—Eurocrypt '99, Lecture Notes in Computer Science 1592, Springer, 1999, pp. 459-474.

G.C. Chick and S.E. Tavares, "Flexible Access Control with Master Keys," Advances in Cryptology—Crypto '89, Lecture Notes in Computer Science 435, Springer, 1990, pp. 316-322.

"Content Protection for Pre-recorded Media Specification," available from http://www.4centity.com/tech/cprm/.

"Content Protection for Recordable Media Specification," available from http://www.4centity.com/tech/cprm/.

W. Diffie and M. Hellman, "New Directions in Cryptography," IEEE Transactions on Information Theory, IT-22 (6), 1976.

A. Fiat and M. Naor, "Broadcast Encryption," Advances in Cryptology—Crypto '93, Lecture Notes in computer Science 773, Springer, 1994, pp. 480-491.

D.E. Knuth, "The Art of Computer Programming," vol. 2, Addison-Wesley, 1981.

Y. Kim, A. Perrig and G. Tsudik, "Simple and Fault-Tolerant Key Agreement for Dynamic Collaborative Groups," Proceedings of ACM Conference on Computer and Communication Security, CCS 2000.

R. Kumar, S. Rajagopalan and A. Sahai, "Coding Constructions for Blacklisting Problems without Computational Assumptions," Advances in Cryptology—Crypto '99, Lecture Notes in Computer Science 1666, Springer, 1999, pp. 609-623.

M. Luby and J. Staddon, "Combinatorial Bounds for Broadcast Encryptions," Advances in Cryptology—Eurocrypt '98, Lecture Notes in Computer Science 1403, Springer, 1998.

N. Matsuzaki, J. Anzai and T. Matsumoto, "Light Weight Broadcast Exclusion Using Secret Sharing," Information Security and Privacy $5^{th}$ Australasian Conference, ACISP 2000, Lecture Notes in Computer Science 1841, Springer, 2000, pp. 313-327.

D.A. McGrew and A.T. Sherman, "Key Establishment in Large Dynamic Groups Using One-Way Function Trees," Manuscript, available from http://www.csee.umbc.edu/sherman/Papers/itse.ps, 1998.

D. Naor, M. Naor and J. Lotspiech, "Revocation and Tracing Schemes for Stateless Receivers," Advances in Cryptology—Crypto 2001, Lecture Notes in Computer Science 2139, Springer, 2001.

M. Naor and B. Pinkas, "Efficient Trace and Revoke Schemes," Financial Cryptography '2000, Lecture Notes in Computer Science, Springer.

M. Naor and O. Reingold, "Number-Theoretic Constructions of Efficient Pseudo-Random Functions," Proceedings of $38^{th}$ IEEE Symposium on Foundations of Computer Science, 1997, pp. 458-467.

R. Poovendran and J.S. Baras, "An Information Theoretic Analysis of Rooted-Tree Based Secure Multicast Key Distribution Schemes," Advances in Cryptology—Crypto '99, Lecture Notes in Computer Science 1666, Springer, 1999.

R.L. Rivest, A. Shamir and L. Adleman, A Method for Obtaining Digital Signatures and Public-Key Cryptosystems,: Communication of the ACM, 21, 1978, pp. 120-126.

A. Shamir, "How to Share a Secret," Communications of the ACM, 22, 1979, pp. 612-613.

D.R. Stinson, "Cryptography: Theory and Practice," : CRC Press, 1995.

D. Wallner, E. Harder and R. Agee, "Key Management for Multicast: Issues and Architectures," IETF Network Working Group, Request for Comments: 2627, ftp://ftp.ietf.org/rfc/rfc2627.txt, 1999.

C.K. Wong, M. Gouda and S. S. Lam, "Secure Group Communications Using Key Graphs," Proceedings of ACM SIGCOMM '98, 1998.

* cited by examiner

✗ revoked receivers

☐ subset key used to encrypt secret information $(b_1 b_2 \ldots b_a, c_1 c_2 \ldots c_a)$ children information, key information Representation tree = (111,000),(100,011),(010,101),(001,110),(000,101),(000,011), (000,110)
= 111000100011101010011100001010000110000110

| $K_{1,1}$ | $K_{1,2}$ | ... | $K_{1,B}$ |
| $K_{2,1}$ | $K_{2,2}$ | ... | $K_{2,B}$ |
| ... | ... | ... | ... |
| $K_{A,1}$ | $K_{A,2}$ | ... | $K_{A,B}$ |

3000

3005

E(K$_{1,1}$,MK)   E(K$_{1,2}$,MK) ✗   ... ...   E(K$_{1,B}$,MK)

E(K$_{2,1}$,MK) ✗   E(K$_{2,2}$,MK)   ... ✗   E(K$_{2,B}$,MK) ✗

...   ...   ✗✗   ...

...   ...   ... ...   ...

...   ...   ... ...   ...

E(K$_{A,1}$,MK)   E(K$_{A,2}$,MK)   ✗ ...   E(K$_{A,B}$,MK)

this element is filled with pre-fixed value

US 7,757,082 B2

EFFICIENT REVOCATION OF RECEIVERS

RELATED APPLICATIONS

This is a continuation of application Ser. No. 10/292,210, filed Nov. 12, 2002, now U.S. Pat. No. 7,340,603, which claims benefit under 35 USC 119(e) to provisional applications 60/353,640 and 60/381,299; filed Jan. 30, 2002 and May 15, 2002, the entirety of which is incorporated herein by reference.

BACKGROUND

Recent progress in technology has provided convenient ways to use digital data without loss of quality. Many kinds of content are available as digital data, such as digital pictures or music, and this data can be manipulated in various ways, such as creating, storing, copying, editing, and exchanging. At the same time, protecting the content from undesired copying or other use has become more difficult for the owner of the underlying content.

One type of approach in controlling distribution of digital data is called revocation schemes or broadcast encryption schemes. A sender sends encrypted information or content to a group of receivers over a broadcast channel. One or more of the receivers are not authorized to decrypt the information. The unauthorized receivers are also called revoked receivers. The revoked receivers do not have a decryption key matching the encryption of the broadcast encrypted information. All of the receivers receive the information, but some receivers will be able to decrypt the content while unauthorized or revoked receivers will not. Examples of uses of revocation schemes include pay television systems and copy-protected media.

SUMMARY

The present disclosure provides methods and apparatus for efficient revocation of receivers. In one implementation, a method of broadcast encryption includes: assigning a respective master key to each of a plurality of receivers, where each master key can be used to derive two or more of a plurality of sub keys; revoking one or more receivers, leaving one or more unrevoked receivers; for each master key of an unrevoked receiver, selecting the sub key that can be derived by that master key and derived by the most other master keys but not derived by a master key of any of the one or more revoked receivers; for each selected sub key, encrypting one ciphertext using that selected sub key; and sending the encrypted ciphertexts to the plurality of receivers.

In another implementation, a method of broadcast decryption includes: receiving a ciphertext at a receiver; receiving a representation code at the receiver; selecting a target sub key from among a plurality of sub keys that can be derived from a master key stored at the receiver according to the received representation code; deriving the selected target sub key from the master key; and decrypting the received ciphertext using the derived sub key.

In another implementation, a method of encryption includes: defining a table having A rows and B columns; selecting a respective sub key for each element in the table, such that each element has a corresponding sub key; encrypting a media key using each sub key; storing each encrypted media key as the element in the table corresponding to the sub key used to encrypt that encrypted media key; providing the table to each of a plurality of receivers; and providing a master key to each of a plurality of receivers, where each master key can be used to derive two or more sub keys, including a sub key for a corresponding element in each column of the table.

In another implementation, a receiver for a broadcast encryption system includes: a storage device; a secure storage device storing a master key, where a plurality of sub keys can be derived from the master key; an input/output interface for receiving a ciphertext and a representation code; and a controller; where the controller is configured to: select a target sub key from among the plurality of sub keys that can be derived from the master key according to the received representation code; derive the selected target sub key from the master key; and decrypt the received ciphertext using the derived sub key.

BRIEF DESCRIPTION OF THE DRAWINGS

FIG. 29 is a diagram of a block key table.

DETAILED DESCRIPTION

The present invention provides methods and apparatus for efficient revocation of receivers, such as in broadcast encryption or using protected media. In one implementation, a combination of master keys and sub keys are used to provide access for authorized receivers to the content of a broadcast encrypted content file while preventing revoked receivers (i.e., unauthorized receivers) from accessing the encrypted content. All of the receivers receive the encrypted content file, but the revoked receivers do not have access to a content key to decrypt the file.

Figure 1:
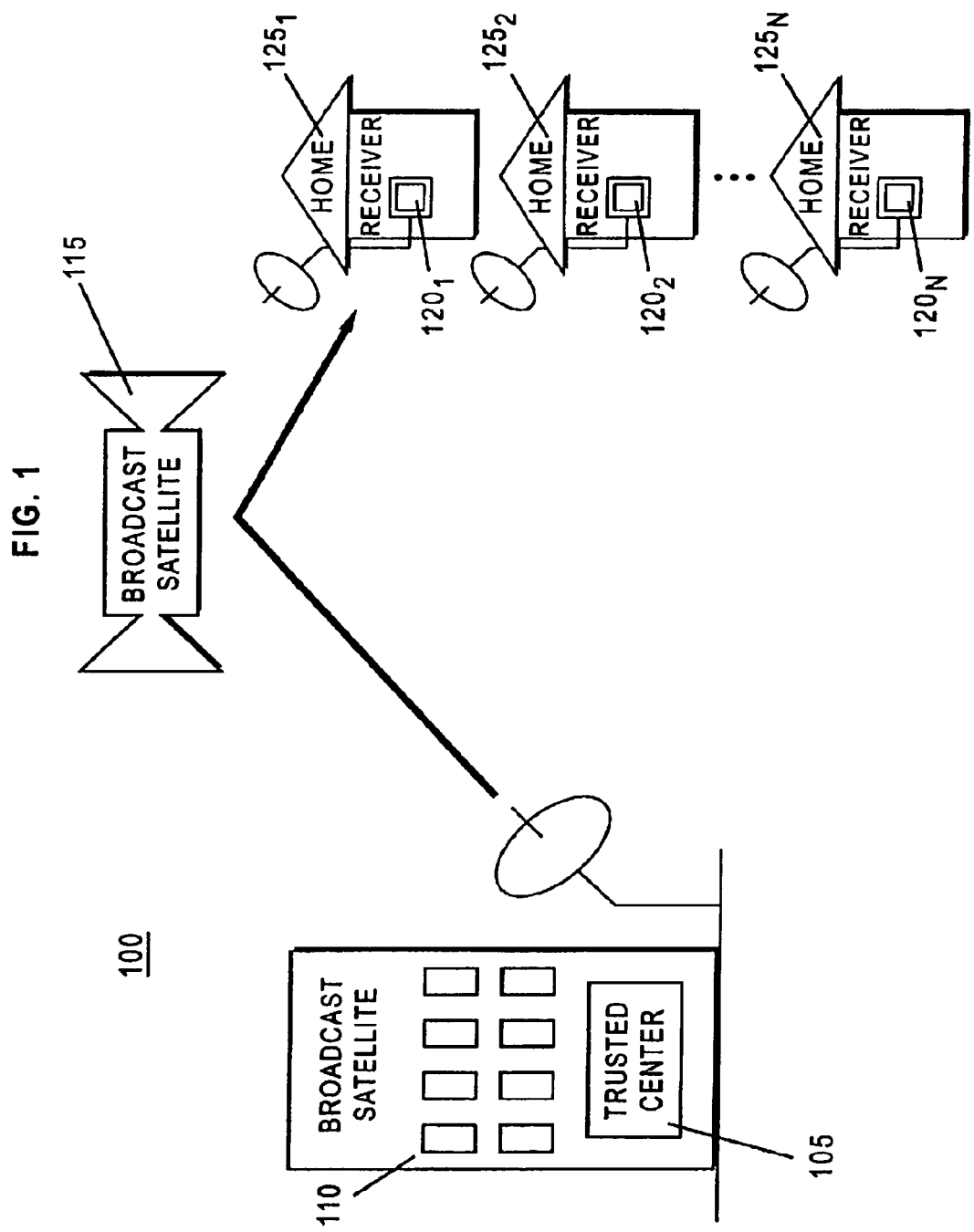
FIG. 1 shows one architecture for a broadcast encryption system using satellite broadcasting.

FIG. 1 shows one architecture for a broadcast encryption system 100 using satellite broadcasting. A broadcast encryption system uses a broadcast channel to send encrypted data (also called "ciphertexts") to receivers, and in the broadcast system 100 in FIG. 1 the broadcast channel is satellite broadcast distribution. Examples of the data sent in ciphertexts include encryption keys, audio and/or video content, and text messages, among others. A broadcast trusted center 105 at a broadcast station 110 sends data to a broadcast satellite 115. The trusted center 105 controls the encryption and distribution of data, such as through the selection of keys for encryption. The broadcast satellite 115 broadcasts the data. A receiver $120_1$ at a home 125 receives the broadcast data, such as by using a satellite receiver. Multiple additional receivers $120_{2...N}$ can also receive the broadcast data. In this way, the trusted center 105 can send data to each of a group of receivers $120_{1...N}$. As described below, the trusted center 105 encrypts the broadcast data so that only authorized receivers 120. N will be able to decrypt the encrypted broadcast data. While FIG. 1 shows a broadcast system using a broadcast satellite 115, in alternative implementations, different broadcast channels can be used, such as a CATV system or a computer network.

Figure 2:
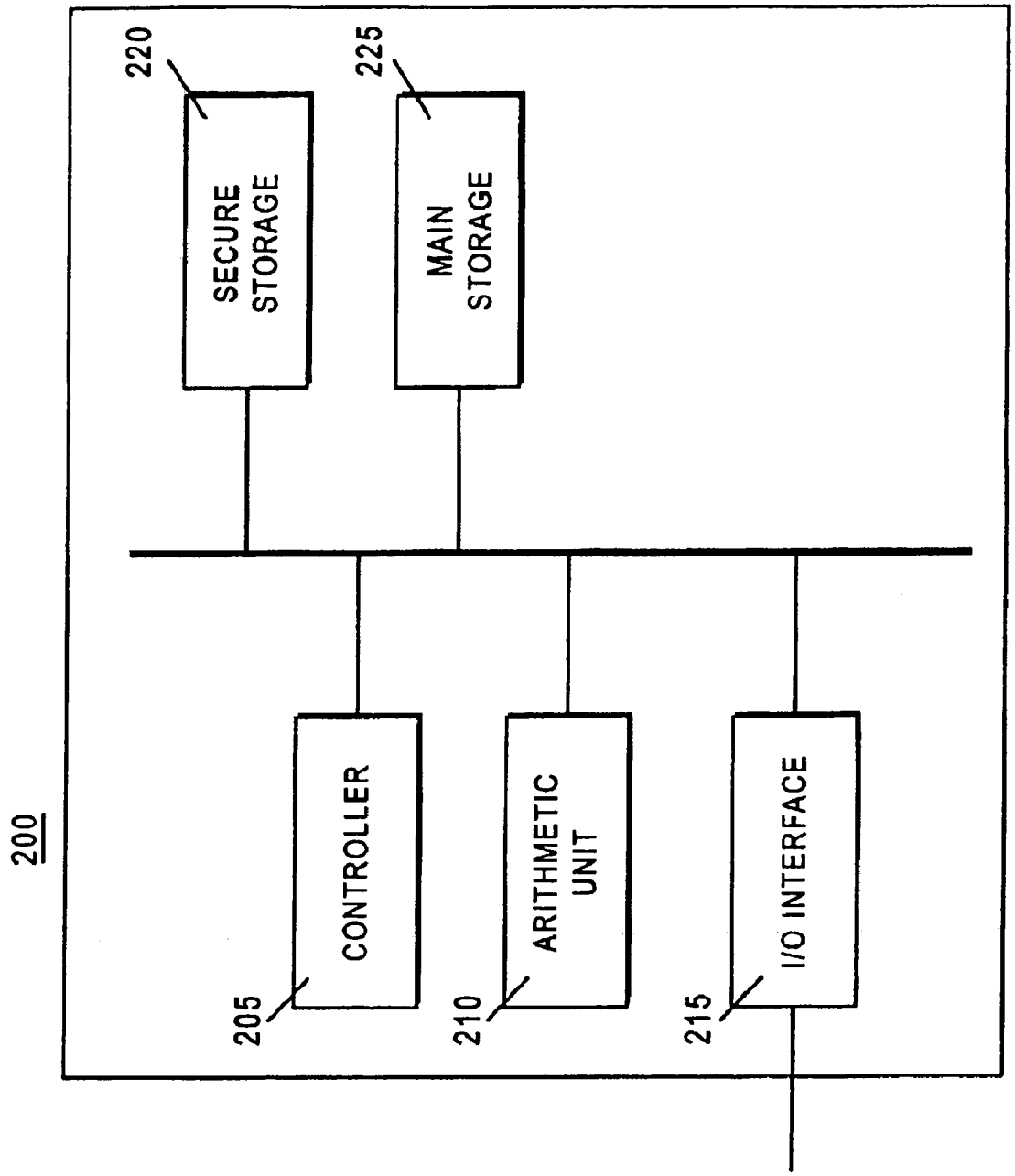
FIG. 2 is a block diagram of one implementation of a trusted center.

FIG. 2 is a block diagram of one implementation of a trusted center 200, such as the broadcast trusted center 105 shown in FIG. 1. The trusted center 200 includes a controller 205, an arithmetic unit 210, an I/O interface 215, secure storage 220, and main storage 225. The controller 205 controls the operation of the trusted center 200. In one implementation, the controller 205 is a CPU. The arithmetic unit 210 provides dedicated calculating functionality, such as for generating encryption keys and for encryption. The I/O interface 215 receives and sends data for the trusted center 200. In one implementation, the I/O interface 215 includes a transmitter, while in another implementation, the I/O interface 215 is connected to a transmitter, such as a transmitter included in the broadcast station 110 in FIG. 1. The secure storage 220 stores data that is to be kept secure or confidential, such as encryption keys. The main storage 225 stores data to support the operation of trusted center 205 and data to be sent out to receivers, such as a content file storing video or audio data. In one implementation, the secure storage 220 and main storage 225 are memory devices, such as RAM.

Figure 3:
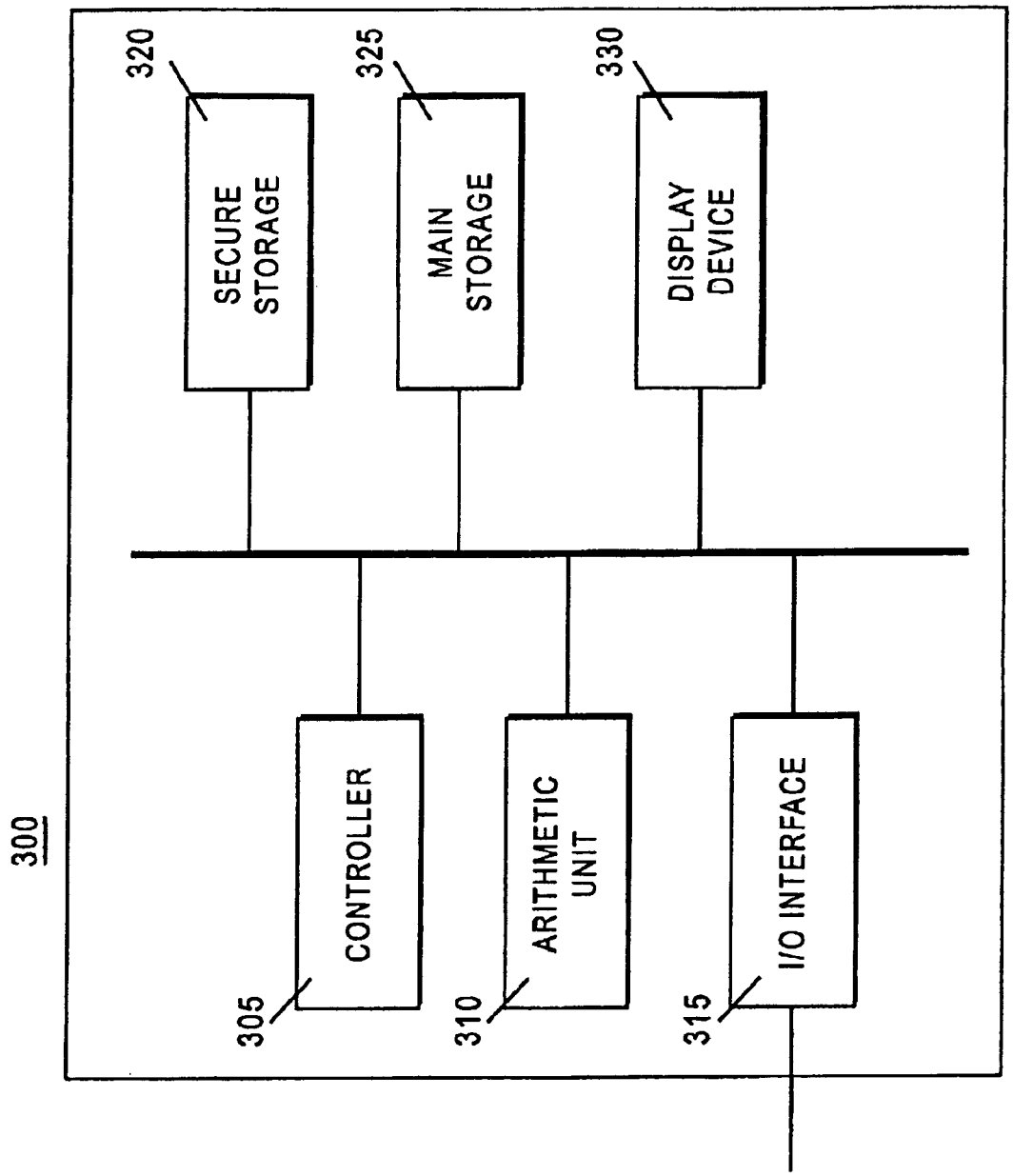
FIG. 3 is a block diagram of one implementation of a receiver.

FIG. 3 is a block diagram of one implementation of a receiver 300, such as one of the receivers $120_{1...N}$ shown in FIG. 1. The receiver 300 includes a controller 305, an arithmetic unit 310, an I/O interface 315, secure storage 320, main storage 325, and a display device 330. The controller 305 controls the operation of the receiver 300. In one implementation, the controller 305 is a CPU. The arithmetic unit 310 provides dedicated calculating functionality, such as for decryption. The I/O interface 315 receives and sends data for the receiver 300. In one implementation, the I/O interface 315 includes a broadcast receiver, while in another implementation, the I/O interface 315 is connected to a broadcast receiver, such as a satellite receiver at a corresponding home $125_{1...N}$ in FIG. 1. The secure storage 320 stores data that is to be kept secure or confidential, such as decryption keys. The decryption key(s) for a receiver 300 are stored to the secure storage 320 by the manufacturer of the receiver 300. Alternatively, the trusted center provides the decryption key(s) to the receiver 300 and the receiver stores the received key(s) in the secure storage 320. The main storage 325 stores data to support the operation of the receiver 300. In one implementation, the secure storage 320 and main storage 325 are memory devices, such as RAM. The display device 330 displays data for a user of the receiver 300, such as through a monitor or television. In an alternative implementation, the receiver 300 includes a display interface to connect to a display device instead of including the display device itself.

Figure 4:
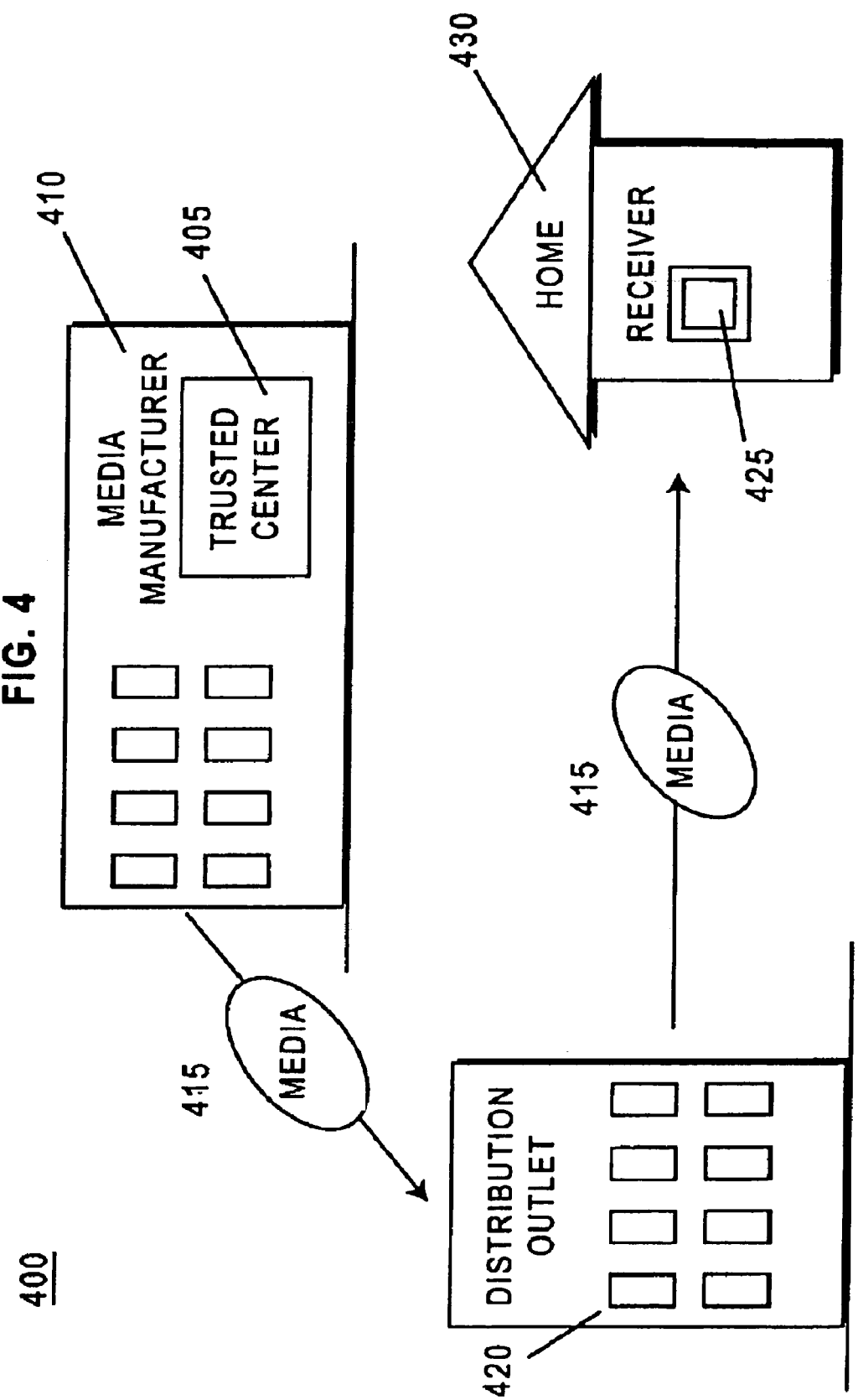
FIG. 4 shows one architecture for a broadcast encryption system using data media.

FIG. 4 shows one architecture for a broadcast encryption system 400 using data media. In the broadcast system 400 in FIG. 4 the broadcast channel is data media distribution. A media trusted center 405 at a media manufacturer 410 stores data onto an article of data media 415, such as pre-recorded media (e.g., CD-ROM or DVD-ROM) or recordable media (e.g., CD-RW or DVD-RW). As described below, for pre-recorded media, the trusted center 405 records encrypted content keys and encrypted content on the pre-recorded media for authorized player devices to use to decrypt and access the encrypted content (e.g., video or audio). For recordable media, the trusted center 405 records encrypted content keys on the recordable media for authorized recorder devices to use to record data to the recordable media. The media manufacturer sends the media 415 to a distribution outlet 420, such as a retail store. The distribution outlet 420 provides the media 415 to a receiver 425 at a home 430. For example, the distribution outlet 420 sells the media 415 to a person who takes the media 415 to his home 430 and places the media 415 in the receiver 425. In one implementation, the receiver 425 is a player device for reading data stored on the media 415, such as a DVD player. In another implementation, the receiver 425 is a recorder device for writing and reading data to and from the media 415, such as a DVD-RW drive. In this way, the trusted center 405 can provide data to a receiver 425. As described below, the trusted center 405 encrypts the data so that only authorized receivers 425 will be able to decrypt the encrypted data.

Figure 5:
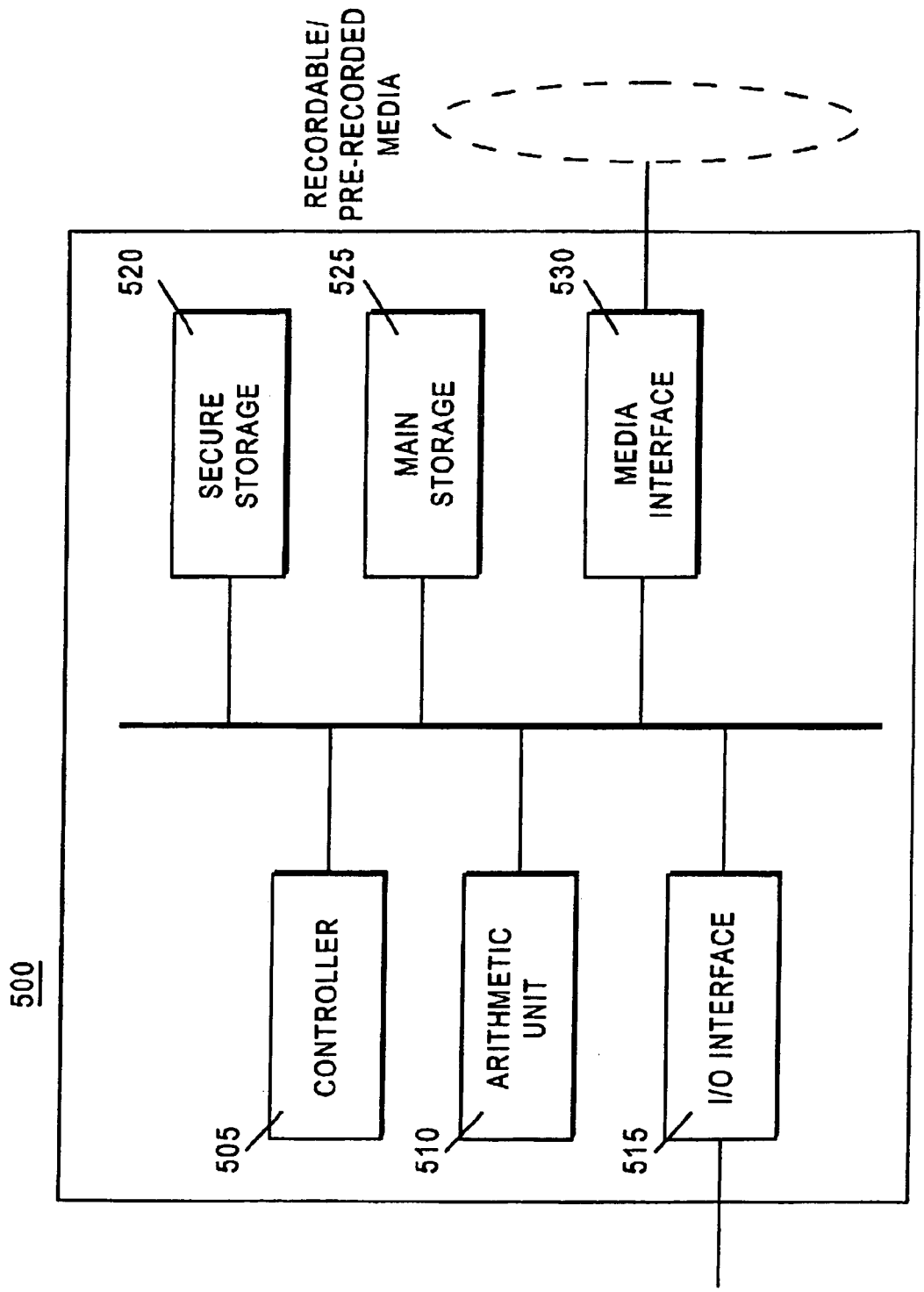
FIG. 5 is a block diagram of one implementation of a trusted center.

FIG. 5 is a block diagram of one implementation of a trusted center 500, such as the media trusted center 405 shown in FIG. 4. The trusted center 500 includes a controller 505, an arithmetic unit 510, an I/O interface 515, secure storage 520, main storage 525, and a media interface 530. The controller 505 controls the operation of the trusted center 500. In one implementation, the controller 505 is a CPU. The arithmetic unit 510 provides dedicated calculating functionality, such as for generating encryption keys and for encryption. The I/O interface 515 receives and sends data for the trusted center 500. The secure storage 520 stores data that is to be kept secure or confidential, such as encryption keys. The main storage 525 stores data to support the operation of trusted center 505 and data to be sent out to receivers, such as a content file storing video or audio data. In one implementation, the secure storage 520 and main storage 525 are memory devices, such as RAM. The media interface 530 provides media reading and writing functionality for the trusted center 500, so that the trusted center 500 can write data to and read data from an article of media, such as the media 415 to be distributed in the broadcast encryption system 400 shown in FIG. 4

Figure 6:
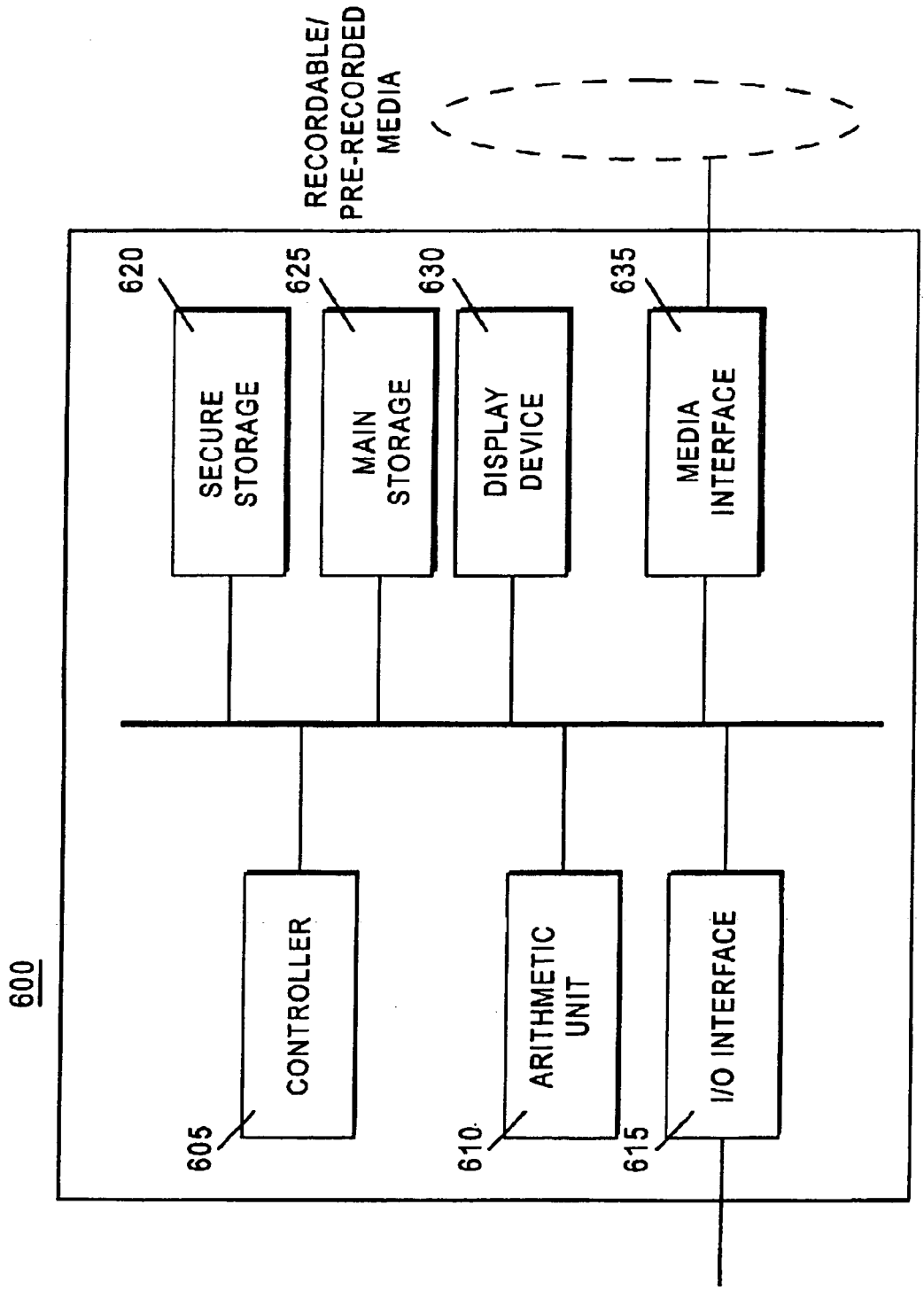
FIG. 6 is a block diagram of one implementation of a receiver.

FIG. 6 is a block diagram of one implementation of a receiver 600, such as the receiver 425 shown in FIG. 4. In one implementation, the receiver 600 is a player device and in another implementation the receiver 600 is a recorder device. The receiver 600 includes a controller 605, an arithmetic unit 610, an I/O, interface 615, secure storage 620, main storage 625, a display device 630, and a media interface 635. The controller 605 controls the operation of the receiver 600. In one implementation, the controller 605 is a CPU. The arithmetic unit 610 provides dedicated calculating functionality, such as for decryption or encryption (for a recorder device). The I/O interface 615 receives and sends data for the receiver 600. The secure storage 620 stores data that is to be kept secure or confidential, such as decryption keys. The decryption key(s) for a receiver 600 are stored to the secure storage 620 by the manufacturer of the receiver 600. The main storage 625 stores data to support the operation of the receiver 600. In one implementation, the secure storage 620 and main storage 625 are memory devices, such as RAM. The display device 630 displays data for a user of the receiver 600, such as through a monitor or television. In an alternative implementation, the receiver 600 includes a display interface to connect to a display device instead of including the display device itself. The media interface 635 provides media reading functionality for the receiver 600 and also writing functionality if the receiver 600 is a recorder device, so that the receiver 600 can, as appropriate write data to and read data from an article of media, such as the media 415 distributed in the broadcast encryption system 400 shown in FIG. 4.

Figure 7:
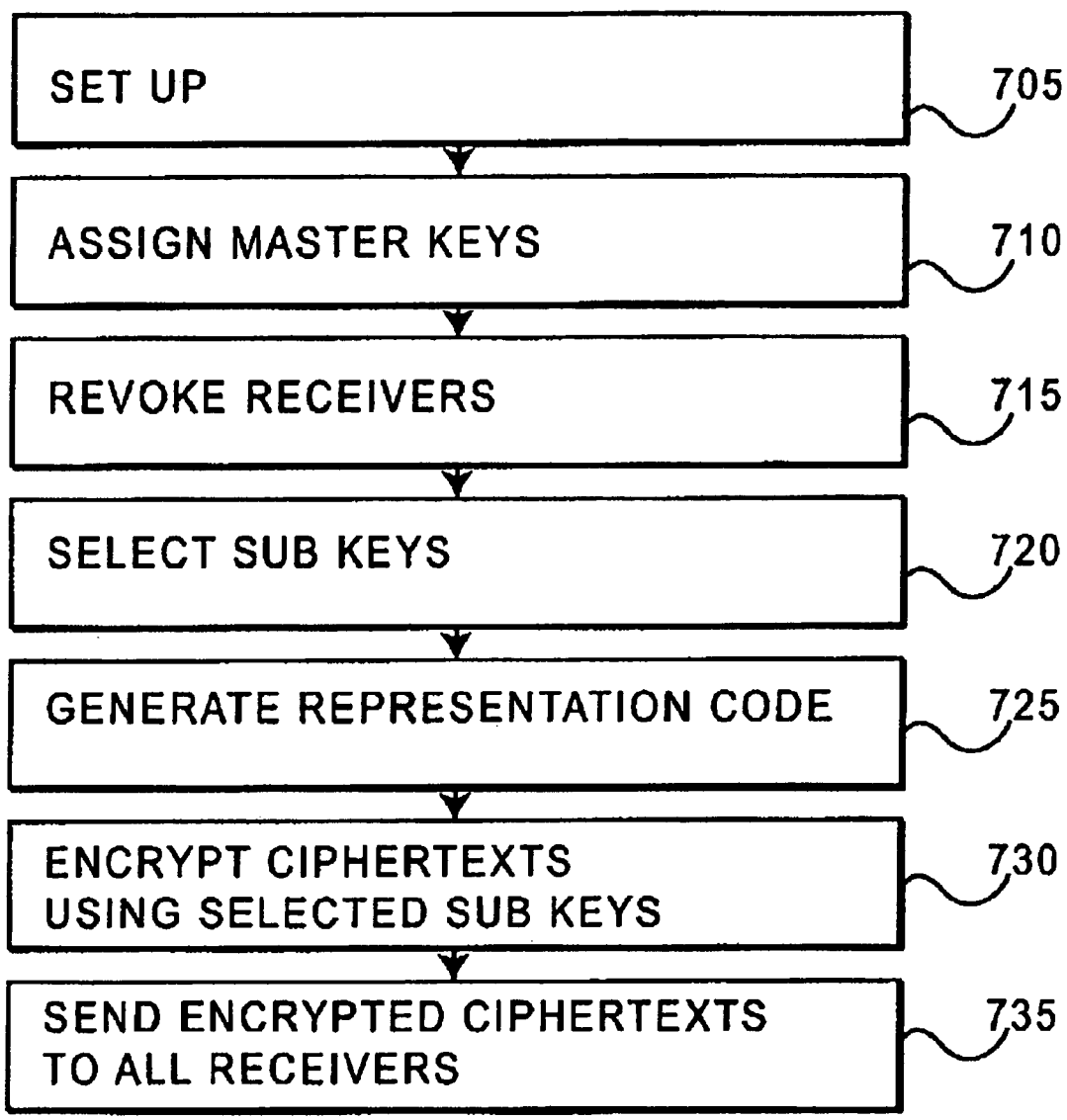
FIG. 7 is a flowchart of broadcast encryption, including encrypting a ciphertext and sending the ciphertext to a group of one or more receivers.

FIG. 7 is a flowchart of broadcast encryption, including encrypting a ciphertext and sending the ciphertext to a group of one or more receivers. In one implementation, a trusted center broadcasts ciphertexts to one or more receivers, as in the broadcast encryption system 100 shown in FIG. 1. In another implementation, a trusted center prepares data media for distribution to one or more receivers, as in the broadcast encryption system 400 shown in FIG. 4. The trusted center sets up the encryption system, block 705. The trusted center generates sub keys and master keys as part of the set up. Each master key can bemused to derive two or more sub keys. The trusted center and the receivers use the sub keys for encrypting and decrypting ciphertexts. In one implementation, the trusted center sends each master key to the corresponding receiver. In an alternative implementation, each receiver receives its master key from the receiver's manufacturer. The trusted center assigns a respective master key to each of a group of two or more receivers, block 710. Accordingly, each receiver stores a master key, but does not need to store each of the sub keys. To improve speed at the cost of storage space, a receiver can pre-compute sub keys or parts of sub keys (as described below).

The trusted center revokes one or more of the receivers, block 715. By revoking a receiver, the trusted center removes the authorization for that receiver. After this revocation, one or more unrevoked receivers remain from the original group of receivers. In some circumstances, the trusted center does not revoke any receivers, such as when all of the receivers are authorized to decrypt data from the trusted center. The trusted center selects sub keys to use for encryption, block 720. As described below, the trusted center selects sub keys according to which sub keys cannot be derived from the master keys assigned to revoked receivers. For each master key, the trusted center selects a sub key that can be derived by that master key and by the most other master keys, but cannot be derived by a master key of a revoked receiver. As described below, in one implementation, the trusted center uses a hierarchical key tree to assign and select sub keys. The group of selected sub keys does not include all of the available sub keys. The trusted center generates a representation code indicating which sub keys have been selected, block 725. The trusted center sends the representation code to the receivers.

The trusted center uses each of the selected sub keys to encrypt data as a respective ciphertext, block 730. The trusted center uses an encryption algorithm such as AES or DES. The trusted center sends the ciphertexts to the receivers, block 735. The trusted center sends the ciphertexts to all the receivers, including the revoked receivers, because the revoked receivers should not be able to decrypt the ciphertexts. The trusted center sends the ciphertexts to the receivers through the appropriate channel for the broadcast encryption system. For example, in the broadcast encryption system shown in FIG. 1, as discussed above the broadcast channel is satellite broadcast distribution. In one implementation, the trusted center performs blocks 705 and 710 once (or until the system changes, such as when the number of receivers changes), and then repeats blocks 715 through 735 for each distribution of ciphertexts.

Figure 8:
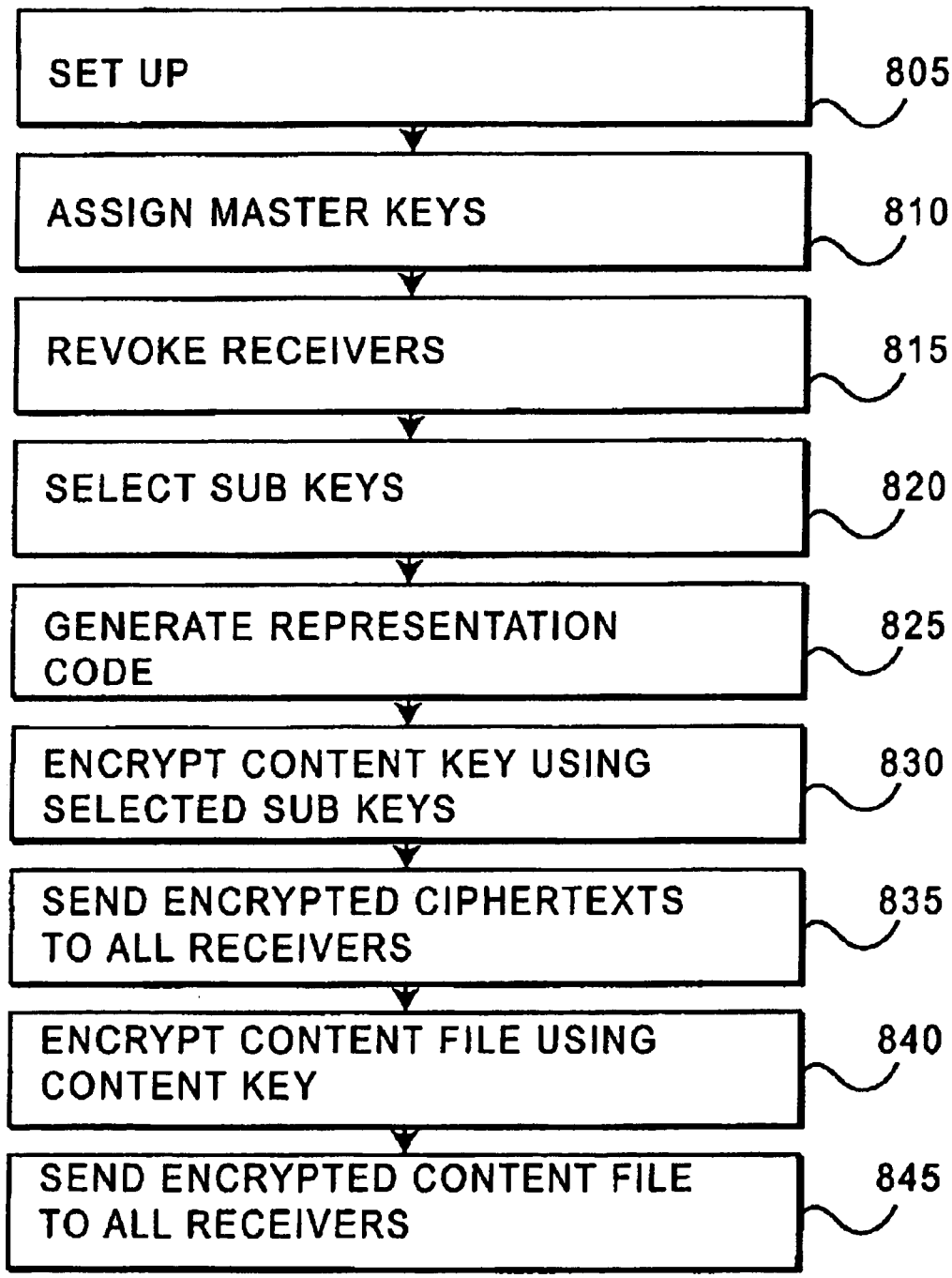
FIG. 8 is a flowchart of broadcast encryption, including encrypting a content key and a content file.

In one implementation, the trusted center encrypts a content key using each selected sub key. The content key can be used by a receiver to decrypt an encrypted content file, such as a file storing video or audio data. One type of content key is used to decrypt an encrypted file, while another type of content key is used to derive one or more sub-content keys to use to decrypt respective encrypted files. Alternatively, the content is not stored in a static file, such as a data stream or live content. FIG. 8 is a flowchart of broadcast encryption, including encrypting a content key and a content file. Operations in FIG. 8 similar to those described above referring to FIG. 7 are performed similarly, with variations noted below. The trusted center sets up the encryption system, block 805. The trusted center assigns a respective master key to each of a group of two or more receivers, block 810. The trusted center revokes one or more of the receivers, block 815. The trusted center selects sub keys to use for encryption, block 820. The trusted center generates a representation code indicating which sub keys have been selected and sends the representation code to the receivers, block 825. The trusted center uses each of the selected sub keys to encrypt the content key as a respective key ciphertext, block 830. The trusted center encrypts the same content key using each selected sub key and so generates a key ciphertext for each selected sub key. The trusted center sends the key ciphertexts to the receivers, block 835.

The trusted center encrypts the content file using the content key, block 840. The trusted center sends the encrypted content file to the receivers, block 845. The trusted center sends the encrypted content file and the key ciphertexts (each containing the content key) to all the receivers, including the revoked receivers, because the revoked receivers should not be able to decrypt the encrypted content file or the key ciphertexts. In addition, the trusted center encrypts and broadcasts the content key multiple times as separate key ciphertexts using the selected sub keys and encrypts and broadcasts the encrypted file once using the content key. In one implementation, the trusted center performs blocks 805 and 810 once (or until the system changes, such as when the number of receivers changes), and then repeats blocks 815 through 845 for each distribution of ciphertexts.

Figure 9:
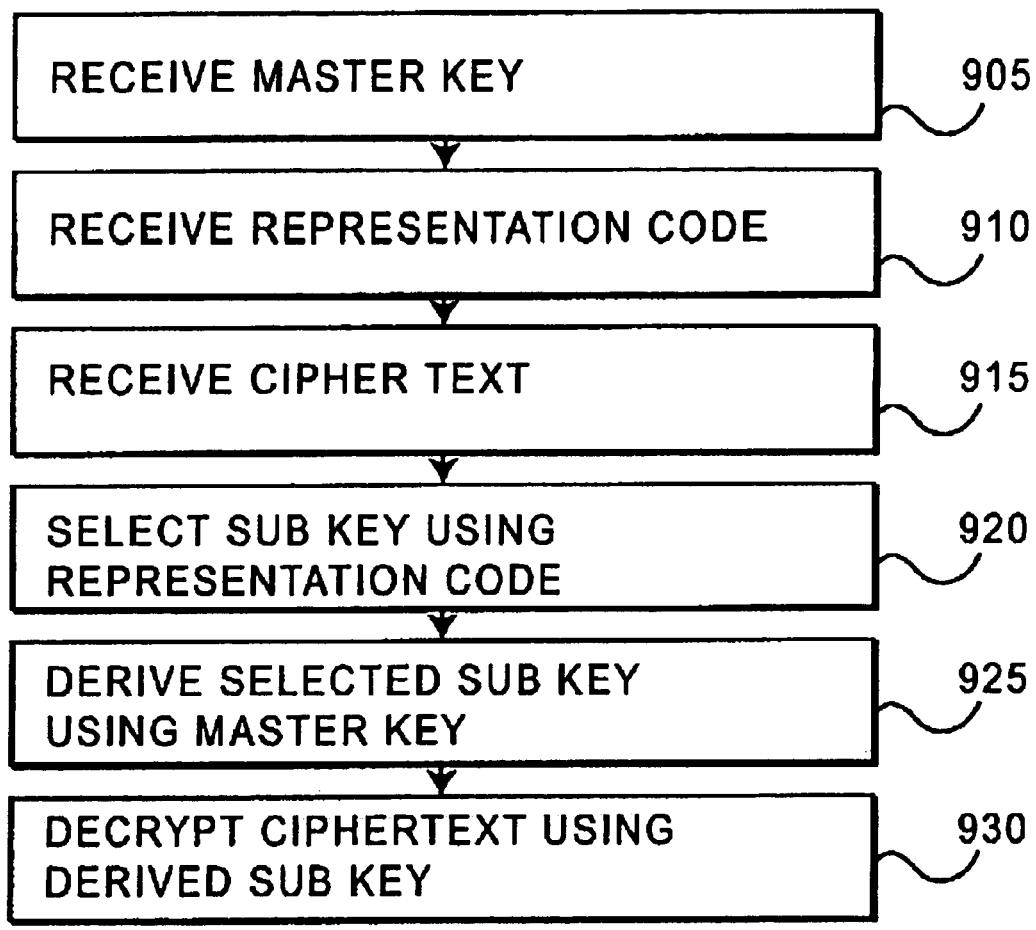
FIG. 9 is a flowchart of broadcast decryption by a receiver.

FIG. 9 is a flowchart of broadcast decryption by a receiver. In one implementation, a receiver receives data and ciphertexts broadcast from a trusted center, as in the broadcast encryption system 100 shown in FIG. 1. In another implementation, a receiver receives data and ciphertexts on data media prepared by a trusted center for distribution, as in the broadcast encryption system 400 shown in FIG. 4. The receiver receives a master key from the trusted center, block 905. The receiver stores the master key in secure storage. As noted above referring to block 710 of FIG. 7, in one implementation, the receiver receives the master key from the receiver's manufacturer rather than directly from the trusted center. The receiver receives a representation code from the trusted center, block 910. The representation code indicates which of the sub keys the trusted center has used to encrypt ciphertexts. The receiver receives one or more ciphertexts from the trusted center through the broadcast channel of the broadcast encryption system, block 915. In one implementation, the receiver checks the representation code to determine which ciphertexts the receiver can decrypt and discards or ignores ciphertexts that the receiver cannot decrypt. The receiver uses the representation code to select a target sub key to use for decryption, block 920. The target sub key is the sub key to be derived from the receiver's master key. After selecting a sub key, the receiver derives the selected sub key from the receiver's master key, block 925. The receiver decrypts the received ciphertext(s) using the derived sub key, block 930. After decryption, the receiver can access the data contained in the ciphertext(s). In one implementation, the receiver performs block 905 once (or until the system changes, such as when the number of receivers changes), and then repeats blocks 910 through 930 for each distribution of ciphertexts.

The trusted center uses various techniques to set up the broadcast encryption system (recall block 705 in FIG. 7). The set up of the broadcast encryption system affects the interaction between the trusted center and the receivers. The trusted center generates a hierarchical key tree with receivers assigned to the leaves. In one implementation, the trusted center uses a hierarchical key tree with node keys assigned to the nodes of the tree. In another implementation, the trusted center assigns subsets indicating children of nodes and subset keys to the nodes of a hierarchical key tree. In another implementation, the trusted center uses subset keys and assigns multiple master keys to each receiver. In yet another implementation, the trusted center does not use a key tree, but instead uses a key table and a vector to select elements from the table. These implementations and variations are described below.

Hierarchical Key Tree with Node Keys

In one implementation of a broadcast encryption system including a trusted center and N receivers, such as the systems 100, 400 shown in FIGS. 1 and 4, the trusted center uses a hierarchical key tree ("HKT") and node keys. In this implementation, the node keys are the sub keys described above. Applying the process of FIGS. 7 and 9 to this implementation is described below.

Figure 10:
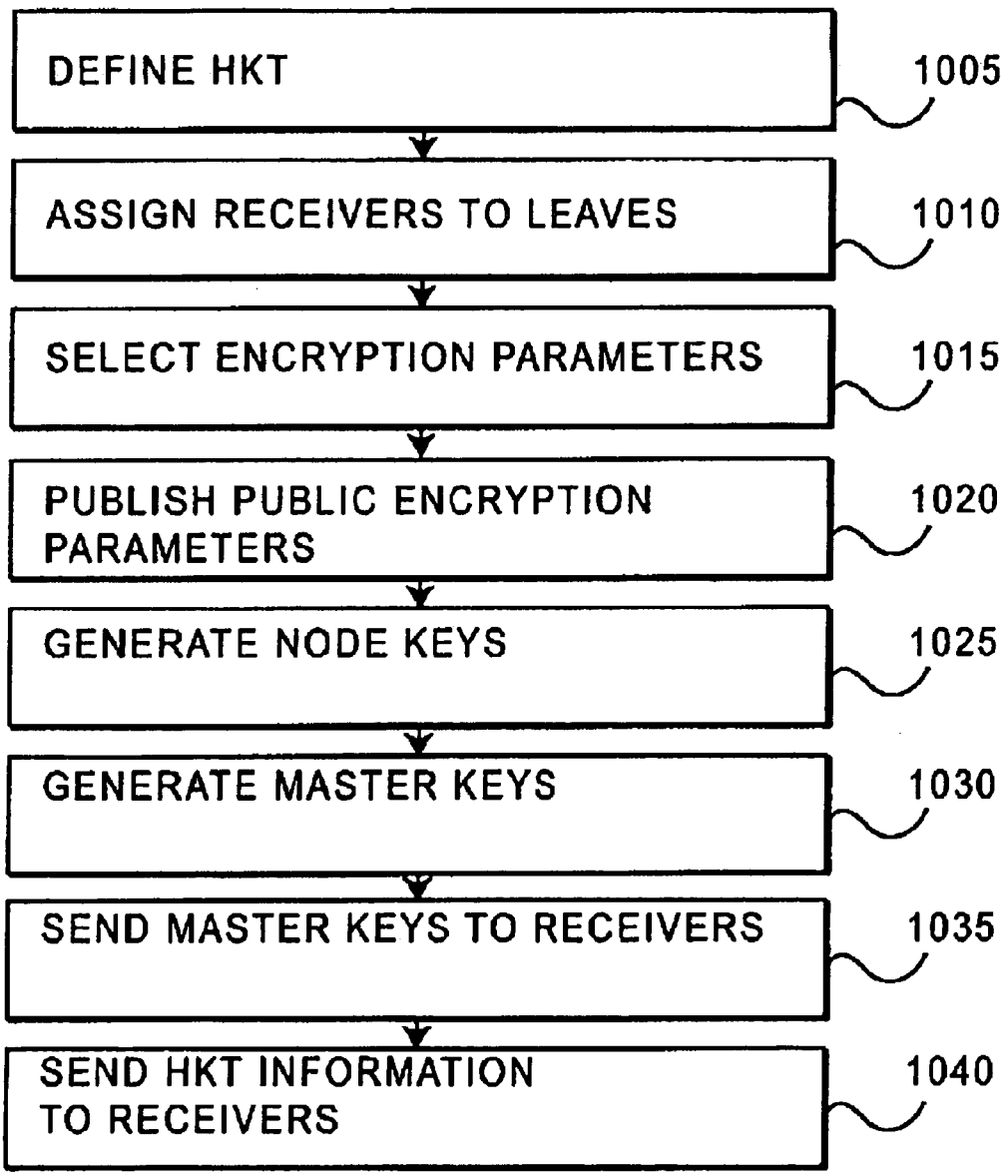
FIG. 10 is a flowchart of setting up the broadcast encryption system using an HKT with node keys and assigning master keys to the receivers.
Figure 11:
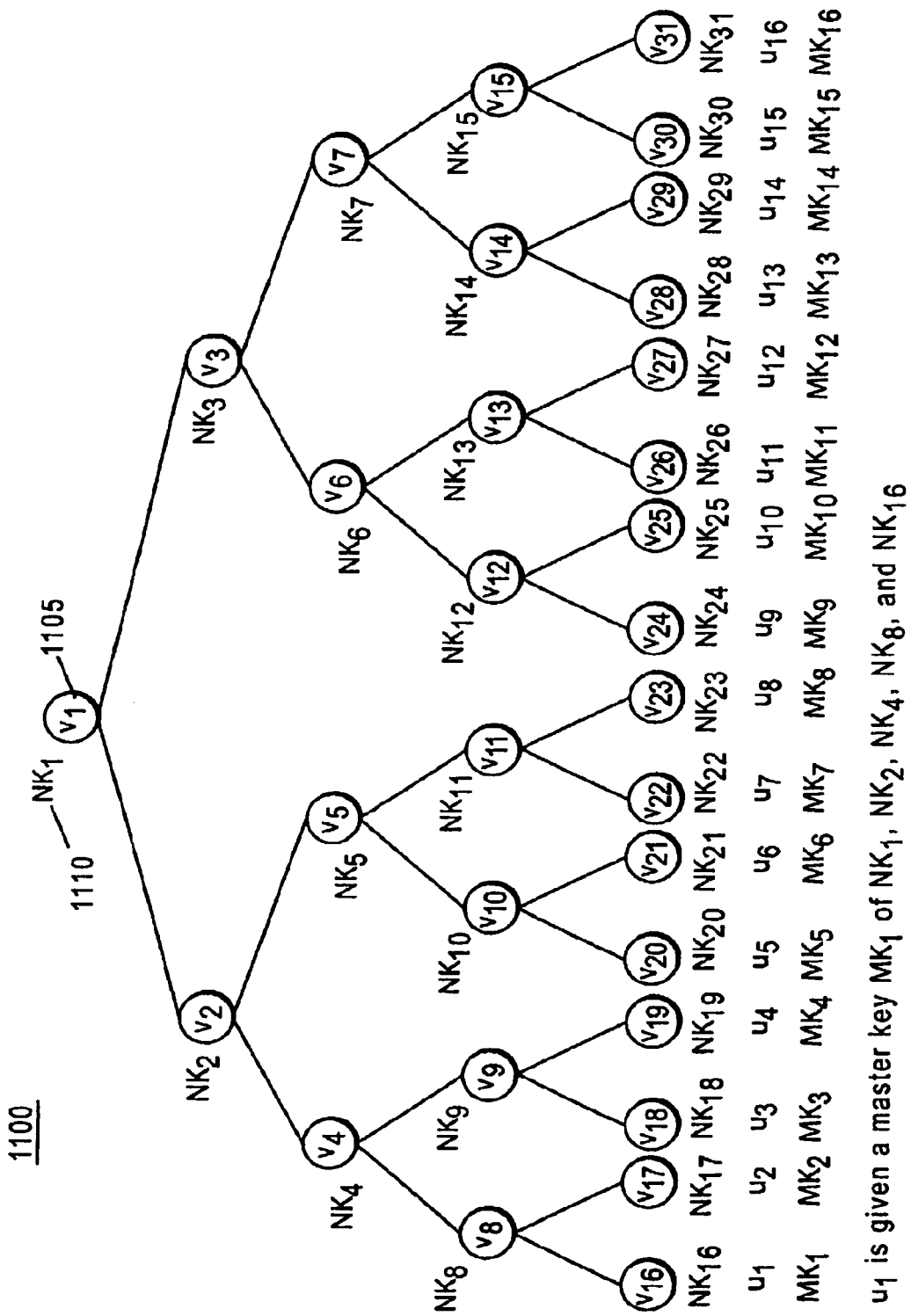
FIG. 11 is a diagram of an HKT showing the assignment of node keys to nodes.

FIG. 10 is a flowchart of setting up the broadcast encryption system using an HKT with node keys and assigning master keys to the receivers (recall blocks 705 and 710 in FIG. 7). FIG. 11 is a diagram of an HKT 1100 showing the assignment of node keys 1105 to nodes 1110, where the HKT 1100 is for a group of 16 receivers. The trusted center defines an HKT, block 1005. The HKT is a rooted full binary tree with N leaves and 2N−1 nodes, including the leaves, the root, and internal nodes. A node is denoted as $v_i$ (i=1, ..., 2N−1), as in FIG. 11. If N is not a power of two, the trusted center defines an HKT with a number of leaves equal to the next power of two above N. In an alternative implementation, the trusted center defines an HKT that is an a-ary tree, rather than a binary tree.

The trusted center assigns each receiver to a respective leaf, block 1010. A receiver is denoted as $u_j$ (j=1, ..., N), as in FIG. 11. If N is not a power of two, "virtual" receivers are assumed to correspond to the extra leaves (as virtual entities, the virtual receivers would not need to be later revoked). The trusted center selects encryption parameters, block 1015. The trusted center uses the encryption parameters to generate values for encryption, such as keys. Some of the encryption parameters are public and the trusted center publishes the public encryption parameters, block 1020. The trusted center publishes the public encryption parameters by sending the public encryption parameters to each of the receivers, for example. The trusted center keeps the remaining secret encryption parameters secret from the receivers. The trusted center selects two large primes $q_1$ and $q_2$ and generates a value M as $M=q_1q_2$. The trusted center publishes M as a public encryption parameter. The trusted center selects a value $K_0$, where $K_0 \in Z^*_M$, as a secret encryption parameter. The trusted center also selects 2N−1 primes $p_i$ (i=1, ..., 2N−1) as public encryption parameters. The trusted center assigns each prime $p_i$ to a corresponding node $v_i$ (e.g., $p_1$ is assigned to $v_1$), including the root and the leaves. The trusted center publishes the assignment of primes to nodes. The trusted center generates a value T as $T=\Pi_i p_i$. The trusted center does not publish T. The trusted center generates a value $w_j$ for each receiver $u_j$. $w_j$ is the product of all the primes $p_i$ assigned to nodes $v_i$ on the path from the leaf node corresponding to the receiver $u_j$ to the root node. For example, referring to the HKT 1100 in FIG. 11, $w_1$ corresponds to $u_1$ and is the product of the primes assigned to nodes $v_{16}$, $v_8$, $v_4$, $v_2$, and $v_1$, and so $w_1 = p_{16}p_8p_4p_2p_1$.

The trusted center generates node keys using the encryption parameters, block 1025. A node key is denoted as $NK_i$, as shown in FIG. 11. The trusted center generates a node key $NK_i$ for each node $v_i$ as:

$$NK_i = K_O^{T/p_i} \bmod M$$

The trusted center assigns each node key $NK_i$ to a corresponding node $v_i$.

The trusted center generates master keys using the encryption parameters, block 1030. A master key is denoted as $MK_j$, as shown in FIG. 11. The trusted center generates a master key $MK_j$ for each receiver $u_j$ as:

$$MK_j = K_O^{T/w_j} \bmod M$$

The trusted center assigns each master key $MK_j$ to a corresponding receiver $u_j$. A master key $MK_j$ can be used to derive any of the node keys $NK_i$ corresponding to nodes $v_i$ on the path from the leaf node corresponding to the receiver $u_j$ to the root node. For example, referring to the HKT 1100 in FIG. 11, $u_1$ is assigned master key $MK_1$ and can use $MK_1$ to derive node keys $NK_{16}$, $NK_8$, $NK_4$, $NK_2$, and $NK_1$. The node key $NK_1$ of the root can be derived by all the master keys $MK_j$ for when none of the receivers $u_j$ have been revoked. The trusted center sends each master key $MK_j$ to a corresponding receiver $u_j$, block 1035.

The trusted center sends information about the HKT to each receiver, block 19040. The trusted center sends information indicating the number of nodes in the HKT and assignments that are relevant to a receiver. As described above, the trusted center publishes public encryption parameters, such as the primes $p_i$ and to which nodes $v_i$ the primes $p_i$ correspond. The trusted center also sends information indicating to which node $v_i$ the receiver $u_j$ has been assigned, to which node $v_i$ the receiver's master key $MK_j$ has been assigned, and to which nodes $v_i$ the node keys $NK_i$ that can be derived from the receiver's master key $MK_j$ have been assigned.

As noted above referring to block 710 of FIG. 7, in an alternative implementation, the trusted center provides the master keys to manufacturers of receivers and the manufacturers provide the master keys to receivers. In this case, the trusted center also provides the public encryption parameters and the HKT information to the receivers through the manufacturers.

Figure 12:
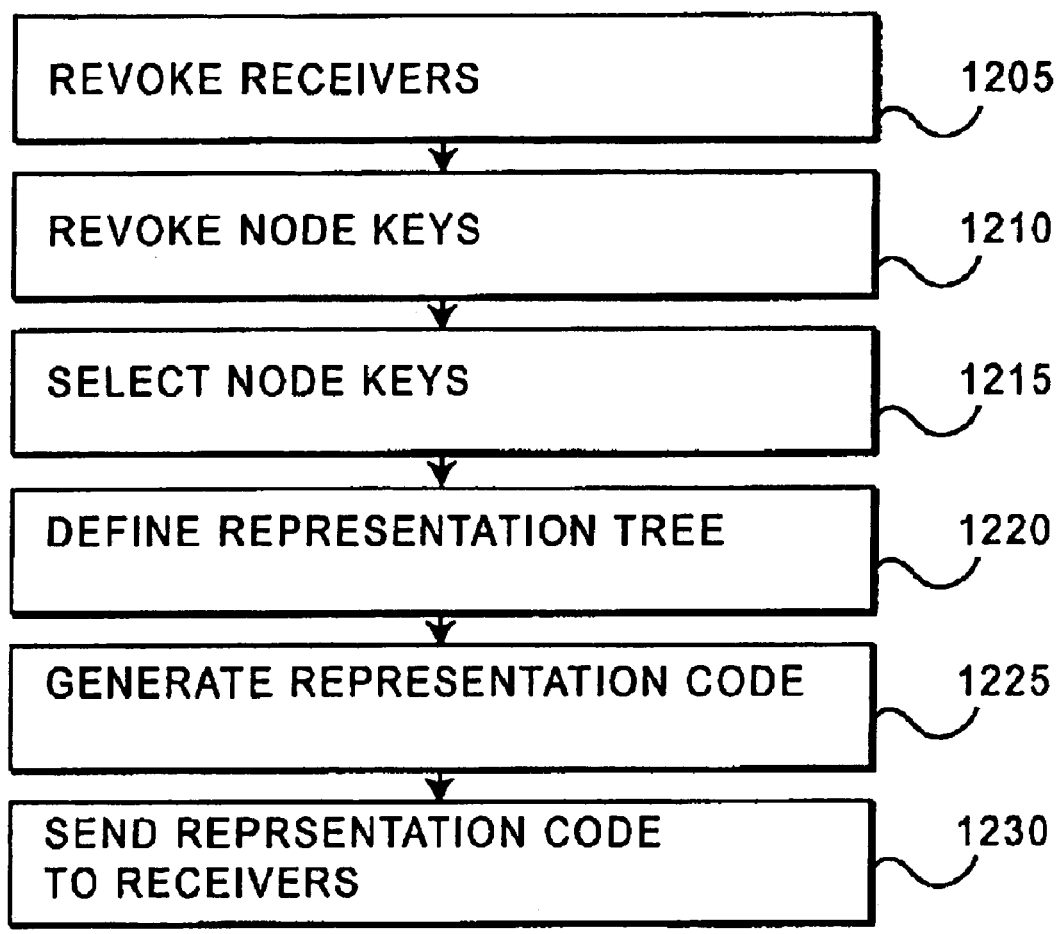
FIG. 12 is a flowchart of revoking receivers, selecting node keys, and generating a representation code using an HKT.
Figure 13:
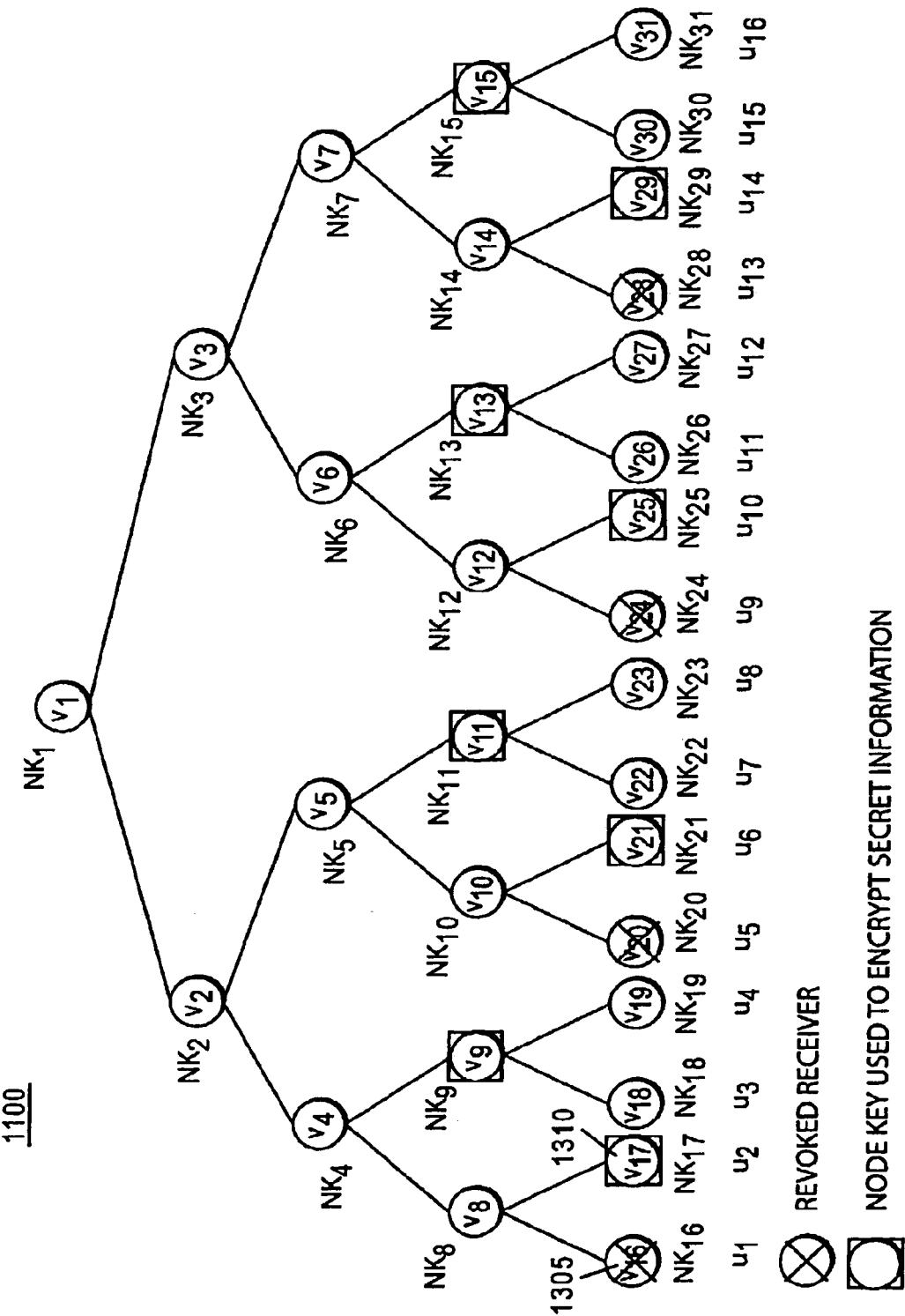
FIG. 13 is a diagram of the HKT shown in FIG. 11 indicating nodes of revoked receivers and nodes of selected node keys.

FIG. 12 is a flowchart of revoking receivers, selecting node keys, and generating a representation code using an HKT (recall blocks 715, 720, and 725 in FIG. 7). FIG. 13 is a diagram of the HKT 1100 shown in FIG. 11 indicating nodes of revoked receivers 1305 and nodes of selected node keys 1310. The trusted center revokes one or more receivers, block 1205. The trusted center revokes or invalidates a receiver when that receiver is no longer to be authorized to decrypt the ciphertexts being sent from the trusted center. For example, the trusted center revokes a receiver that has not paid a required fee or whose license has become invalid. In FIG. 13, revoked receivers 1305 are indicated by having an "X" through the corresponding node of the HKT 1100. The trusted center has revoked receivers $u_1$, $u_5$, $u_9$, and $u_{13}$. Receivers $u_2$, $u_3$, $u_4$, $u_6$, $u_7$, $u_8$, $u_{10}$, $u_{11}$, $u_{12}$, $u_{14}$, $u_{15}$, and $u_{16}$ are unrevoked receivers.

The trusted center revokes the node keys that can be derived from master keys assigned to revoked receivers, block 1210. For example, in FIG. 13, the trusted center has revoked receiver $u_1$ and master key $MK_1$ has been assigned to $u_1$. Receiver $u_1$ can use master key $MK_1$ to derive node keys $NK_{16}$, $NK_8$, $NK_4$, $NK_2$, and $NK_1$. Accordingly, the trusted center revokes node keys $NK_{16}$, $NK_8$, $NK_4$, $NK_2$, and $NK_1$.

For each master key of ah unrevoked receiver, the trusted center selects the node key that can be derived by that master key and by the most other master keys but cannot be derived by a master key corresponding to a revoked receiver, block 1215. Referring to the HKT, the trusted center selects the unrevoked node keys that have a parent node corresponding to a revoked node key. In another approach, the trusted center removes nodes corresponding to revoked node keys. Removing the nodes leaves one or more sub-trees (one or more of which may only have a single node). The trusted center selects the node keys corresponding to the nodes that are the roots of these sub-trees. In FIG. 13, the selected node keys 1310 are indicated by squares around the nodes corresponding to the selected node keys. Accordingly, the trusted center has selected node keys $NK_{17}$, $NK_9$, $NK_{21}$, $NK_{11}$, $NK_{25}$, $NK_{13}$, $NK_{29}$, and $NK_{15}$.

Figure 14:
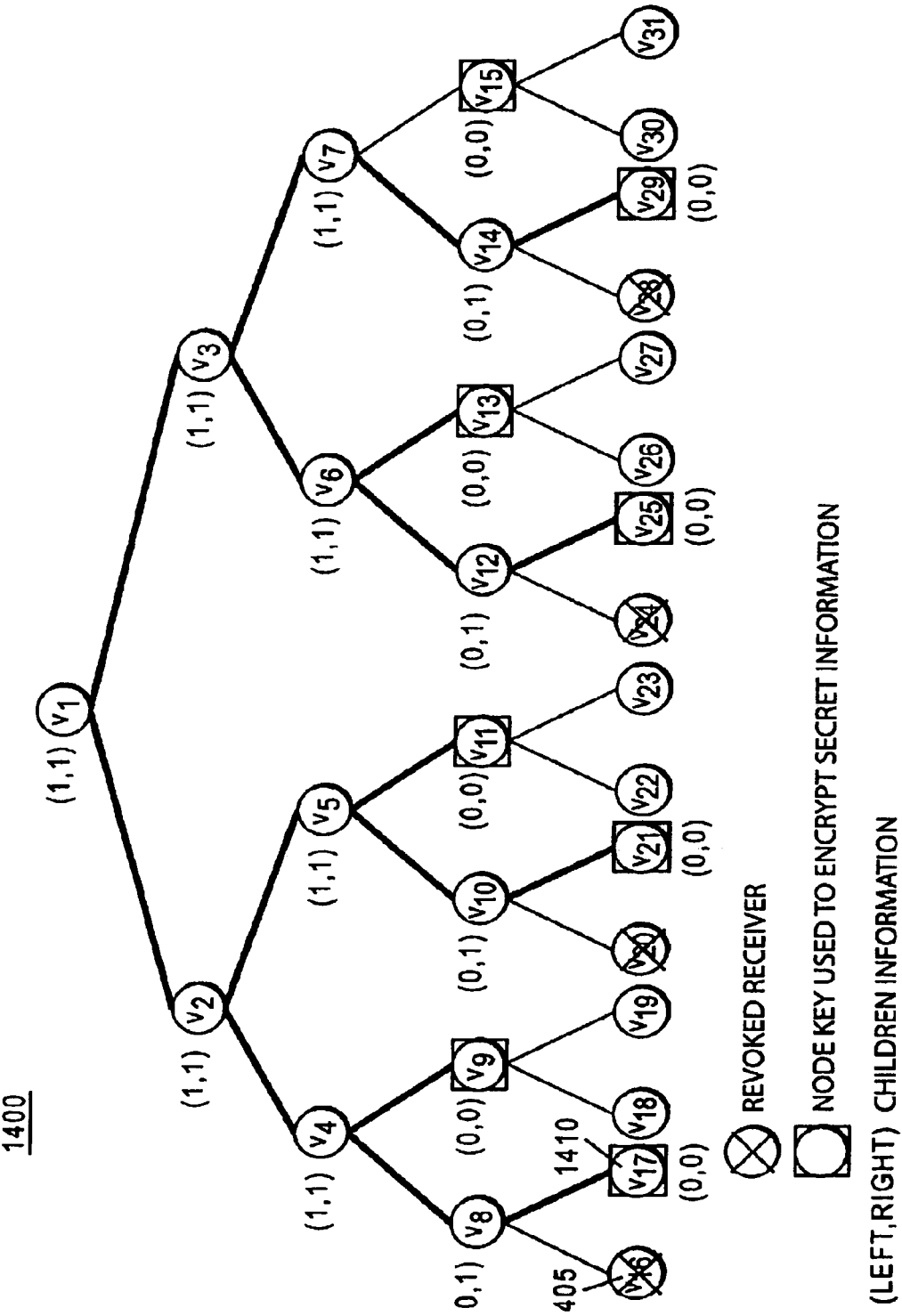
FIG. 14 is a diagram of a representation tree based on the HKT shown in FIGS. 1 and 13.

The trusted center defines a representation tree based on the HKT and the revoked receivers, block 1220. FIG. 14 is a diagram of a representation tree 1400 based on the HKT 1100 shown in FIGS. 11 and 13. Heavy or thick edges in FIG. 14 indicate edges that are part of the representation tree 1400. Light edges are not part of the representation tree 1400. Revoked receivers 1305 and selected node keys 1310 are indicated as in FIG. 13. The representation tree is rooted at the root of the corresponding HKT. The leaves of the representation tree are nodes corresponding to selected node keys. The internal nodes of the representation tree are the nodes between the leaves and the root.

The trusted center generates a representation code based on the representation tree, block 1225. The trusted center assigns a value to each node of the representation tree indicating which, if any, of the children of the corresponding node in the HKT are also included in the representation tree. Being based on a binary tree, each node of the representation tree has potentially two children. Accordingly, two one-bit values can indicate for each potential child of a node whether the child nodes are included or not. Referring to FIG. 14, two numbers in parentheses are shown next to each node of the representation tree 1400. For example, next to the root is shown "(1, 1)" indicating that the left child and the right child of the root are included in the representation tree. For node $v_8$, however, the values shown are "(0, 1)" because the left child (node $v_{16}$ corresponding to revoked receiver $u_1$) is not included in the representation tree while the right child (node $v_{17}$) is included. Leaves of the representation tree have values indicating no children are included. For example, nodes $v_{17}$ and $v_9$ have values of "(0, 0)" shown in FIG. 14. The node keys corresponding to the leaves of the representation tree are the selected node keys and so the trusted center uses the node keys corresponding to the leaves to encrypt ciphertexts.

The trusted center generates the representation code by stringing together the values assigned to nodes of the representation tree. The trusted center concatenates the values progressing through the representation tree in breadth-first order. For example, referring to FIG. 14, the trusted center uses the values for nodes $v_1$, $v_2$, $v_3$, $v_4$, $v_5$, $v_6$, $v_7$, $v_8$, $v_9$, $v_{10}$, $v_{11}$, $v_{12}$, $v_{13}$, $v_{14}$, $v_{15}$, $v_{17}$, $v_{21}$, $v_{25}$, and $v_{29}$ (the other nodes of the HKT are not in the representation tree).

Accordingly, the trusted center uses the values: (1,1), (1,1), (1,1), (1,1), (1,1), (1,1), (1,1), (0,1), (0,0), (0,1), (0,0), (0,1), (0,0), (0,1), (0,0), (0,0), (0,0), (0,0), and (0,0). The resulting representation code is: 11111111111111010001000100010000000000.

The trusted center sends the representation code to each of the receivers, block 1230. A receiver can reconstruct the representation tree from the reconstruction code. As described below, using a search algorithm (e.g., a breadth-first search), the receiver locates a leaf of the representation tree corresponding to a node in the HKT on the path from the receiver's node to the root of the HKT. The receiver derives the node key for that node using the receiver's master key and uses that node key for decryption.

After generating the representation code, the trusted center encrypts data as a ciphertext using each of the selected node keys (recall block 730 in FIG. 7). Alternatively, the trusted center encrypts the ciphertexts before generating the representation code, but after selecting the subset keys. As noted above, when none of the receivers have been revoked, the trusted center uses the same node key ($NK_1$ in FIG. 1) for encrypting all the ciphertexts. The trusted center then sends the ciphertexts to all of the receivers (recall block 735 in FIG. 7). In one implementation, the trusted center encrypts a content key as a key ciphertext using each of the selected node keys and sends the key ciphertexts to the receivers (recall FIG. 8). The trusted center then encrypts a content file using the content key and sends the encrypted content file to the receivers.

Figure 15:
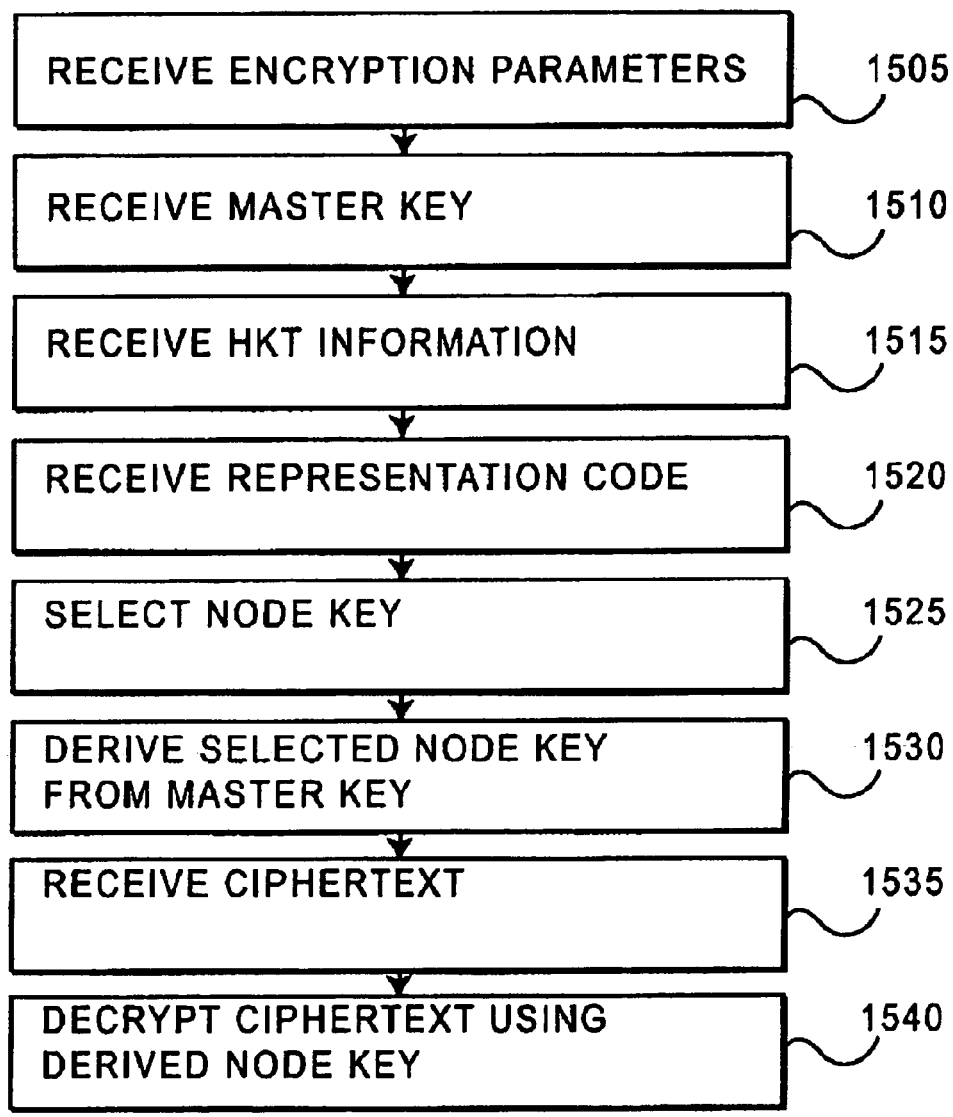
FIG. 15 is a flowchart of broadcast decryption by a receiver using an HKT and node keys.

FIG. 15 is a flowchart of broadcast decryption by a receiver using an HKT and node keys (recall FIG. 9). In one implementation, a receiver receives data and ciphertexts broadcast from a trusted center, as in the broadcast encryption system 100 shown in FIG. 1. In another implementation, a receiver receives data and ciphertexts on data media prepared by a trusted center for distribution, as in the broadcast encryption system 400 shown in FIG. 4. A receiver receives encryption parameters from a trusted center, block 1505. As described above referring to block 1020 of FIG. 10, a trusted center publishes to the receivers public encryption parameters for the receivers to use in decrypting ciphertexts from the trusted center, such as the selected primes $p_i$. In one implementation, the receiver stores the public encryption parameters in non-secure storage (e.g., main storage 225 in FIG. 2). The receiver receives a master key from the trusted center, block 1510. As described above referring to blocks 1030 and 1035 of FIG. 10, the trusted center generates a master key for the receiver and sends the master key to the receiver. The receiver uses the master key to derive node keys for decryption. The receiver also receives information about an HKT defined by the trusted center from the trusted center, block 1515. As described above referring to block 1040 of FIG. 10, a trusted center sends information indicating the number of nodes in the HKT and assignments of keys to nodes that are relevant to the receiver. In an alternative implementation, the trusted center sends some or all of the encryption parameters, the master key, and the HKT information together to the receiver. Also, as noted above referring to block 710 of FIG. 7, in one implementation, the receiver receives the encryption parameters, the master key, and the HKT information from the receiver's manufacturer rather than directly from the trusted center.

The receiver receives a representation code from the trusted center, block 1520. As described above referring to blocks 1220 and 1225 of FIG. 12, the trusted center defines a representation tree (recall FIG. 14) and generates a representation code from the representation tree.

The receiver uses the representation code to select a node key to use for decryption, block 1525. The receiver reconstructs the representation tree from the representation code. As discussed above, the representation code for the representation tree 1200 shown in FIG. 12 is: 111111111111101000100010000000000. Using the HKT information the receiver separates the representation code into the values corresponding to the nodes of the representation tree: (1,1), (1,1), (1,1), (1,1), (1,1), (1,1), (1,1), (0,1), (0,0), (0,1), (0,0), (0,1), (0,0), (0,1), (0,0), (0,0), (0,0), (0,0), and (0,0). The receiver uses the values to determine the presence or absence of child nodes in the representation tree using a breadth-first approach. For example, the first value of (1,1) corresponds to the root (node $v_1$) and indicates that the root has a left child (node $v_2$) and a right child (node $v_3$). The second value of (1,1) corresponds to node $v_2$ and indicates that node $v_2$ has a left child (node $v_4$) and a right child (node $v_5$). The receiver uses a similar pattern to complete the representation tree.

The receiver searches the reconstructed representation tree (e.g., using a breadth-first search) until the receiver finds a leaf node that corresponds to a node on the path in the HKT from the receiver's node to the root (where node $v_1$ of the representation tree corresponds to node $v_1$ of the HKT). For example, referring to the HKT 1100 in FIGS. 11 and 13 and the representation tree 1400 in FIG. 14, receiver $u_2$ finds node $v_{17}$ as a leaf and receivers $u_3$ and $u_4$ both find node $v_9$ as a leaf. If a receiver does not find a leaf node in the representation tree that corresponds to a node on the path in the HKT from the receiver's node to the root, the receiver determines that it has been revoked and cannot derive a valid node key. For example, receiver $u_1$ has been revoked and does not find a leaf on the path from the receiver's node to the root. Receiver $u_1$ corresponds to node $v_{16}$ and the path from node $v_{16}$ to the root (node $v_1$) includes nodes $v_{16}$, $v_8$, $v_4$, $v_2$, and $v_1$. None of nodes $v_{16}$, $v_8$, $v_4$, $v_2$, and $v_1$ correspond to a leaf node in the representation tree. In one implementation, the receiver confirms that the receiver has been revoked by contacting the trusted center (e.g., through a network connection).

After selecting a node key, the receiver derives the selected node key from the receiver's master key, block 1530. As described above, a node key for a node $v_i$ is denoted as $NK_i$ and a master key for a receiver $u_j$ is denoted as $MK_j$, as shown in FIG. 11. The encryption parameters received by the receiver $u_j$ include prime numbers $p_i$ and $w_j$, the product of all the primes $p_i$ assigned to nodes $v_i$ on the path from the leaf node corresponding to the receiver $u_j$ to the root node. The receiver derives a node key $NK_i$ as:

$$NK_i = MK_j^{w_j/p_i} \bmod M$$

In one implementation, the receiver pre-computes the value of $w_j/p_i$.

The receiver receives one or more ciphertexts from the trusted center through the broadcast channel of the broadcast encryption system, block 1535. In an alternative implementation, the receiver receives a ciphertext before deriving the node key, such as with the representation code in block 1520.

The receiver decrypts the received ciphertext(s) using the derived node key, block 1540. In one implementation, the receiver attempts to decrypt each of the received ciphertexts with the derived node key. The receiver recognizes whether the decrypted result is correct for the received ciphertext, such as by using checksum values. In another implementation, the receiver recognizes whether the derived node key is valid for decrypting a ciphertext and decrypts the ciphertext(s) that correspond to the derived node key. In one implementation, the receiver performs blocks 1505 through 1515 once (or until the system changes, such as when the number of receivers changes), and then repeats blocks 1520 through 1540 for each distribution of ciphertexts.

Figure 16:
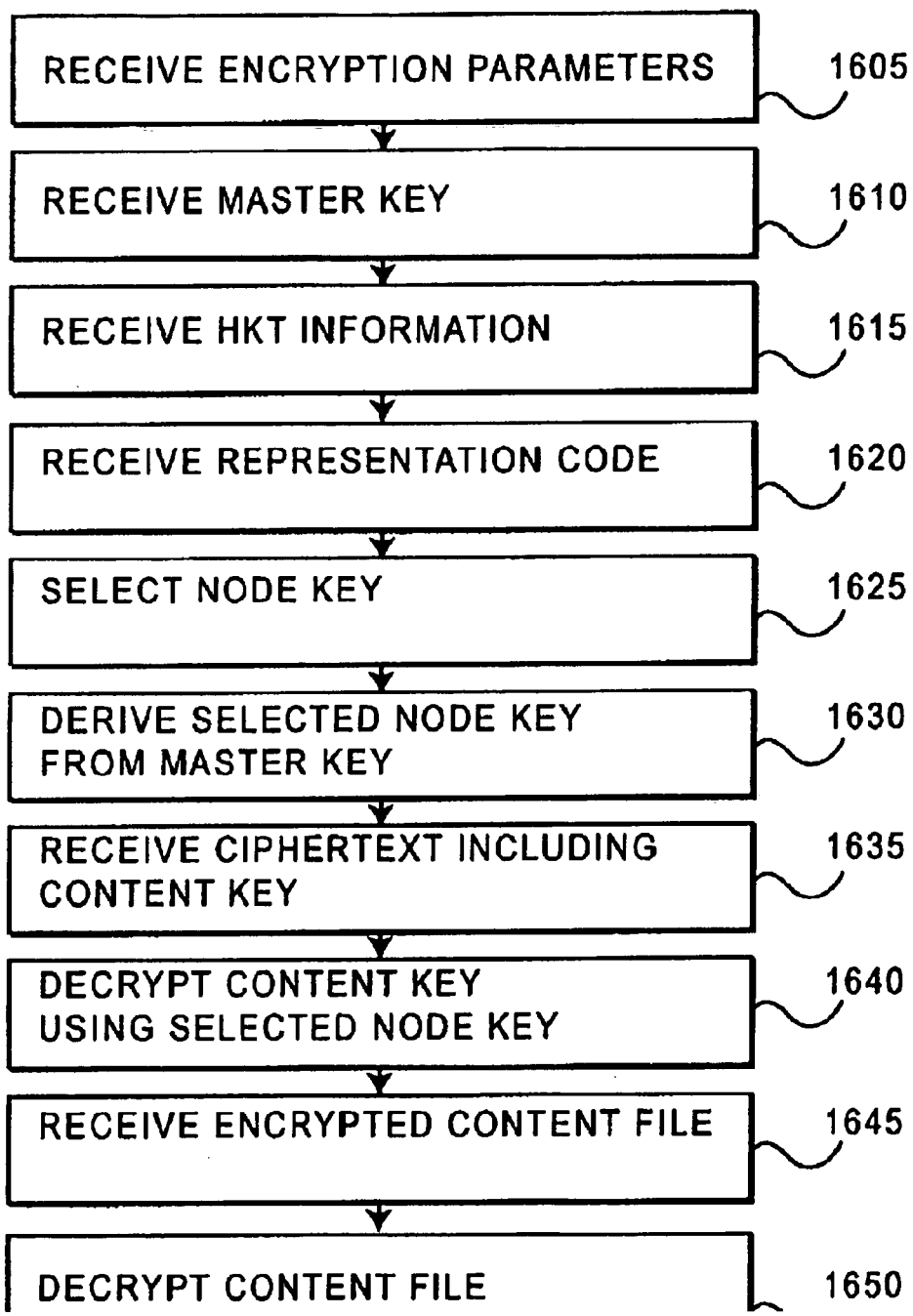
FIG. 16 is a flowchart of broadcast decryption, including decrypting a content key and a content file.

In one implementation, the receiver receives a content key as a ciphertext and also receives an encrypted content file matching the content key (recall FIG. 8). FIG. 16 is a flowchart of broadcast decryption, including decrypting a content key and a content file. Operations in FIG. 16 similar to those described above referring to FIG. 15 are performed similarly, with variations noted below. A receiver receives encryption parameters from a trusted center, block 1605. The receiver receives a master key from the trusted center, block 1610. The receiver also receives information about an HKT defined by the trusted center from the trusted center, block 1615. The receiver receives a representation code from the trusted center, block 1620. The receiver uses the representation code to select a node key to use for decryption, block 1625. After selecting a node key, the receiver derives the selected node key from the receiver's master key, block 1630.

The receiver receives one or more key ciphertexts from the trusted center through the broadcast channel of the broadcast encryption system, block 1635. Each received key ciphertext includes the same content key but is encrypted using a different node key. The receiver decrypts the received key ciphertext(s) using the derived node key, block 1640. The derived node key is only valid to decrypt one of the key ciphertexts. The decrypted key ciphertext provides the receiver with the content key (e.g., as cleartext).

The receiver receives an encrypted content file from the trusted center, block 1645. The content file has been encrypted using the content key. The receiver differentiates between the key ciphertexts and the encrypted content file such as by using header information or file size. The receiver decrypts the encrypted content file using the content key, block 1650. The receiver can then access the content file in the clear. For example, where the content file is a video file, the receiver can play the contents (recall the receivers 300 and 600 in FIGS. 3 and 6, respectively). In one implementation, the receiver performs blocks 1605 through 1615 once (or until the system changes, such as when the number of receivers changes), and then repeats blocks 1620 through 1650 for each distribution of ciphertexts.

In another implementation, the receiver is a recorder device and receives the representation code and one or more key ciphertexts stored on an article of recordable data media. The receiver derives a node key as described above, using the representation code from the data media. The receiver uses the derived node key to decrypt a content key from a key ciphertext on the data media. The receiver uses the decrypted content key to record data to the data media. If the receiver does not have a valid derived node key and so has not successfully decrypted the content key from a key ciphertext recorded on the data media, the receiver does not record data to the data media. The trusted center and receivers can also use this recording technique in an implementation using subset keys, as described below.

As described above, the trusted center generates node keys and uses these node keys for encryption. Similarly, the receivers receive node keys from the trusted center and use these node keys for decryption. In an alternative implementation, the trusted center provides the node keys to a hash function to obtain a hash key and uses the hash key for encryption. The hash function maps elements randomly distributed over the space of the node keys to randomly distributed strings that are the length of the hash key. In this way the trusted center can use a hash function to adjust the size of the node key to the size of the key for the encryption algorithm. For example, in one implementation, a node key has 1024 bits and the encryption algorithm uses 128-bit keys. The hash function provides the conversion. One example of a hash function is MD5 (see, e.g., "Handbook of Applied Cryptography" by A. J. Menezes, P. C. van Oorschot, and S. A. Vanstone, CRC Press, 1997, at page 347; see also D. Naor, M. Naor, and J. Lotspiech, "Revocation and Tracing Schemes for Stateless Receivers," Advances in Cryptology—Crypto 2001, Lecture Notes in Computer Science 2139, Springer, 2001, and M. Naor and O. Reingold, "Number-Theoretic Constructions of Efficient Pseudo-Random Functions," Proceedings of 38$^{th}$ IEEE Symposium on Foundations of Computer Science, 1997, pp 458-467; these disclosures are hereby incorporated herein by reference). The receivers also use the hash function to convert a derived node key to a hash key for decryption. The trusted center and receivers can also use this hashing technique in an implementation using subset keys, as described below.

Hierarchical Key Tree with Subset Keys

In one implementation of a broadcast encryption system including a trusted center and N receivers, such as the systems 100, 400 shown in FIGS. 1 and 4, the trusted center uses a hierarchical key tree ("HKT") and subset keys. In this implementation, the subset keys are the sub keys described above. Applying the process of FIGS. 7 and 9 to this implementation is described below.

Figure 17:
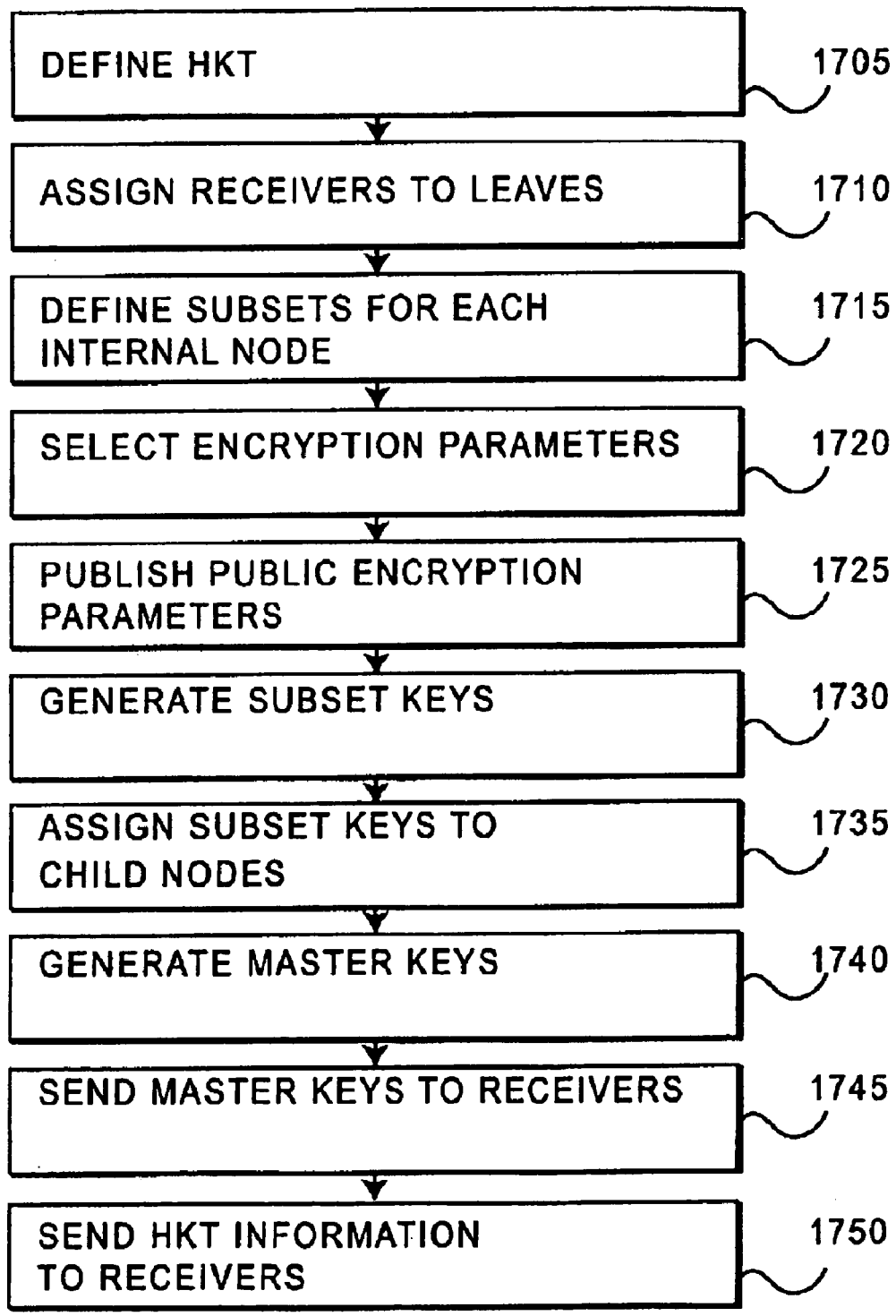
FIG. 17 is a flowchart of setting up the broadcast encryption system using an HKT with subsets and subset keys and assigning master keys to the receivers.
Figure 18:
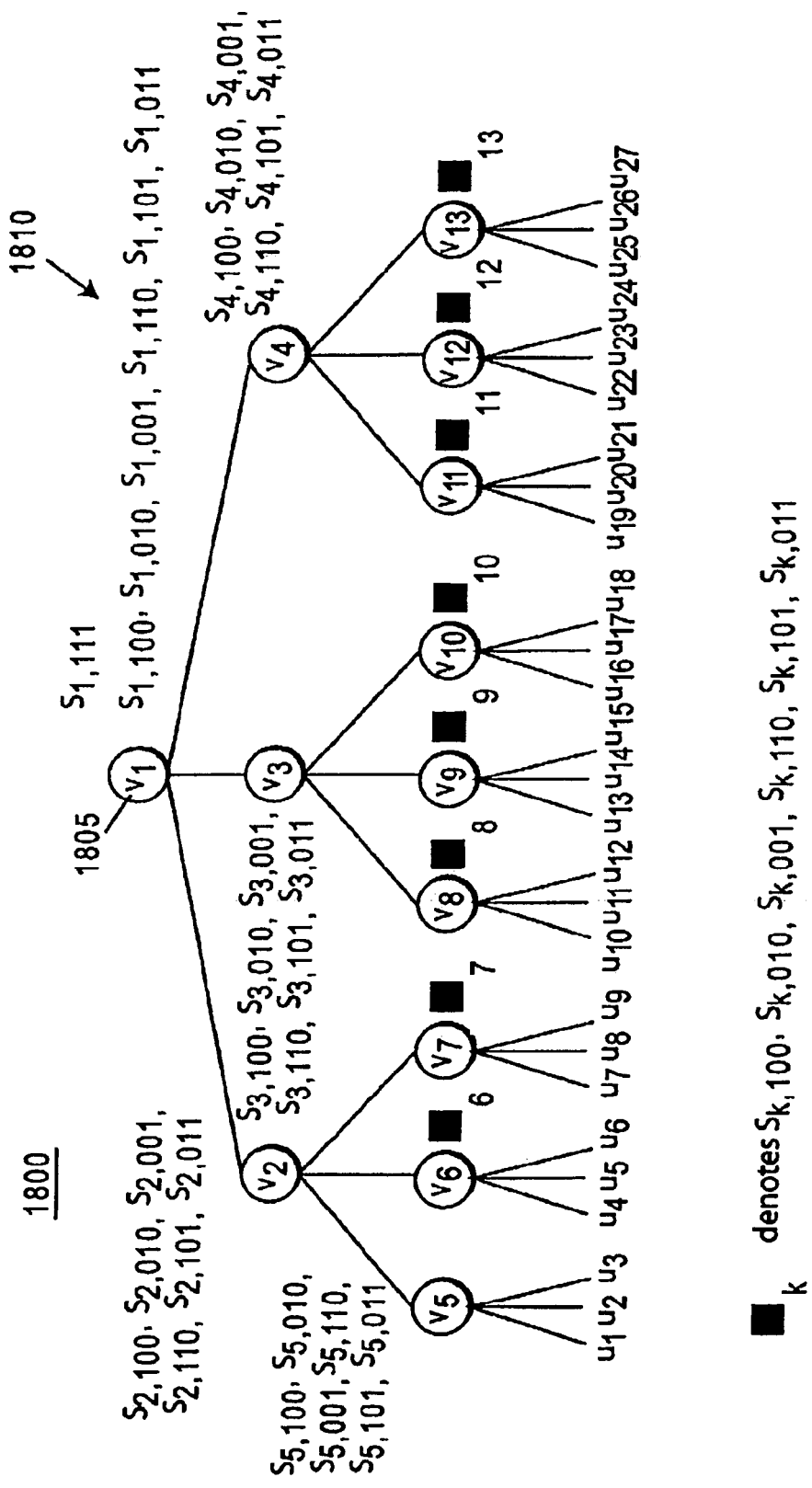
FIG. 18 is a diagram of an HKT showing the assignment of subsets to nodes.
Figure 19:
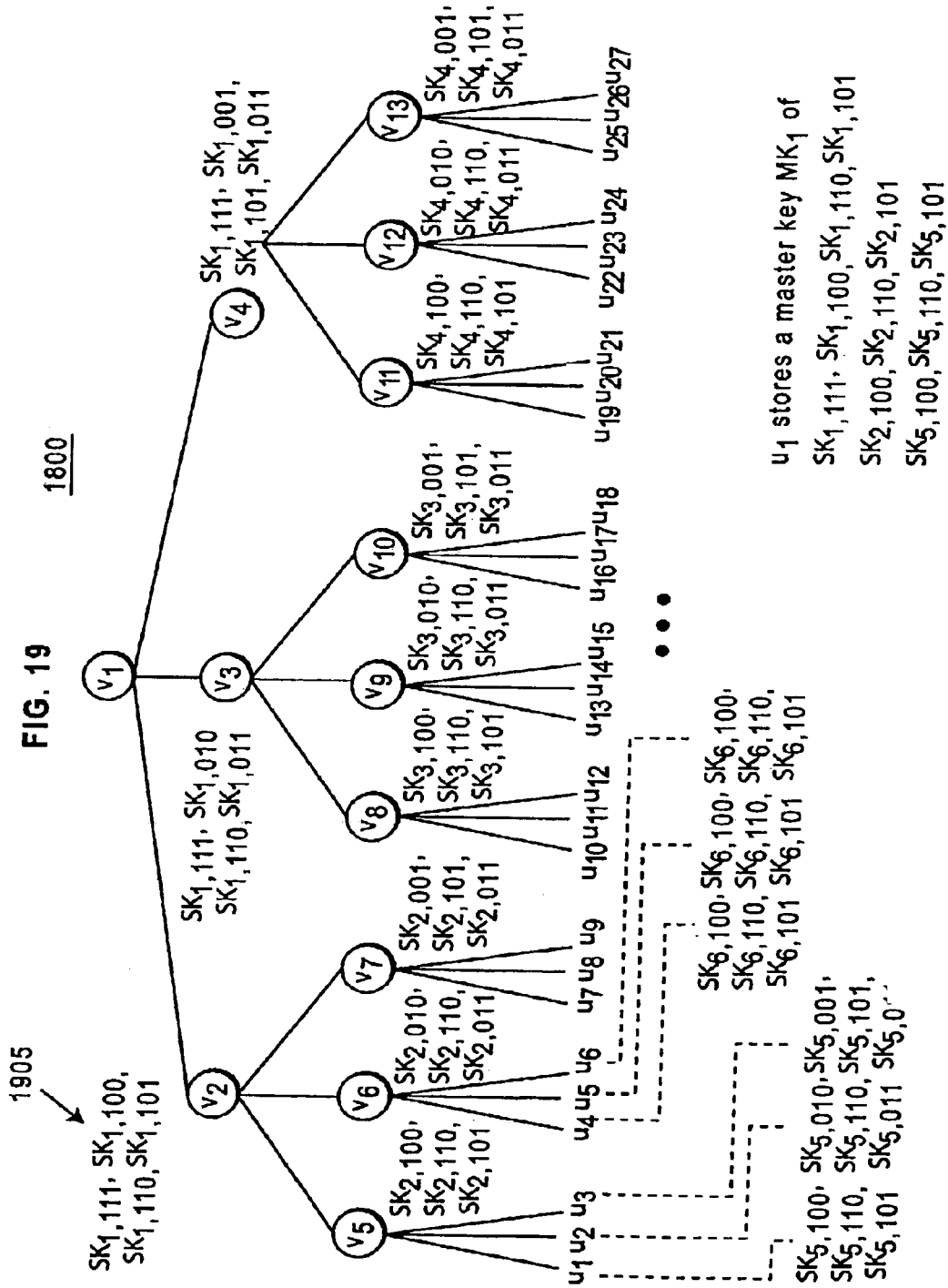
FIG. 19 is a diagram of the HKT shown in FIG. 18 showing the assignment of subset keys to nodes.

FIG. 17 is a flowchart of setting up the broadcast encryption system using an HKT with subsets and subset keys and assigning master keys to the receivers (recall blocks 705 and 710 in FIG. 7). FIG. 18 is a diagram of an HKT 1800 showing the assignment of subsets 1805 to nodes 1810, where the HKT 1800 is a tree of order 3 for a group of 27 receivers. FIG. 19 is a diagram of the HKT 1800 shown in FIG. 18 showing the assignment of subset keys 1905 to nodes 1810. Subsets and subsets keys are described below.

The trusted center defines an HKT, block 1705. The HKT is a rooted full a-ary tree with N leaves and $$\frac{N-1}{a-1} + N$$

nodes, including the leaves, the root, and internal nodes. An internal node is denoted as $v_k$ (k=1, ... , $$v_k\left(k = 1, \ldots, \frac{N-1}{a-1}\right),$$

as in FIG. 18. If N is not a power of a, the trusted center defines an HKT with a number of leaves equal to the next power of a above N. The trusted center assigns each receiver to a respective leaf, block 1710. A receiver is denoted as $u_j$ (j=1, ... , N), as in FIG. 18. If N is not a power of a, "virtual" receivers are assumed to correspond to the extra leaves (as virtual entities, the virtual receivers would not need to be later revoked).

The trusted center defines subsets for each internal node of the HKT, block 1715. The trusted center defines $2^a-2$ subsets for each internal node $v_k$. A subset has a values and is denoted as $S_{k,b_1 b_2 \ldots b_i \ldots b_a}$, where $b_i \in \{0,1\}$, $$\sum_{i=1}^{a} b_i \neq 0 \text{ and } \sum_{i=1}^{a} b_i \neq a.$$

k indicates to which internal node $v_k$ the subset corresponds and $b_1 b_2 \ldots b_i \ldots b_a$ indicates the a values included in the subset. The values of a subset indicate child nodes of the internal node corresponding to the subset and, as described below, are used to indicate which subset keys have been selected for use in encryption. The trusted center also defines a subset $S_{1,11 \ldots 1}$ for the root (node $v_1$). FIG. 18 shows the assignment of subsets to internal nodes. For example, the trusted center has assigned to node $v_2$ subsets $S_{2,100}$, $S_{2,010}$, $S_{2,001}$, $S_{2,110}$, $S_{2,101}$, and $S_{2,011}$.

The trusted center selects encryption parameters, block 1720. The trusted center uses the encryption parameters to generate values for encryption, such as keys. Some of the encryption parameters are public and the trusted center publishes the public encryption parameters, block 1725. The trusted center publishes the public encryption parameters by sending the public encryption parameters to each of the receivers, for example. The trusted center keeps the remaining secret encryption parameters secret from the receivers.

The trusted center selects two large primes $q_1$ and $q_2$ and generates a value M as $M=q_1q_2$. The trusted center publishes M as a public encryption parameter. The trusted center randomly selects a value K, where $K \in Z^*_M$, as a secret encryption parameter. The trusted center also selects $$(2^a - 2)\frac{N-1}{a-1} + 1$$

primes $p_{k,b_1b_2\ldots b_i\ldots b_a}$, where $b_i \in \{0,1\}$, $$\sum_{i=1}^{a} b_i \neq 0$$

for all k and $$\sum_{i=1}^{a} b_i \neq a \text{ for } k \neq 1.$$

The trusted center assigns each prime $p_{k,b_1b_2\ldots b_i\ldots b_a}$ to a corresponding subset $S_{k,b_1b_2\ldots b_i\ldots b_a}$ (e.g., $p_{1,100}$ is assigned to $S_{1,100}$), and publishes the primes $p_{k,b_1b_2\ldots b_i\ldots b_a}$ and assignments. The trusted center generates a value T as $T = \Pi_{k,b_1b_2\ldots b_i\ldots b_a} p_{k,b_1b_2\ldots b_i\ldots b_a}$. The trusted center does not publish T.

The trusted center generates subset keys using the encryption parameters, block 1730. A subset key is denoted as $SK_{k,b_1b_2\ldots b_i\ldots b_a}$, as shown in FIG. 19. The trusted center generates a subset key $SK_{k,b_1b_2\ldots b_i\ldots b_a}$ for each subset $S_{k,b_1b_2\ldots b_i\ldots ba}$ as:

$$SK_{k,b_1b_2\ldots b_i\ldots b_a} = K^{T/p_{k,b_1b_2\ldots b_i\ldots b_a}} \bmod M$$

The trusted center assigns each subset key $SK_{k,b_1b_2\ldots b_i\ldots b_a}$ to a corresponding subset $S_{k,b_1b_2\ldots b_i\ldots ba}$.

The trusted center also assigns each subset key to a child node of an internal node, block 1735. The values of a subset indicate child nodes of the internal node corresponding to the subset. The trusted center assigns a subset key to each child node of the subset's internal node for which the subset has a value of 1. FIG. 19 illustrates the assignment of subset keys to child nodes. For example, as shown in FIGS. 18 and 19, the subset $S_{1,111}$ corresponds to the root (node $v_1$) and the subset key $SK_{1,111}$ is assigned to each of the child nodes of the root (nodes $v_2, v_3, v_4$). Subset key $SK_{1,001}$ is assigned only to the right child node of the root (node $v_4$). Accordingly, the trusted center assigns $2^{a-1}$ subset keys to each child node (and also assigns $SK_{1,11\ldots 1}$ to each of the child nodes of the root).

An additional parameter generated by the trusted center is a value $w_j$ for each receiver $u_j$. $w_j$ is the product of all the primes $p_{k,b_1b_2\ldots b_i\ldots b_a}$ assigned to subsets $S_{k,b_1b_2\ldots b_i\ldots ba}$ that are assigned to an internal node $v_k$ and that correspond to a subset key $SK_{k,b_1b_2\ldots b_i\ldots b_a}$ assigned to a child node (as described below) on the path from the node of the receiver $u_j$ to the root node. For example, referring to the HKT 1800 in FIG. 18, $w_1$ corresponds to us and is the product of the primes assigned to the subsets assigned to each of nodes $v_5, v_2$, and $v_1$ which have $b_1=1$. Accordingly, $w_1 = p_{5,100}p_{5,110}p_{5,101}p_2,100p_{2,110}p_{2,101}p_{1,100}p_{1,110}p_{1,101}p_{1,111}$. Alternatively, the trusted center does not provide $w_j$ as a parameter but instead the receivers derive $w_j$ from the primes $p_{k,b_1b_2\ldots b_i\ldots b_a}$.

The trusted center generates master keys using the encryption parameters, block 1740. A master key is denoted as $MK_j$, as shown in FIG. 19. The trusted center generates a master key $MK_j$ for each receiver $u_j$ as:

$$MK_j = K^{T/w_j} \bmod M$$

The trusted center assigns each master key $MK_j$ to a corresponding receiver $u_j$. A master key $MK_j$ can be used to derive any of the subset keys $SK_{k,b_1b_2\ldots b_i\ldots b_a}$ corresponding to the leaf node corresponding to the receiver $u_j$ or to internal nodes $v_k$ on the path from the leaf node corresponding to the receiver $u_j$ to the root node. For example, referring to the HKT 1800 in FIG. 19, $u_1$ is assigned master key $MK_1$ and can use $MK_1$ to derive subset keys $SK_{5,100}, SK_{5,110}, SK_{5,101}, SK_{2,100}, SK_{2,110}, SK_{2,101}, SK_{1,100}, SK_{1,110}, SK_{1,101},$ and $SK_{1,111}$. The subset key $SK_{1,11\ldots 1}$ can be derived by all the master keys $MK_j$ for when none of the receivers $u_j$ have been revoked. The trusted center sends each master key $MK_j$ to a corresponding receiver $u_j$, block 1745.

The trusted center sends information about the HKT to each receiver, block 1750. The trusted center sends information indicating the structure of the HKT (e.g., the number of nodes in the HKT) and assignments that are relevant to a receiver (e.g., assignments of subset keys and subsets to nodes). As described above, the trusted center publishes public encryption parameters, such as the primes $p_{k,b_1b_2\ldots b_i\ldots b_a}$ and to which internal nodes $v_k$ the primes $p_{k,b_1b_2\ldots b_i\ldots b_a}$ correspond. The trusted center also sends information indicating to which internal node $v_k$ each subset $S_{k,b_1b_2\ldots b_i\ldots b_a}$ has been assigned, and to which internal nodes $v_k$ or leaves the subset keys $SK_{k,b_1b_2\ldots b_i b_a}$ that can be derived from the receiver's master key $MK_j$ have been assigned.

As noted above referring to block 710 of FIG. 7, in an alternative implementation, the trusted center provides the master keys to manufacturers of receivers and the manufacturers provide the master keys to receivers. In this case, the trusted center also provides the public encryption parameters and the HKT information to the receivers through the manufacturers.

Figure 20:
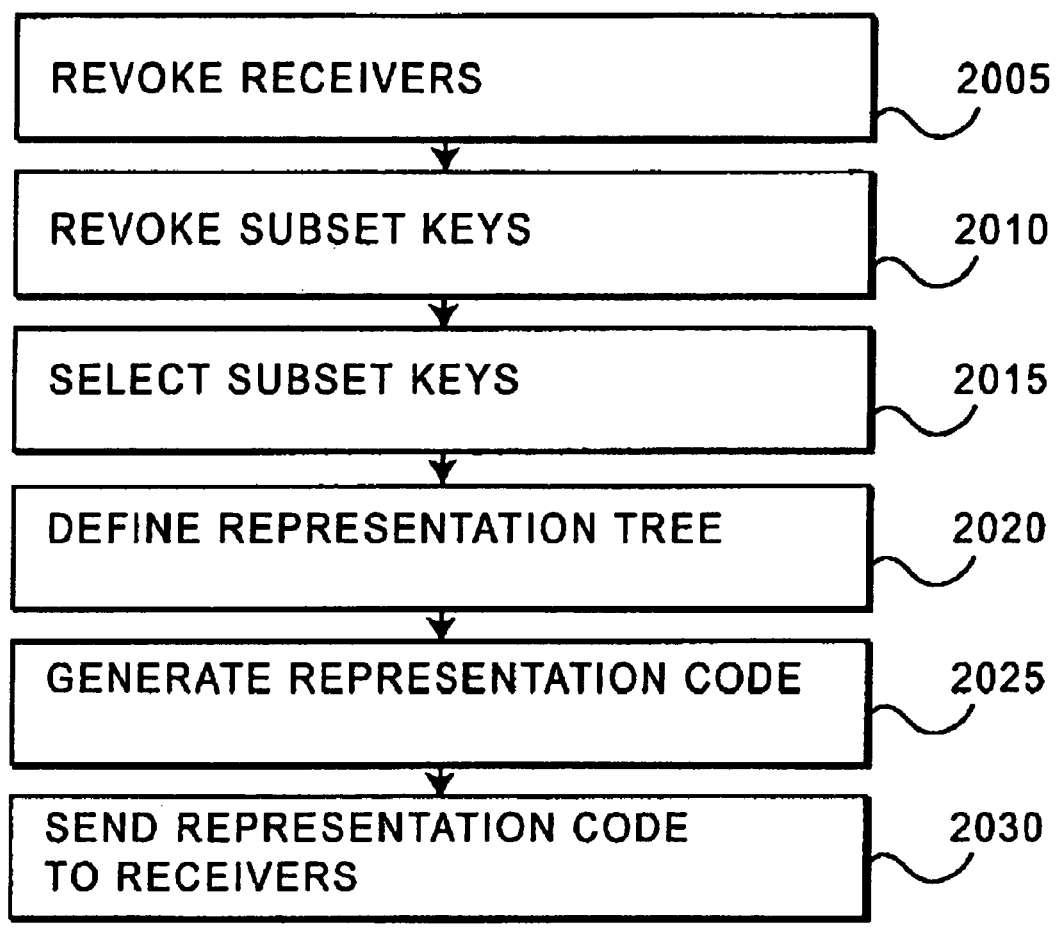
FIG. 20 is a flowchart of revoking receivers, selecting subset keys, and generating a representation code using an HKT.
Figure 21:
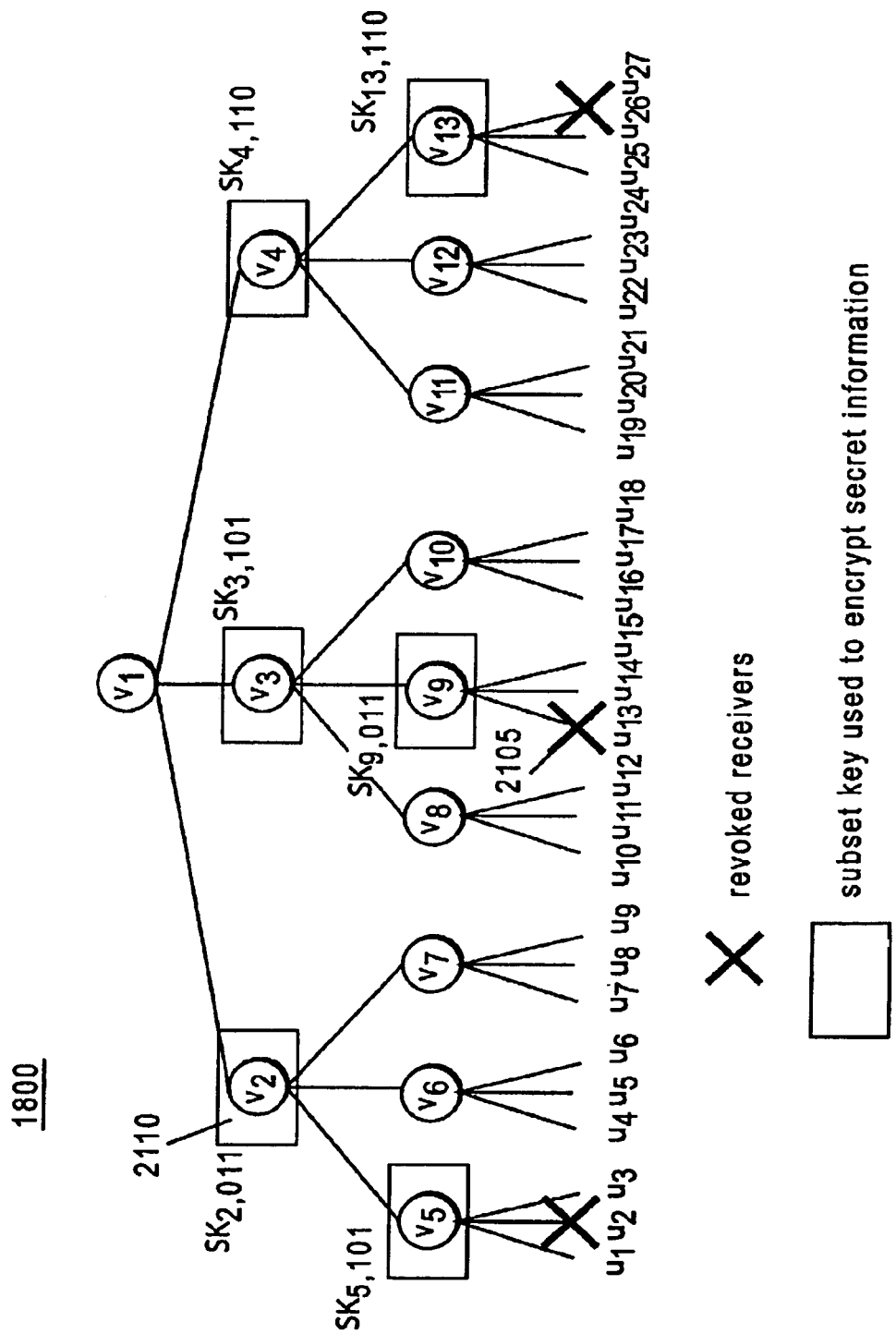
FIG. 21 is a diagram of the HKT shown in FIG. 18 indicating nodes of revoked receivers and nodes of subsets corresponding to selected subset keys.

FIG. 20 is a flowchart of revoking receivers, selecting subset keys, and generating a representation code using an HKT (recall blocks 715, 720, and 725 in FIG. 7). FIG. 21 is a diagram of the HKT 1800 shown in FIG. 18 indicating nodes of revoked receivers 2105 and nodes of subsets corresponding to selected subset keys 2110. The trusted center revokes one or more receivers, block 2005. The trusted center revokes or invalidates a receiver when that receiver is no longer to be authorized to decrypt the ciphertexts being sent from the trusted center. For example, the trusted center revokes a receiver that has not paid a required fee or whose license has become invalid. In FIG. 21, revoked receivers 2105 are indicated by having an "X" through the corresponding node of the HKT 1800. The trusted center has revoked receivers $u_2, u_{13},$ and $u_{27}$. Receivers $u_1, u_3\text{-}u_{12},$ and $u_{14}\text{-}u_{26}$ are unrevoked receivers.

The trusted center revokes the subset keys that can be derived from master keys assigned to revoked receivers, block 2010. For example, in FIG. 13, the trusted center has revoked receiver $u_2$ and master key $MK_2$ has been assigned to $u_2$. Receiver $u_2$ can use master key $MK_2$ to derive subset keys $SK_{5,010}, SK_{5,110}, SK_{5,011}, SK_{2,100}, SK_{2,110}, SK_{2,101}, SK_{1,100}, SK_{1,110}, SK_{1,101},$ and $SK_{1,111}$. Accordingly, the trusted center revokes subset keys $SK_{5,010}$, $SK_{5,110}$, $SK_{5,011}$, $SK_{2,100}$, $SK_{2,110}$, $SK_{2,101}$, $SK_{1,100}$, $SK_{1,110}$, $SK_{1,101}$, and $SK_{1,111}$.

For each master key of an unrevoked receiver, the trusted center selects the subset key that can be derived by that master key and by the most other master keys but cannot be derived by a master key corresponding to a revoked receiver, block 2015. Referring to the HKT, the trusted center selects the unrevoked subset keys corresponding to subsets that indicate the most child nodes that have corresponding unrevoked subset keys (recall that subsets are assigned to internal nodes, as in FIG. 18, and subset keys are assigned to child nodes, as in FIG. 19).

Figure 22:
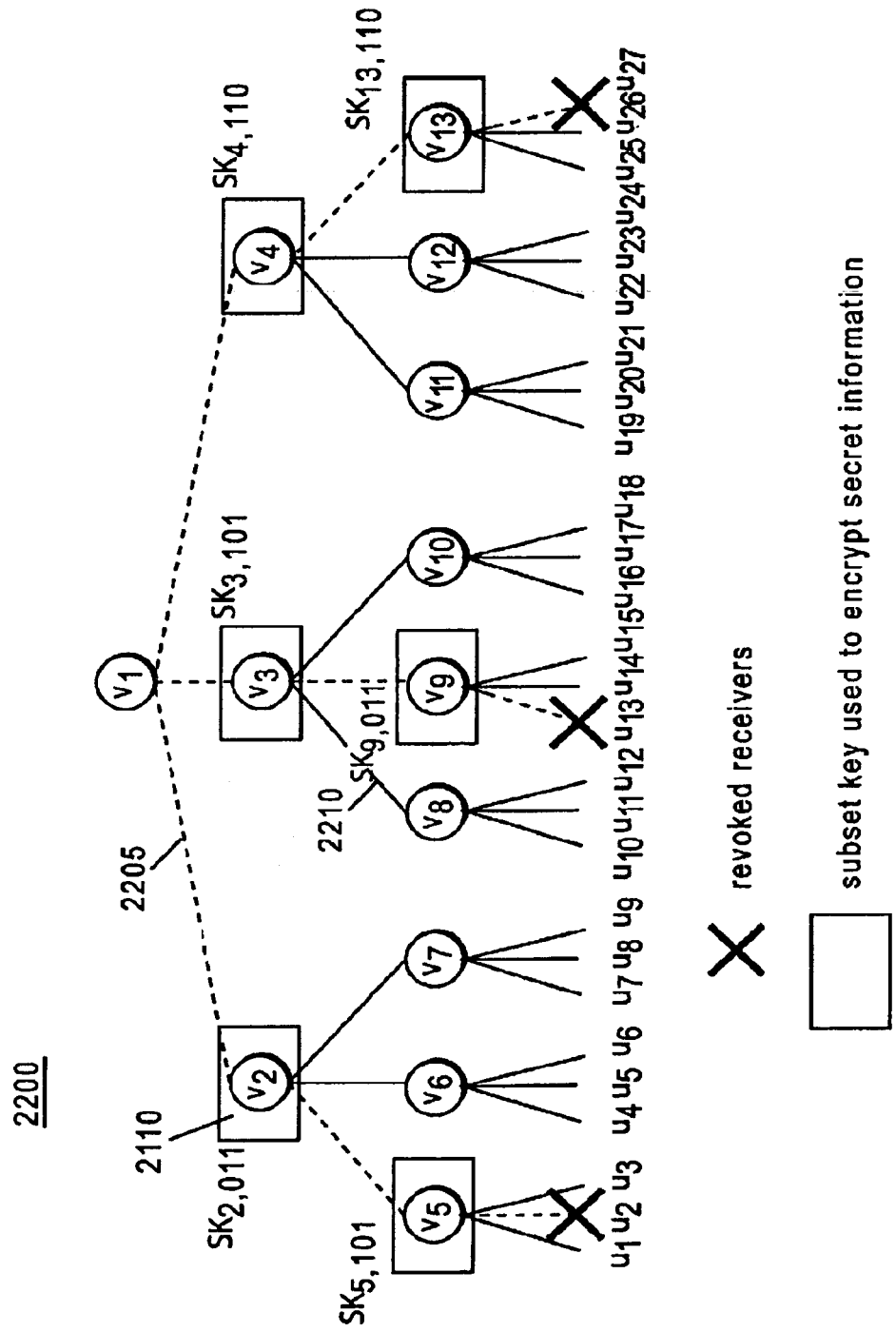
FIG. 22 is a diagram of a tree based on the HKT shown in FIG. 18 with edges removed.

In another approach, the trusted center removes edges on the path from a leaf corresponding to a revoked receiver to the root. Removing the edges leaves one or more disjoint sub-trees (one or more of which may only have a single edge). FIG. 22 is a diagram of a tree 2200 based on the HKT 1800 shown in FIG. 18 with edges removed. Removed edges 2205 are indicated by dashed lines. Remaining edges 2210 are indicated by solid lines. The trusted center selects the subset keys corresponding to the subsets that correspond to nodes that are the roots of these sub-trees and that indicate the child nodes included in the sub-tree. For example, in FIG. 22, internal node $v_5$ is the root of a sub-tree. Node $v_5$ has three child nodes. The subset keys for the left and right child nodes have not been revoked and the subset keys for the middle child node have been revoked. The subset $S_{5,101}$, indicates the left and right child nodes of node $v_5$, and so the trusted center selects the corresponding subset key $SK_{5,101}$. In FIGS. 21 and 22, the nodes corresponding to selected subset keys 2110 are indicated by squares around the nodes corresponding to the selected subset keys. Accordingly, the trusted center has selected subset keys $SK_{2,011}$, $SK_{3,101}$, $SK_{4,110}$, $SK_{5,101}$, $SK_{9,011}$, and $SK_{13,110}$.

Figure 23:
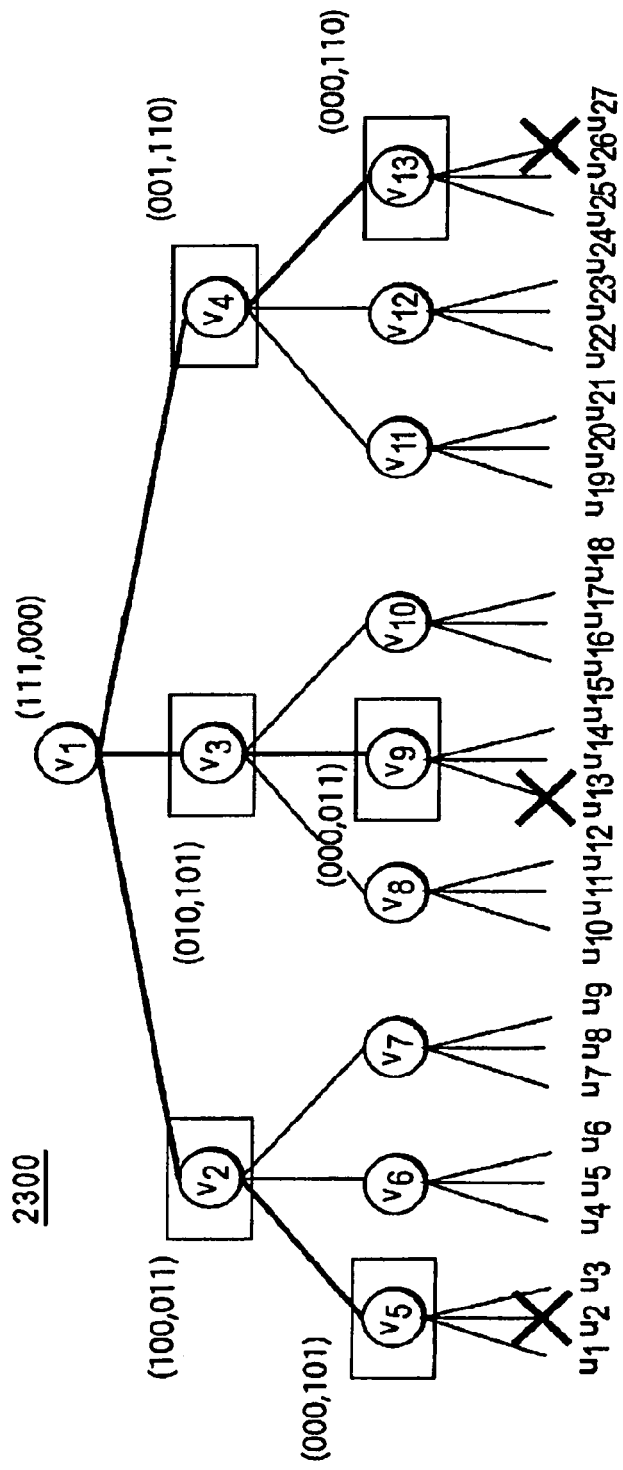
FIG. 23 is a diagram of a representation tree based on the HKT shown in FIGS. 18 and 21.

The trusted center defines a representation tree based on the HKT and the revoked receivers, block 2020. FIG. 23 is a diagram of a representation tree 2300 based on the HKT 1800 shown in FIGS. 18 and 21. Heavy or thick edges in FIG. 23 indicate edges that are part of the representation tree 2300. Light edges are not part of the representation tree 2300. Revoked receivers 2105 and selected subset keys 2110 are indicated as in FIG. 21. The representation tree is rooted at the root of the corresponding HKT. The leaves of the representation tree are nodes corresponding to subsets that correspond to selected subset keys. The internal nodes of the representation tree are the nodes between the leaves and the root.

The trusted center generates a representation code based on the representation tree, block 2025. The trusted center assigns two values to each node of the representation tree. The trusted center assigns a child value indicating which, if any, of the children of the corresponding node in the HKT are also included in the representation tree. The trusted center assigns a subset value indicating which, if any, subset corresponding to the node has a corresponding subset key that has been selected. Being based on an a-ary tree, each node of the representation tree has potentially a children. Accordingly, the trusted center uses a one-bit values to indicate a child value. Similarly, each subset has a values and so the trusted center uses atone-bit values to indicate a subset value. Referring to FIG. 23, two numbers in parentheses are shown next to each node of the representation tree 2300 in the pattern "(<child value>, <subset value>)." For example, next to the root is shown "(111, 000)." "111" is the child value and indicates that the left, middle, and right child of the root are included in the representation tree. "000" is the subset value and indicates that no subset key corresponding to one of the subsets for the root has been selected. For node $v_2$, the values shown are "(100, 011)." The child value of "100" indicates the left child (node $v_5$) is included in the representation tree 2300 while the middle and right child nodes (nodes $v_6$ and $v_7$) are not included. The subset value of "011" indicates that the subset key corresponding to the subset having values 011 has been selected (i.e., $SK_{2,011}$). Leaves of the representation tree have values indicating no children are included. For example, nodes $v_5$ and $v_9$ have values of "(000, 101)" and "(000, 011)," respectively, shown in FIG. 23. Accordingly, the representation tree includes nodes $v_1$, $v_2$, $v_3$, $v_4$, $v_5$, $v_9$, and $v_{13}$, and indicates that subset keys $SK_{2,011}$, $SK_{3,101}$, $SK_{4,110}$, $SK_{5,101}$, $SK_{9,011}$, and $SK_{13,110}$ have been selected by the trusted center.

The trusted center generates the representation code by stringing together the values assigned to nodes of the representation tree. The trusted center concatenates the values progressing through the representation tree in breadth-first order. For example, referring to FIG. 23, the trusted center uses the values for nodes $v_1$, $v_2$, $v_3$, $v_4$, $v_5$, $v_9$, and $v_{13}$ (the other nodes of the HKT are not in the representation tree). Accordingly, the trusted center uses the values: (111,000), (100,011), (010,101), (001,110), (000,101), (000,011), and (000,110). The resulting representation code is: 111000100011010101001110000101000011000110.

The trusted center sends the representation code to each of the receivers, block 2030. A receiver can reconstruct the representation tree from the reconstruction code. As described below, using a search algorithm based on the subset values in the representation tree, the receiver locates a node of the representation tree corresponding to a node in the HKT on the path from the receiver's node to the root of the HKT that has a corresponding subset that in turn has a corresponding subset key that can be derived by the master key of the receiver. The receiver derives that subset key using the receiver's master key and uses that subset key for decryption.

After generating the representation code, the trusted center encrypts data as a ciphertext using each of the selected subset keys (recall block 730 in FIG. 7). Alternatively, the trusted center encrypts the ciphertexts before generating the representation code, but after selecting the subset keys. As noted above, when none of the receivers have been revoked, the trusted center uses the same subset key ($SK_{1,11\ldots1}$ in FIG. 19) for encrypting all the ciphertexts. The trusted center then sends the ciphertexts to all of the receivers (recall block 735 in FIG. 7). In one implementation, the trusted center encrypts a content key as a key ciphertext using each of the selected subset keys and sends the key ciphertexts to the receivers (recall FIG. 8). The trusted center then encrypts a content file using the content key and sends the encrypted content file to the receivers.

Figure 24:
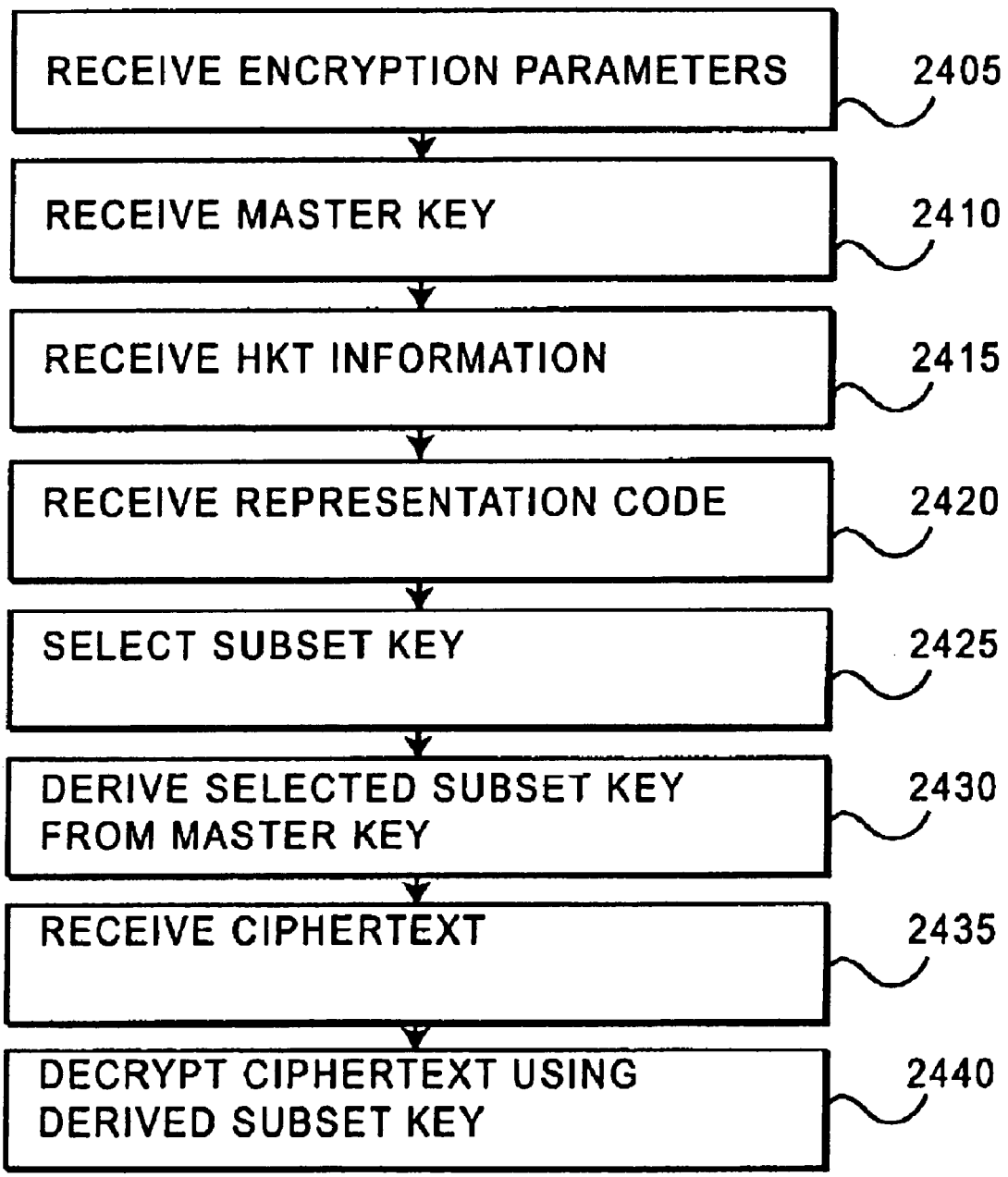
FIG. 24 is a flowchart of broadcast decryption by a receiver using an HKT and subset keys.

FIG. 24 is a flowchart of broadcast decryption by a receiver using an HKT and subset keys (recall FIG. 9). In one implementation, a receiver receives data and, ciphertexts broadcast from a trusted center, as in the broadcast encryption system 100 shown in FIG. 1. In another implementation, a receiver receives data and ciphertexts on data media prepared by a trusted center for distribution, as in the broadcast encryption system 400 shown in FIG. 4. A receiver receives encryption parameters from a trusted center, block 2405. As described above referring to block 1720 of FIG. 17, a trusted center publishes to the receivers public encryption parameters for the receivers to use in decrypting ciphertexts from the trusted center, such as the assignment of primes $p_{k,b_1 b_2 \ldots b_i \ldots b_a}$ to subsets $S_{k,b_1 b_2 \ldots b_i \ldots b_a}$. In one implementation, the receiver stores the public encryption parameters in non-secure storage (e.g., main storage 225 in FIG. 2). The receiver receives a master key from the trusted center, block 2410. The receiver stores the master key in secure storage. As described above referring to blocks 1740 and 1745 of FIG. 17, the trusted center generates a master key for the receiver and sends the master key to the receiver. The receiver uses the master key to derive subset keys for decryption. The receiver also receives information about an HKT defined by the trusted center from the trusted center, block 2415. As described above referring to block 1750 of FIG. 17, a trusted center sends information indicating the structure of the HKT and assignments that are relevant to the receiver. In an alternative implementation, the trusted center sends some or all of the encryption parameters, the master key, and the HKT information together to the receiver. Also, as noted above referring to block 710 of FIG. 7, in one implementation, the receiver receives the encryption parameters, the master key, and the HKT information from the receiver's manufacturer rather than directly from the trusted center.

The receiver receives a representation code from the trusted center, block 2420. As described above referring to blocks 2020 and 2025 of FIG. 20, the trusted center defines a representation tree (recall FIG. 23) and generates a representation code from the representation tree.

The receiver uses the representation code to select a subset key to use for decryption, block 2425. The receiver reconstructs the representation tree from the representation code. As discussed above, the representation code for the representation tree 2300 shown in FIG. 23 is: 111000100011010101001110000101000011000110. Using the HKT information the receiver separates the representation code into the values corresponding to the nodes of the representation tree: (111,000), (100,011), (010,101), (001,110), (000,101), (000,011), and (000,110). The receiver uses the values to determine the presence or absence of child nodes in the representation tree using a breadth-first approach. For example, the first value of (111,000) corresponds to the root (node $v_1$) and the child value of 111 indicates that the root has a left child (node $v_2$), a middle child (node $v_3$), and a right child (node $v_4$). The second value of (100,011) corresponds to node $v_2$ and indicates that node $v_2$ has a left child (node $v_5$), but no middle or right child. The receiver uses a similar pattern to complete the representation tree. The subset values indicate which, if any, subset key has been selected for each node.

The receiver searches the reconstructed representation tree (e.g., using a breadth-first search) until the receiver finds a subset that corresponds to an internal node $v_k$ and that corresponds to a subset key assigned to a child node on the path in the HKT from the node of the receiver to the root (where node $v_1$ of the representation tree corresponds to node $v_1$ of the HKT). As described above, the trusted center assigns each subset to a node in the HKT (recall FIG. 18) and each subset has a corresponding subset key. The trusted center uses the subsets' values to assign each subset key to one or more child nodes of the node corresponding to the subset that corresponds to that subset key (recall FIG. 19). The receiver uses the assignment of subset keys to child nodes to determine which subset key indicated by the representation tree to use for decryption. The receiver searches in the representation tree for a subset key that corresponds to a node in the HKT that is one the path from the leaf node of the receiver to the root. For example, referring to the HKT 1800 in FIGS. 18, 19, and 21 and the representation tree 2300 in FIG. 23, receiver $u_1$ finds subset key $SK_{5,101}$ as a selected subset key corresponding to a node on the path from the leaf node of the receiver to the root in the HKT 1800. The path for receiver $u_1$ includes the leaf node of receiver $u_1$ and the nodes $v_5$, $v_2$, and $v_1$. Subset key $SK_{5,101}$ corresponds to the leaf node of receiver $u_1$ and so subset key corresponds to a node on the path for receiver $u_1$.

Similarly, receiver $u_3$ finds subset key $SK_{5,101}$ as a selected subset key because subset key $SK_{5,101}$ also corresponds to the leaf node of receiver $u_3$. Receivers $u_4$ through $u_9$ find subset key $SK_{2,011}$. If a receiver does not find a subset key in the representation tree that corresponds to a node on the path in the HKT from the receiver's leaf node to the root, the receiver determines that it has been revoked and cannot derive a valid subset key. For example, receiver $u_2$ has been revoked and does not find a subset key corresponding to a node on the path from the leaf node of receiver $u_2$ node to the root. The path for receiver $u_2$ includes the leaf node of receiver $u_2$ and nodes $v_5$, $v_2$, and $v_1$. None of these nodes correspond to a subset key in the representation tree. In one implementation, the receiver confirms that the receiver has been revoked by contacting the trusted center (e.g., through a network connection).

After selecting a subset key, the receiver derives the selected subset key from the receiver's master key, block 2430. As described above, a subset key is denoted as $SK_{k,b_1 b_2 \ldots b_i \ldots b_a}$ and a master key for a receiver $u_j$ is denoted as $MK_j$, as shown in FIG. 11. The encryption parameters received by the receiver $u_j$ include prime numbers $p_{k,b_1 b_2 \ldots b_i \ldots b_a}$ and $w_j$, the product of all the primes $p_{k,b_1 b_2 \ldots b_i \ldots b_a}$ assigned to subsets $S_{k,b_1 b_2 \ldots b_i \ldots b_a}$ that are assigned to an internal node $v_k$ and that correspond to a subset key $SK_{k,b_1 b_2 \ldots b_i \ldots b_a}$ assigned to a child node on the path from the node of the receiver $u_j$ to the root node. Alternatively, the receiver does not receive $w_j$ but instead derives $w_j$ from the primes $p_{k,b_1 b_2 \ldots b_i \ldots b_a}$. The receiver derives a subset key $SK_{k,b_1 b_2 \ldots b_i \ldots b_a}$ as:

$$SK_{k,b_1 b_2 \ldots b_i \ldots b_a} = MK_j^{w_j / p_{k,b_1 b_2 \ldots b_i \ldots b_a}} \mod M$$

In one implementation, the receiver pre-computes the value of $w_j / p_{k,b_1 b_2 \ldots b_i \ldots b_a}$.

The receiver receives one or more ciphertexts from the trusted center through the broadcast channel of the broadcast encryption system, block 2435. In an alternative implementation, the receiver receives a ciphertext before deriving the subset key, such as with the representation code in block 2420.

The receiver decrypts the received ciphertext(s) using the derived subset key, block 2440. In one implementation, the receiver attempts to decrypt each of the received ciphertexts with the derived subset key. The receiver recognizes whether the decrypted result is correct for the received ciphertext, such as by using checksum values. In another implementation, the receiver recognizes whether the derived subset key is valid for decrypting a ciphertext and decrypts the ciphertext(s) that correspond to the derived subset key. In one implementation, the receiver performs blocks 2405 through 2415 once (or until the system changes, such as when the number of receivers changes), and then repeats blocks 2420 through 2440 for each distribution of ciphertexts.

Figure 25:
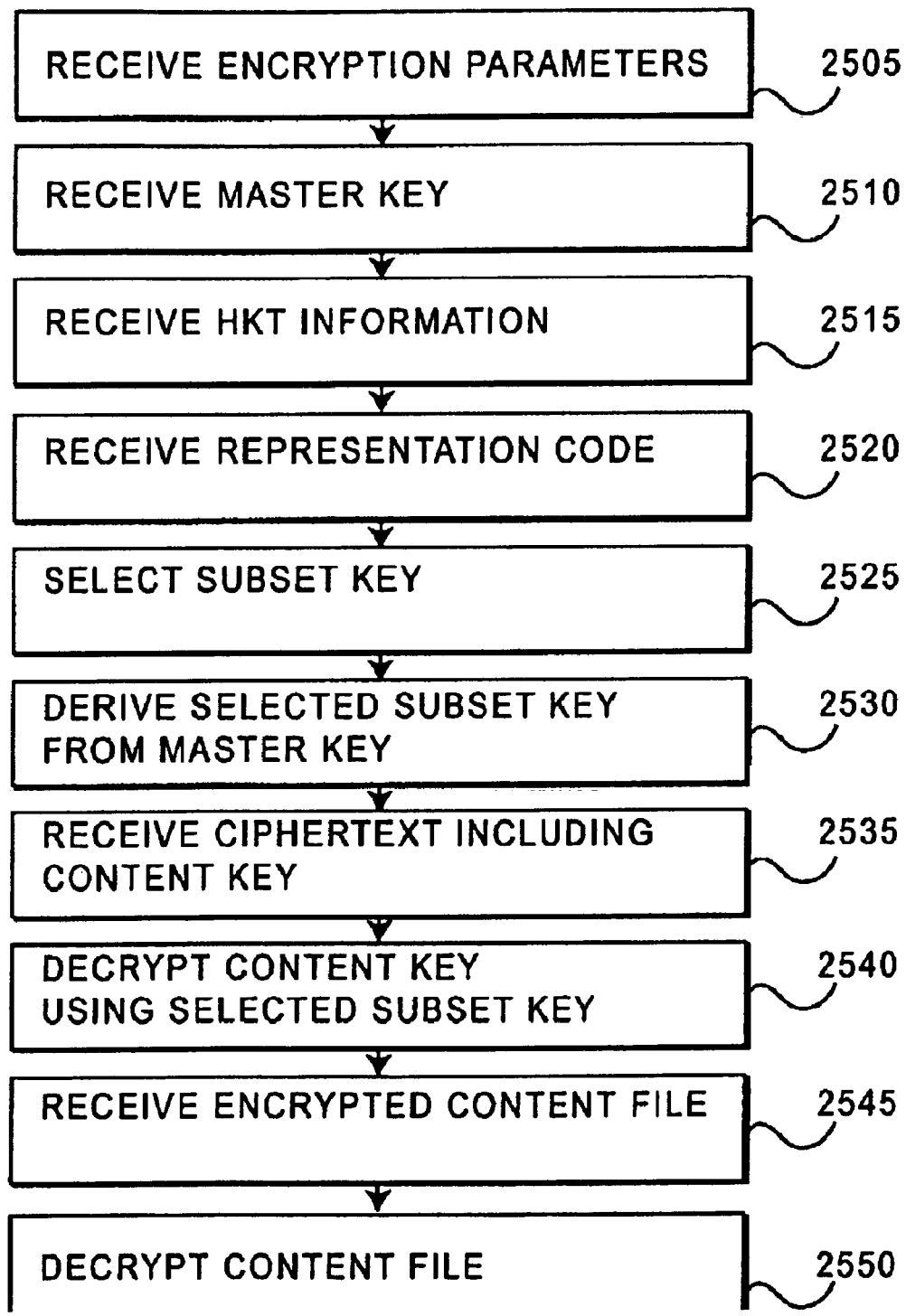
FIG. 25 is a flowchart of broadcast decryption, including decrypting a content key and a content file.

In one implementation, the receiver receives a content key as a ciphertext and also receives an encryted content file matching the content key (recall FIG. 8). FIG. 25 is a flowchart of broadcast decryption, including decrypting a content key and a content file. Operations in FIG. 25 similar to those described above referring to FIG. 24 are performed similarly, with variations noted below. A receiver receives encryption parameters from a trusted center, block 2505. The receiver receives a master key from the trusted center, block 2510. The receiver also receives information about an HKT defined by the trusted center from the trusted center, block 2515. The receiver receives a representation code from the trusted center, block 2520. The receiver uses the representation code to select a subset key to use for decryption, block 2525. After selecting a subset key, the receiver derives the selected subset key from the receiver's master key, block 2530.

The receiver receives one or more key ciphertexts from the trusted center through the broadcast channel of the broadcast encryption system, block 2535. Each received key ciphertext includes the same content key but is encrypted using a different subset key. The receiver decrypts the received key ciphertext(s) using the derived subset key, block 2540. The derived subset key is only valid to decrypt one of the key ciphertexts. The decrypted key ciphertext provides the receiver with the content key (e.g., as cleartext).

The receiver receives an encrypted content file from the trusted center, block 2545. The content file has been encrypted using the content key. The receiver differentiates between the key ciphertexts and the encrypted content file such as by using header information or file size. The receiver decrypts the encrypted content file using the content key, block 2550. The receiver can then access the content file. For example, where the content file is a video file, the receiver can play the contents (recall the receivers 300 and 600 in FIGS. 3 and 6, respectively). In one implementation, the receiver performs blocks 2505 through 2515 once (or until the system changes, such as when the number of receivers changes), and then repeats blocks 2520 through 2550 for each distribution of ciphertexts.

In one implementation, a receiver stores the prime numbers $p_{k,b_1b_2...b_i...b_a}$ received from the trusted center as encryption parameters. In another implementation, a receiver does not store the prime numbers $p_{k,b_1b_2...b_i...b_a}$ but instead generates the prime numbers as needed. In this case, each receiver stores a value L, where L is selected so that an interval $((k-1)L, kL]$ contains at least $2^a-1$ primes. In one implementation, L is selected as: $L > (2^a-1) \ln(2^a N \log 2^a N)$. The receiver searches for the $x^{th}$ smallest primer number larger than $(k-1)L$ using a primary testing algorithm, such as the Miller-Rabin algorithm, where x is the decimal value, of the binary representation indicated by the values of the subset $S_{k,b_1b_2...b_i...b_a}$ for the prime $p_{k,b_1b_2...b_i...b_a}$. For example, a receiver uses the $7^{th}$ smallest odd prime for the prime $p_{1,111}$ ("111" is the binary representation of the decimal value 7).

Hierarchical Key Tree with Subset Keys and Multiple Master Keys for Each Receiver In one implementation of a broadcast encryption system including a trusted center and N receivers, such as the systems 100, 400 shown in FIGS. 1 and 4, the trusted center uses a hierarchical key tree ("HKT") and subset keys and provides multiple master keys to each receiver. This implementation is similar to that described above referring to FIGS. 17 through 25, with variations described below.

A trusted center sets up the broadcast encryption system similarly to the process described above referring to FIGS. 17 through 19. However, in this implementation, the trusted center generates multiple master keys for each receiver. As described below, a receiver can use each received master key to derive subset keys assigned to a respective node, rather than using one master key to derive the subset keys assigned to the nodes on the path from the node of the receiver to the root as described above. In this implementation, the trusted center provides one master key to a receiver for each node on the path from the node of the receiver to the root (excluding the root itself because subset keys are not assigned to the root).

Figure 26:
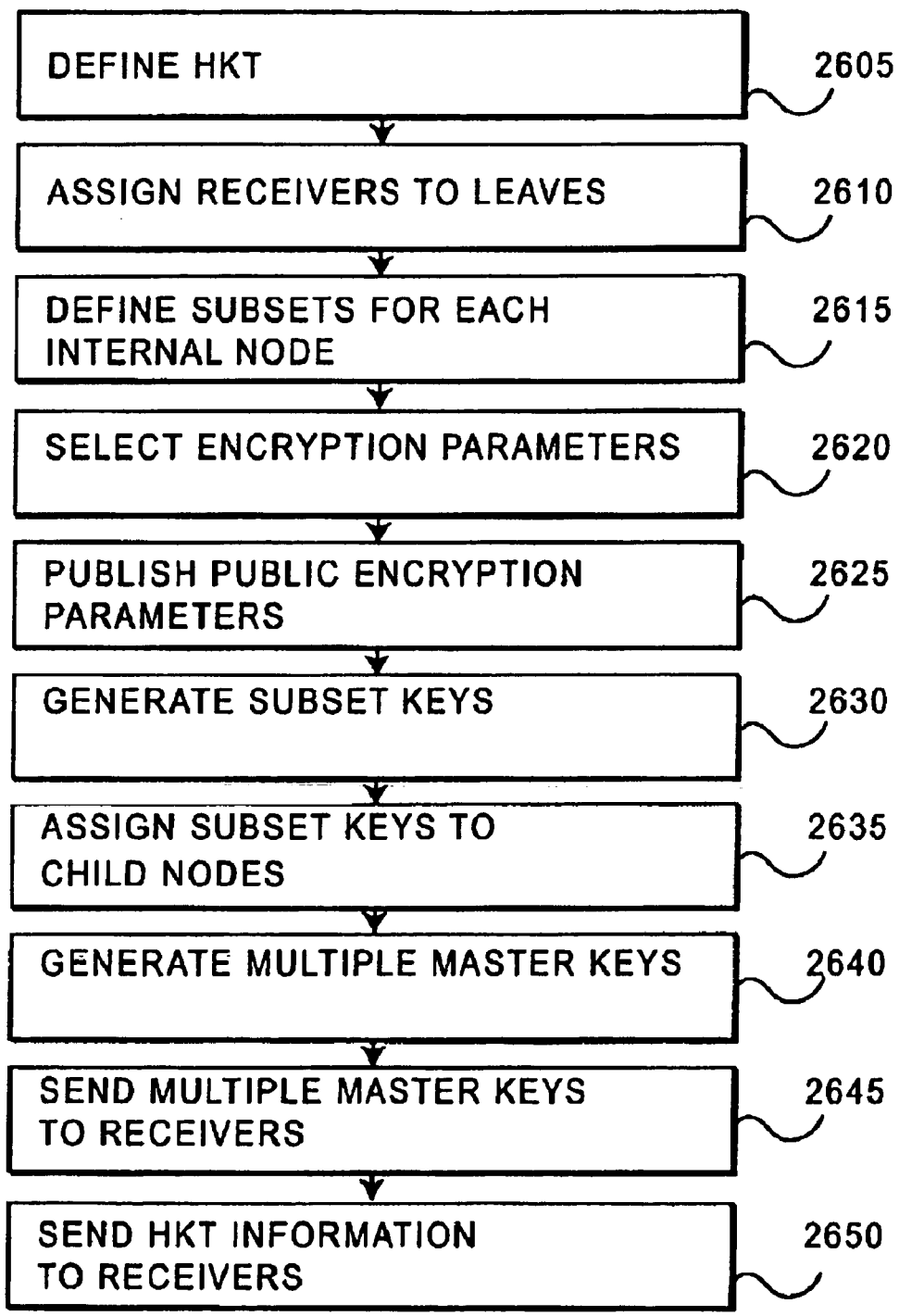
FIG. 26 is a flowchart of setting up the broadcast encryption system using an HKT with subsets and subset keys and assigning master keys to the receivers.
Figure 27:
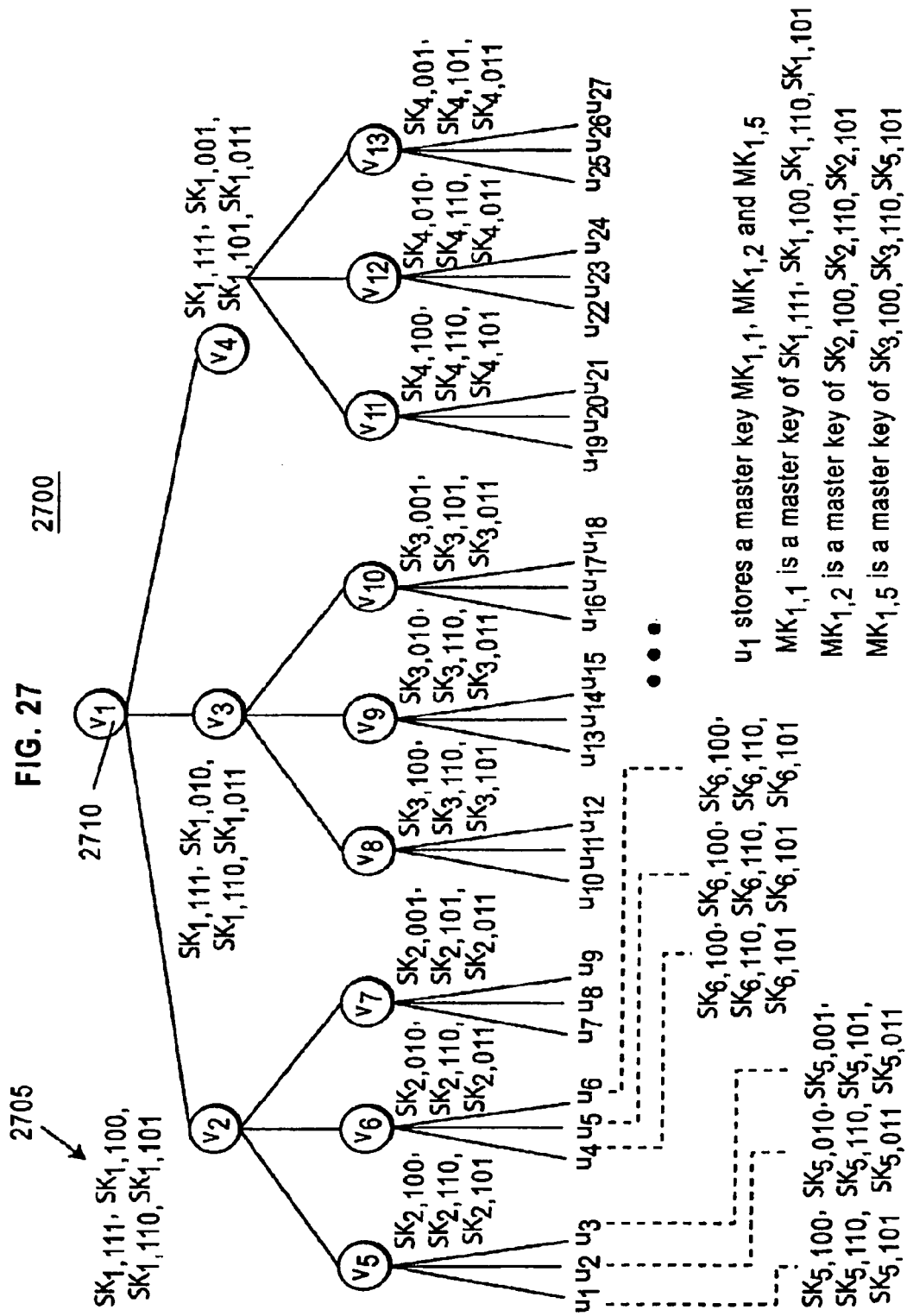
FIG. 27 is a diagram of an HKT showing the assignment of subset keys to nodes.

FIG. 26 is a flowchart of setting up the broadcast encryption system using an HKT with subsets and subset keys and assigning master keys to the receivers (recall blocks 705 and 710 in FIG. 7). FIG. 27 is a diagram of an HKT 2700 showing the assignment of subset keys 2705 to nodes 2710, where the HKT 2700 is a tree of order 3 for a group of 27 receivers. Subsets are assigned to the HKT 2700 in FIG. 27 in the same was as in the HKT 1800 in FIG. 18. A trusted center sets up the broadcast encryption system similarly to the process described above referring to FIGS. 17 through 19. However, in this implementation, the trusted center generates multiple master keys for each receiver. As described below, a receiver can use each received master key to derive subset keys assigned to a respective node, rather than using one master key to derive the subset keys assigned to the nodes on the path from the node of the receiver to the root as described above. In this implementation, the trusted center provides one master key to a receiver for each node on the path from the node of the receiver to the root (excluding the root itself because subset keys are not assigned to the root).

The trusted center defines an HKT, block 2605. The HKT is a rooted full a-ary tree with N leaves and $$\frac{N-1}{a-1} + N$$

nodes, including the leaves, the root, and internal nodes. An internal node is denoted as $$v_k \left( k = 1, \ldots, \frac{N-1}{a-1} \right),$$

as in FIG. 27. If N is not a power of a, the trusted center defines an HKT with a number of leaves equal to the next power of a above N. The trusted center assigns each receiver to a respective leaf, block 2610. A receiver is denoted as $u_j$ (j=1, ..., N), as in FIG. 27. If N is not a power of a, "virtual" receivers are assumed to correspond to the extra leaves (as virtual entities, the virtual receivers would not need to be later revoked).

The trusted center defines subsets for each internal node of the HKT, block 2615. The trusted center defines $2^a-2$ subsets for each internal node $v_k$. A subset has a values and is denoted as $S_{k,b_1b_2...b_i...b_a}$, where $b_i \in \{0,1\}$, $$\sum_{i=1}^{a} b_i \neq 0 \text{ and } \sum_{i=1}^{a} b_i \neq a.$$

k indicates to which internal node $v_k$ the subset corresponds and $b_1 b_2 \ldots b_i \ldots b_a$ indicates the a values included in the subset. The values of a subset indicate child nodes of the internal node corresponding to the subset and, as described below, are used to indicate which subset keys have been selected for use in encryption. The trusted center also defines a subset $S_{1,11\ldots1}$ for the root (node $v_1$). Subsets are assigned to nodes $v_k$ of the HKT 2700 in FIG. 27 as in the HKT 1800 in FIG. 18. For example, the trusted center has assigned to node $v_2$ subsets $S_{2,100}, S_{2,010}, S_{2,001}, S_{2,110}, S_{2,101},$ and $S_{2,011}$.

The trusted center selects encryption parameters, block 2620. The trusted center uses the encryption parameters to generate values for encryption, such as keys. Some of the encryption parameters are public and the trusted center publishes the public encryption parameters, block 2625. The trusted center publishes the public encryption parameters by sending the public encryption parameters to each of the receivers, for example. The trusted center keeps the remaining secret encryption parameters secret from the receivers. The trusted center selects two large primes $q_1$ and $q_2$ and generates a value M as $M=q_1 q_2$. The trusted center publishes M as a public encryption parameter. The trusted center selects a respective value $K_k$ for each node $v_k$, where $K_k \in Z^*_M$, as a secret encryption parameter. The trusted center also selects $2^a-1$ primes $p_{b_1 b_2 \ldots b_i \ldots b_a}$, where $b_i \in \{0,1\}$, and $$\sum_{i=1}^{a} b_i \neq 0.$$

The trusted center assigns each prime $p_{b_1 b_2 \ldots b_i \ldots b_a}$ to a corresponding subset $S_{k,b_1 b_2 \ldots b_i \ldots b_a}$ for each node $v_k$ (e.g., $p_{100}$ is assigned to $S_{1,100}$, $S_{2,100}$, $S_{3,100}$, and so on). The trusted center publishes the primes $p_{b_1 b_2 \ldots b_i \ldots b_a}$ and assignments. The trusted center generates a value T as a product of all the primes $p_{b_1 b_2 \ldots b_i \ldots b_a}$. The trusted center does not publish T. The trusted center generates a value $w_{j,k}$ for each receiver $u_j$ and each node $v_k$. $w_{j,k}$ is the product of all the primes $p_{b_1 b_2 \ldots b_i \ldots b_a}$ assigned to subsets $S_{k,b_1 b_2 \ldots b_i \ldots b_a}$ that are assigned to an internal node $v_k$ and that correspond to a subset key $SK_{k,b_1 b_2 \ldots b_i \ldots b_a}$ assigned to a child node on the path from the node of the receiver $u_j$ to the root. For example, referring to the HKT 2700 in FIG. 27, $w_{1,5}$ corresponds to receiver $u_1$ and node $v_5$. $w_{1,5}$ is the product of the primes $p_{b_1 b_2 \ldots b_i \ldots b_a}$ assigned to subsets $S_{k,b_1 b_2 \ldots b_i \ldots b_a}$ that are assigned to node $v_5$ and that correspond to subset keys $SK_{k,b_1 b_2 \ldots b_i \ldots b_a}$ that are assigned to the leaf node for receiver $u_1$ (the child node of $v_5$ that is on the path from the leaf node of receiver $u_1$ to the root). Accordingly, $w_{1,5}=p_{100} p_{110} p_{101}$.

The trusted center generates subset keys using the encryption parameters, block 2630. A subset key is denoted as $SK_{k,b_1 b_2 \ldots b_i \ldots b_a}$ as shown in FIG. 27. The trusted center generates a subset key $SK_{k,b_1 b_2 \ldots b_i \ldots b_a}$ for each subset $S_{k,b_1 b_2 \ldots b_i \ldots b_a}$ as:

$$SK_{k,b_1 b_2 \ldots b_i \ldots b_a} = K_k^{T/p_{k,b_1 b_2 \ldots b_i \ldots b_a}} \bmod M$$

The trusted center assigns each subset key $SK_{k,b_1 b_2 \ldots b_i \ldots b_a}$ to a corresponding subset $S_{k,b_1 b_2 \ldots b_i \ldots b_a}$.

The trusted center also assigns each subset key to a child node of an internal node, block 2635. The values of a subset indicate child nodes of the internal node corresponding to the subset. The trusted center assigns a subset key to each child node of the subset's internal node for which the subset has a value of 1. FIG. 27 illustrates the assignment of subset keys to child nodes. For example, the subset $S_{1,111}$ corresponds to the root (node $v_1$) and the subset key $SK_{1,111}$ is assigned to each of the child nodes of the root (nodes $v_2$, $v_3$, $v_4$). Subset key $SK_{1,001}$ is assigned only to the right child node of the root (node $v_4$). Accordingly, the trusted center assigns $2^{a-1}-1$ subset keys to each child node (and also assigns $SK_{1,11 \ldots 1}$ to each of the child nodes of the root).

The trusted center generates: multiple master keys using the encryption parameters, block 2640. A master key is denoted as $MK_{j,k}$, as shown in FIG. 27. The trusted center generates multiple master keys $MK_{j,k}$ for each receiver $u_j$, generating for a receiver $u_j$ one master key $MK_{j,k}$ for each node $v_k$ on the path from the receiver's node to the root. Accordingly, a master key $MK_{j,k}$ corresponds to a receiver $u_j$ and to an internal node $v_k$. The trusted center generates a master key $MK_{j,k}$ as:

$$MK_{j,k} = K_k^{T/w_{j,k}} \bmod M$$

The trusted center assigns each of the multiple master keys $MK_{j,k}$ to a corresponding receiver $u_j$. A master key $MK_{j,k}$ can be used to derive any of the subset keys $SK_{k,b_1 b_2 \ldots b_i \ldots b_a}$ that corresponds to a subset $S_{k,b_1 b_2 \ldots b_i \ldots b_a}$ assigned to the internal node $v_k$ and that corresponds to a node on the path from the receiver's node to the root. For example, referring to the HKT 2700 in FIG. 27, $u_1$ is assigned master keys $MK_{1,1}$, $MK_{1,2}$, and $MK_{1,5}$. Receiver $u_1$ can use master key $MK_{1,1}$ to derive subset keys $SK_{1,100}$, $SK_{1,110}$, $SK_{1,101}$, and $SK_{1,111}$, use master key $MK_{1,2}$ to derive subset keys $SK_{2,100}$, $SK_{2,110}$, and $SK_{2,101}$, and master key $MK_{1,5}$ to derive subset keys $SK_{5,100}$, $SK_{5,110}$, $SK_{5,101}$. Each receiver $u_j$ ahas a master key $MK_{j,1}$ that can derive the subset key $SK_{1,11 \ldots 1}$ for when none of the receivers $u_j$ have been revoked. The trusted center sends the multiple master keys $MK_{j,k}$ to corresponding receivers $u_j$, block 2645. The trusted center also sends information about the HKT to each receiver, block 2650.

The trusted center revokes receivers and generates a representation code as described above referring to FIGS. 20 through 23. Receivers decrypt ciphertexts from the trusted center as described above referring to FIGS. 24 and 25, but to derive a selected subset key, a receiver $u_j$ selects a master key $MK_{j,k}$ corresponding to the selected subset key $SK_{k,b_1 b_2 \ldots b_i \ldots b_a}$ and derives the selected subset key $SK_{k,b_1 b_2 \ldots b_i \ldots b_a}$ as:

$$SK_{k,b_1 b_2 \ldots b_i \ldots b_a} = MK_{j,k}^{w_{j,k}/p_{k,b_1 b_2 \ldots b_i \ldots b_a}} \bmod M$$

In one implementation, a receiver stores the prime numbers $p_{b_1 b_2 \ldots b_i \ldots b_a}$ received from the trusted center as encryption parameters. In another implementation, a receiver does not store the prime numbers $p_{b_1 b_2 \ldots b_i \ldots b_a}$ but instead generates the prime numbers as needed as the smallest $2^a-1$ prime numbers. In another implementation, a receiver uses the $d^{th}$ smallest odd prime number for a prime $p_{b_1 b_2 \ldots b_i \ldots b_a}$, where d is the decimal value of the binary representation indicated by the values of the subset $S_{k,b_1 b_2 \ldots b_i \ldots b_a}$. For example, a receiver uses the $7^{th}$ smallest odd prime for the prime $p_{111}$ ("111" is the binary representation of the decimal value 7). In this case, each receiver stores a table of one-bit values having A/2 entries, where A is large enough to include $2^a-1$ primes. The $x^{th}$ entry corresponds to the $x^{th}$ odd number from 0, and the bit-value of an entry indicates whether the odd number corresponding to the entry is a prime number.

Media Key Blocks and Data Media

In one implementation of a broadcast encryption system including a trusted center and N receivers, such as the system 400 shown in FIG. 4, the trusted center uses a media key block ("MKB") and master keys. In this implementation, block keys are the sub keys described above, the representation code is the MKB, and the broadcast channel is data media distribution. Applying the process of FIGS. 7 and 9 to this implementation is described below. This implementation is based on CPRM/CPPM (Content Protection for Removable/Recordable/Pre-recorded Media) modified to take advantage of master keys as described below (CPRM/CPPM is discussed in "Revocation and Tracing Schemes for Stateless Receivers" by D. Naor et al., referenced above).

Figure 28:
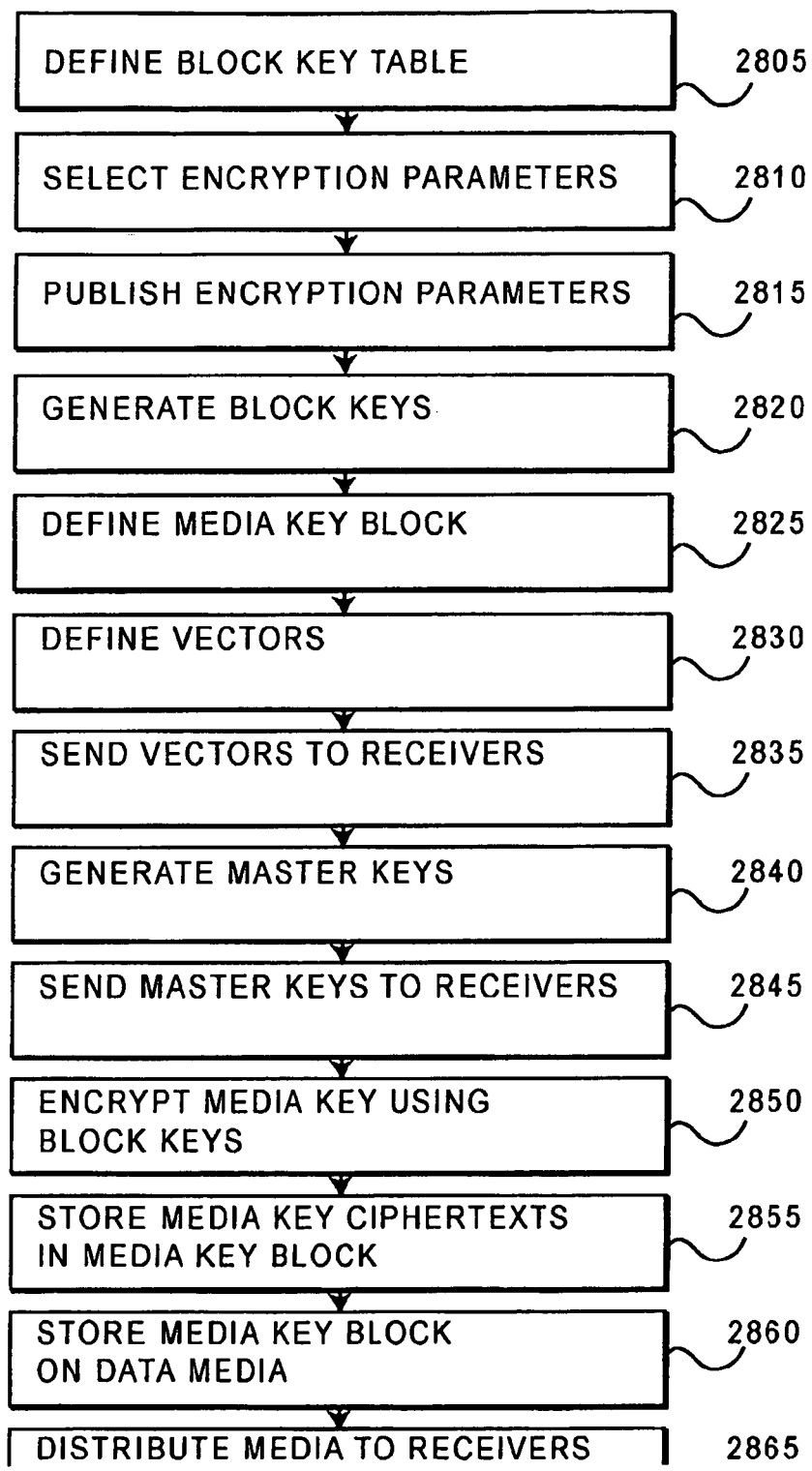
FIG. 28 is a flowchart of setting up the broadcast encryption system using an MKB and assigning master keys to the receivers.
Figure 30:
FIG. 30 is a diagram of a media key block.

FIG. 28 is a flowchart of setting up the broadcast encryption system using an MKB and assigning master keys to the receivers (recall blocks 705 and 710 in FIG. 7). FIG. 29 is a diagram of a block key table ("BKT") 2900. FIG. 30 is a diagram of an MKB (media key block) 3000. The BKT 2900 and MKB 3000 are described below.

The trusted center defines a BKT (block key table), block 2805. The BKT is a two-dimensional table of entries 2905 having A rows and B columns. Each entry (a,b) is for storing a block key denoted $K_{a,b}$ (a=1, ..., A; b=1, ..., B), as shown in the BKT 2900 in FIG. 29. Generating block keys is described below.

The trusted center selects encryption parameters, block 2810. The trusted center uses the encryption parameters to generate values for encryption, such as keys. Some of the encryption parameters are public and the trusted center publishes the public encryption parameters, block 2815. The trusted center publishes the public encryption parameters by providing the public encryption parameters to the manufacturer(s) of the receivers, for example, which in turn provide the public encryption parameters to the receivers (e.g., during manufacturing). The trusted center keeps the remaining secret encryption parameters secret from the receivers. The trusted center selects two large primes $q_1$ and $q_2$ and generates a value M as $M=q_1q_2$. The trusted center publishes M as a public encryption parameter. The trusted center randomly selects a value K, where $K \in Z^*_M$, as a secret encryption parameter. The trusted center also selects AB primes $p_{a,b}$ as public encryption parameters. The trusted center assigns each prime $p_a$,b to a respective entry (a,b) in the BKT (e.g., $p_{1,1}$ is assigned to entry (1,1)). The trusted center publishes the assignment of primes to entries. The trusted center generates a value T as $T=\Pi_{a,b}p_{a,b}$. The trusted center does not publish T.

The trusted center generates a block key for each entry in the BKT, block 2820. A block key is denoted as $K_{a,b}$, as shown in the BKT 2900 in FIG. 29. The trusted center generates a block key $K_{a,b}$ as:

$$K_{a,b}=K^{T/p_{a,b}} \bmod M$$

The trusted center stores a block key $K_{a,b}$ in the corresponding entry (a,b) of the BKT, as shown in the BKT 2900 in FIG. 29. For example, block key $K_{1,1}$ is stored in entry (1,1).

The trusted center defines a media key block ("MKB"), block 2825. The MKB is a two-dimensional table based on the BKT, and so has A rows and B columns with an entry 3005 for each entry 2905 in the BKT. FIG. 30 shows an MKB 3000 based on the BKT 2900 shown in FIG. 29. Initially, the MKB is empty. Each entry (a,b) in the MKB is for storing an encrypted media key, encrypted using the block key $K_{a,b}$ stored in the corresponding entry (a,b) in the BKT, as described below. Entries 3005 that are crossed out indicate entries corresponding to revoked receivers, as described below referring to FIG. 31.

The trusted center defines a vector $V_j$ for each receiver $u_j$, block 2830. A vector is denoted as $V_j$ and includes B elements $v_b; V_j=(v_1,...,v_b,...,v_{Ba})$, where $v_b \in \{1,...,A\}$. Each element $v_b$ of a vector $V_j$ indicates an entry (a,b) in the MKB. The ordinal position of the element in the vector indicates the column (i.e., b) and the value of the element indicates the row (i.e., a). For example, where the value of the first element $v_1$ is 2, the first element $v_1$ indicates the media key ciphertext in row 2, column 1 of the MKB (i.e., entry (2,1)). Accordingly, a vector $V_j$ of receiver $u_j$ indicates B media key ciphertexts for the receiver $u_j$. The trusted center provides the vectors $V_j$ to the respective receivers $u_j$, block 2835.

The trusted center also generates a value $w_j$ for each receiver $u_j$. $w_j$ is the product of the primes $p_{a,b}$ corresponding to entries indicated by the vector $V_j$ of the receiver $u_j$. The trusted center generates $w_j$ as $$w_j = \prod_{b=1}^{B} p_{v_b,b},$$

where $v_b$ indicates the value of the $b^{th}$ element of the vector $V_j$. The trusted center provides each value $w_j$ to the corresponding receiver $u_j$ with the vector $V_j$ or at some other time before the receiver begins decrypting, such as with the public encryption parameters (recall block 2815 above) or with the master key (see block 2845 below). Alternatively, the receiver derives $w_j$ from the primes $p_{a,b}$.

The trusted center generates master keys using the encryption parameters, block 2840. A master key is denoted as $MK_j$. The trusted center generates a master key $MK_j$ for each receiver $u_j$ as:

$$MK_j=K^{T/w_j} \bmod M$$

The trusted center assigns each master key $MK_j$ to a corresponding receiver $u_j$. A master key $MK_j$ can be used to derive any of the block keys $K_{a,b}$ corresponding to media key ciphertexts indicated by the receiver's $u_j$ vector $V_j$. For example, referring to the BKT 2900 in FIG. 29 and the MKB 3000 in FIG. 30, $u_1$ is assigned master key $MK_1$ and, where vector $V_j$ includes elements $\{1,1,...,1\}$, can use $MK_1$ to derive block keys $K_{1,1}, K_{1,2}, ..., K_{1,B}$. The trusted center sends each master key $MK_j$ to a corresponding receiver $u_j$, block 2845.

The trusted center encrypts a media key using each of the block keys stored in the BKT, block 2850. The media key is a key for encrypting and decrypting a content file stored on an article of data media (e.g., video data stored on a DVD). Each encryption of the media key generates a respective media key ciphertext. The trusted center stores the media key ciphertexts in entries in the MKB corresponding to the block key used to encrypt each media key ciphertext, block 2855. For example, the trusted center encrypts the media key using block key $K_{1,1}$ and stores the resulting media key ciphertext in entry (1,1) of the MKB. The MKB 3000 in FIG. 30 shows the media key ciphertexts 3005 for each entry as $E(K_{a,b},MK)$, indicating the encryption (E) of the media key (MK) using block key $K_{a,b}$. In an alternative implementation, the trusted center encrypts data other than a media key using the block keys. The trusted center stores the MKB on each article of data media, block 2860.

The trusted center sends the data media to the receivers, block 2865. As described above, the data media stores the MKB. Each receiver has also received the public encryption parameters, a vector, a value for deriving block keys ($w_j$), and a master key, such as from the receiver's manufacturer. In one implementation, the trusted center also encrypts a content file (e.g., video or audio content) using the media key and stores the encrypted content file on the data media as well. In one implementation, the trusted center performs blocks 2805 through 2845 once (or until the system changes, such as when the number of receivers changes), and then repeats, blocks 2850 through 2865 for each distribution of media.

Figure 31:
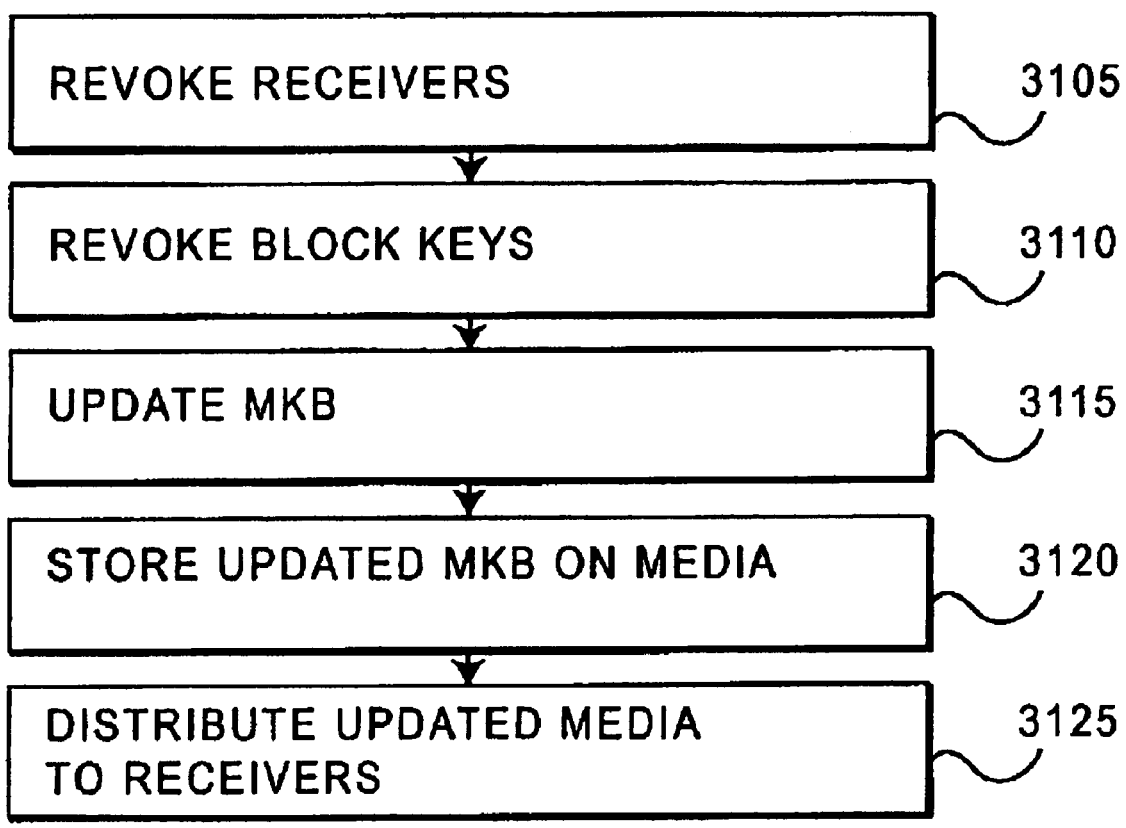
FIG. 31 is a flowchart of revoking receivers and updating the MKB.

FIG. 31 is a flowchart of revoking receivers and updating the MKB (recall block 715 through block 735 in FIG. 7). The trusted center revokes one or more receivers, block 3105. The trusted center revokes or invalidates a receiver when that receiver is no longer to be authorized to decrypt the ciphertexts being sent from the trusted center. As noted above, in some circumstances, the trusted center does not revoke any receivers. In this case, all of the block keys remain valid.

The trusted center revokes the block keys that can be derived from master keys assigned to revoked receivers, block 3110. As described above, the vector assigned to a receiver and corresponding to a master key indicate which block keys can be derived by the master key. Accordingly, when the trusted center revokes a receiver, the trusted center revokes the block keys indicated by the receiver's vector.

The trusted center updates the MKB by invalidating the media key ciphertexts corresponding to revoked block keys, block 3115. In one implementation, the trusted center invalidates a media key ciphertext by replacing the media key ciphertext with a predetermined value that cannot be decrypted to provide the media key using the encryption algorithm by which the media key ciphertext was encrypted. In another implementation, the trusted center deletes the media key ciphertext and stores blank or random data in the entry in the MKB. In FIG. 30, entries in the MKB 3000 corresponding to invalidated media key ciphertexts are indicated by having an "X" through the entry.

The trusted center stores the updated MKB on each new article of data media, block 3120. The trusted center controls the MKB on new data media and so controls which receivers can decrypt the media keys on new data media. The trusted center sends the new data media to the receivers, block 3125.

Figure 32:
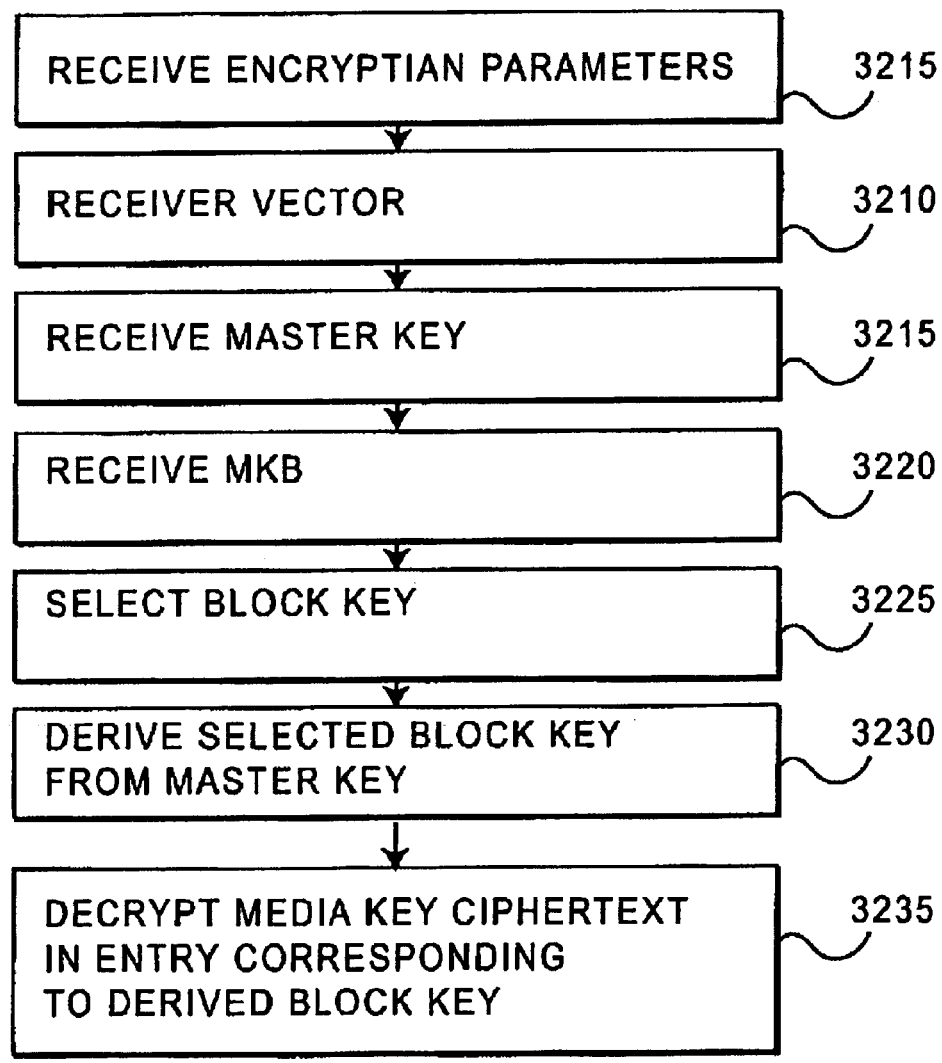
FIG. 32 is a flowchart of broadcast decryption by a receiver using an MKB.

FIG. 32 is a flowchart of broadcast decryption by a receiver using an MKB (recall FIG. 9). In one implementation, a receiver receives data and ciphertexts on data media prepared by a trusted center for distribution, as in the broadcast encryption system 400 shown in FIG. 4. A receiver receives encryption parameters from a trusted center, block 1505. As described above, a trusted center publishes to the receivers public encryption parameters for the receivers to use in decrypting ciphertexts from the trusted center, such as the selected primes $p_{a,b}$. In one implementation, the receiver stores the public encryption parameters in non-secure storage (e.g., main storage 225 in FIG. 2). The receiver also receives a vector, denoted as vector $v_j$ for receiver $u_j$, block 3210, and receives a master key, denoted as $MK_j$ for receiver $u_j$, block 3215. As described above, the trusted center generates a vector and a master key for the receiver and sends the vector and master key to the receiver. The receiver uses the master key to derive block keys for decryption. In an alternative implementation, the trusted center sends some or all of the encryption parameters, the vector, and the master key together to the receiver through the manufacturer of the receiver.

The receiver receives an MKB (media key block) from the trusted center, block 3220. As described above referring to FIG. 28, the trusted center defines an MKB (recall FIG. 30) and stores the MKB on data media to distribute to receivers.

The receiver uses the vector and MKB to select a block key for decryption, block 3225. As described above, the vector indicates a number of media key ciphertexts and so indicates the corresponding block keys. The receivers selects one of the block keys indicated by an element of the vector. Accordingly, the receiver derives the block key corresponding to entry $(v_b, b)$ in the vector, where $v_b$ is the value of the $b^{th}$ element of the vector $V_j$. This block key is denoted as $K_{v_b,b}$. For example, referring to FIGS. 29 and 30, where the first element $v_1$ of the vector has a value of 2, this element indicates the media key ciphertext in entry (2,1). Block key $K_{2,1}$ corresponds to entry (2,1) and so the receiver selects block key $K_{2,1}$.

The receiver derives the selected block key from the receiver's master key, block 3230. As described above, a master key for a receiver $u_j$ is denoted as $MK_j$, and the receiver has selected the block key corresponding to entry $(v_b, b)$, denoted as $K_{v_b,b}$. The receiver $u_j$ has received encryption parameters including prime numbers $p_{a,b}$ and the value $w_j$. The receiver derives a block key $K_{a,b}$ as:

$$K_{v_b,b} = MK_j^{w_j/p_{v_b,b}} \mod M$$

In one implementation, the receiver pre-computes $w_j/p_{v_b,b}$ for each element in the receiver's vector. In one implementation the receiver computes $w_j/p_{v_b,b}$ by multiplying B-1 primes $p_{v_c,c}$ where $c \neq b$.

The receiver decrypts the media key ciphertext in the MKB corresponding to the derived block key, block 3235. In one implementation, the receiver recognizes whether the decrypted result is correct for the selected ciphertext, such as by using checksum values. If the decrypted result is not correct, the receiver selects a different block key using a different element in the receiver's vector. If none of the block keys indicated by the receiver's vector provide a correct decrypted result, the receiver determines that the receiver has been revoked. In one implementation, the receiver confirms that the receiver has been revoked by contacting the trusted center (e.g., through a network connection).

In one implementation, the data media received by the receiver also includes an encrypted content file matching the decrypted media key. In this case, the receiver uses the decrypted media key to decrypt the encrypted content file and access the content.

In another implementation, the data media is for recording and the receiver uses the decrypted media key to record data to the data media. If the receiver does not have a valid derived block key and so has not successfully decrypted the media key from the MKB, the receiver does not record data to the data media.

Manufacturing Data Media

As described above referring to FIGS. 4 through 6, when the broadcast channel is data media distribution, the trusted center provides data (e.g., ciphertexts) to a receiver stored on data media. The trusted center first provides the data to a data media manufacturing device (e.g., at the media manufacturer 410 shown in FIG. 4) to store the data to the data media. For pre-recorded media (e.g., CD-ROM or DVD-ROM), the trusted center provides key ciphertexts and encrypted content to the manufacturing device. For recordable media (e.g., CD-RW or DVD-RW), the trusted center provides key ciphertexts and the receiver will provide the encrypted content.

Figure 33:
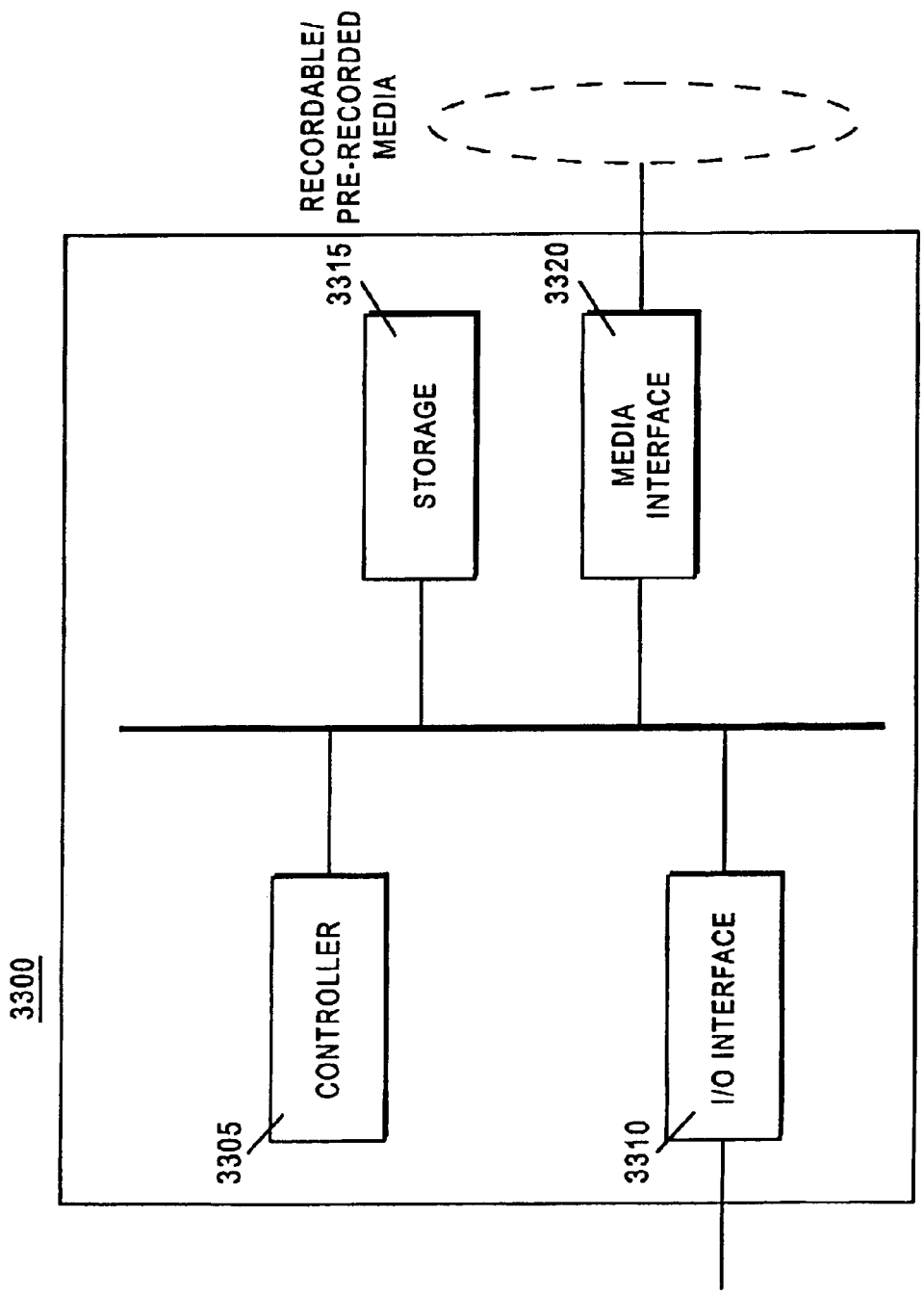
FIG. 33 is a block diagram of one implementation of a data media manufacturing device.

FIG. 33 is a block diagram of one implementation of a data media manufacturing device 3300. In one implementation, the manufacturing device 3300 manufactures pre-recorded data media and in another implementation the manufacturing device 3300 manufactures recordable data media. The manufacturing device 3300 does not manufacture the media itself (though an alternative implementation can), but instead prepares the data media for distribution by recording data to the data media. The manufacturing device 3300 includes a controller 3305, an I/O interface 3310, storage 3315, and a media interface 3320. In another implementation, the manufacturing device 3300 also includes secure storage to store data to be kept secret. The controller 3305 controls the operation of the manufacturing device 3300. In one implementation, the controller 3305 is a CPU. The I/O interface 3310 receives and sends data for the manufacturing device 3300 (e.g., to and from the trusted center). The storage 3315 stores data to support the operation of the manufacturing device 3300. In one implementation, the storage 3315 is a memory device, such as RAM. The media interface 3320 provides media reading and writing functionality for the manufacturing device 3300, so that the manufacturing device 3300 can, as appropriate, write data to and read data from an article of media.

Figure 34:
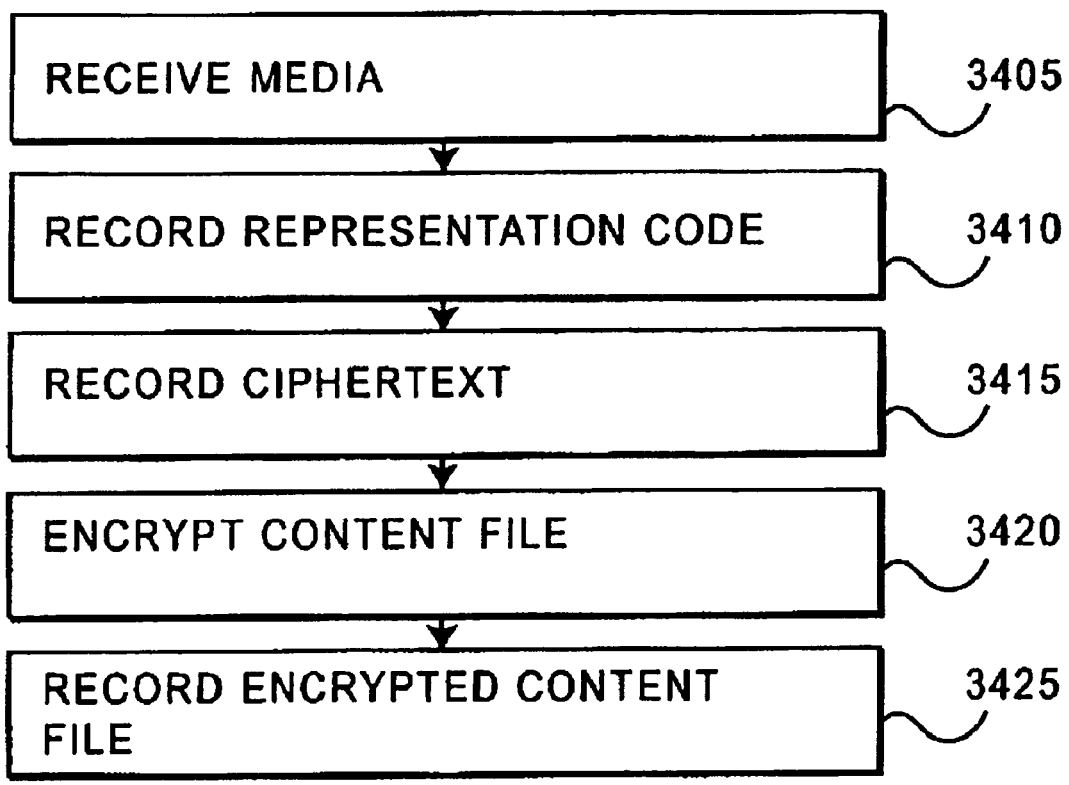
FIG. 34 is a flowchart of manufacturing pre-recorded data media in a manufacturing device.

FIG. 34 is a flowchart of manufacturing pre-recorded data media in a manufacturing device, such as the manufacturing device 3300 shown in FIG. 33. The manufacturing device receives a blank article of data media, block 3405. In an alternative implementation, the manufacturing device receives an article of data media with some data already stored or partially or completely manufactures the article of data media itself from component materials. The manufacturing device records the representation code on the data media, block 3410. As described above, the representation code indicates which receivers have been revoked, such as the representation tree and code or the vector and media key block. The manufacturing device records one or more ciphertexts on the data media, block 3415. The ciphertexts are encrypted content keys. Each ciphertext includes the same content key but is encrypted using a respective sub key, such as the node keys, subset keys, or block keys described above. The manufacturing device encrypts a content file using the content key, block 3420. In an alternative implementation, the manufacturing device receives an encrypted content file from an external source, such as the trusted center. The manufacturing device records the encrypted content file on the data media, block 3425. As described above a receiver uses the representation code to select a sub key and derives the selected sub key from a master key stored at the receiver. The receiver decrypts a ciphertext to obtain the content key and can then decrypt the encrypted file.

In an implementation where the manufacturing device produces recordable data media, the manufacturing device does not always encrypt and store a content file on the recordable data media.

The various implementations of the invention are realized in electronic hardware, computer software, or combinations of these technologies. Most implementations include one or more computer programs executed by a programmable computer. For example, referring to FIG. 1, in one implementation, the trusted center 105 and each of the receivers $120_{1...N}$ include one or more programmable computers implementing the respective aspects of the system described above. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, the illustrative implementations above focus on broadcast channels of satellite broadcast or data media distribution, however, various broadcast channels can be used, such as CATV, the Internet, or other wired or wireless networks. Accordingly, the present invention is not limited to only those implementations described above.

What is claimed is:

1. An encryption apparatus for a broadcast encryption system, comprising:
   a storage unit configured to store a master key for encryption,
   an acquiring unit configured to acquire revoked decryption apparatus information indicating revoked decryption apparatus and relation information indicating a relation between a respective sub key and a respective decryption apparatus;
   a deriving unit configured to derive a sub key based on said revoked decryption apparatus information, said relation information and said master key, and
   an encryption unit configured to encrypt information with said sub key; wherein said revoked decryption apparatus information and said relation information correspond to the revoked decryption apparatus information and the relation information acquired by said respective decryption apparatus.

2. An encryption apparatus according to claim 1, wherein said deriving unit derives a sub key which cannot be derived by said revoked decryption apparatus.

3. An encryption apparatus according to claim 2, wherein said relation information is based on Discrete Logarithm Problem.

4. An encryption apparatus for a broadcast encryption system, comprising:
   storage means for storing a master key for encryption,
   acquiring means for acquiring revoked decryption apparatus information indicating revoked decryption apparatus and relation information indicating a relation between a respective sub key and a respective decryption apparatus;
   deriving means for deriving a sub key based on said revoked decryption apparatus information, said relation information and said master key, and
   encryption means for encrypting information with said sub key wherein said revoked decryption apparatus information and said relation information correspond to the revoked decryption apparatus information and the relation information acquired by said respective decryption apparatus.

5. An encryption method for a broadcast encryption system, comprising the steps of:
   storing a master key for encryption,
   acquiring revoked decryption apparatus information indicating revoked decryption apparatus and relation information indicating a relation between a respective sub key and a respective decryption apparatus;
   deriving a sub key based on said revoked decryption apparatus information, said relation information and said master key, and
   encrypting information with said sub key; wherein said revoked decryption apparatus information and said relation information correspond to the acquired revoked decryption apparatus information and relation information.

6. An encryption method according to claim 5, wherein said derived sub key cannot be derived by said revoked decryption apparatus.

7. An encryption method according to claim 6, wherein said relation information is based on Discrete Logarithm Problem.

8. A decryption apparatus for a broadcast decryption system, comprising:

- an acquiring unit configured to acquire encrypted information, a master key, revoked decryption apparatus information indicating revoked decryption apparatus, and relation information indicating a relation between a respective sub key and a respective decryption apparatus,
- a deriving unit configured to derive a sub key based on said revoked decryption apparatus information, said relation information and said master key, and
- a decryption unit configured to decrypt said encrypted information with said sub key: wherein said revoked decryption apparatus information and said relation information correspond to the revoked decryption apparatus information and the relation information acquired by encryption apparatus.

9. A decryption apparatus according to claim 8, wherein said deriving unit derives a sub key which cannot be derived by said revoked decryption apparatus.

10. A decryption apparatus according to claim 9, wherein said relation information is based on Discrete Logarithm Problem.

11. A decryption apparatus for a broadcast decryption system, comprising:

- acquiring means for acquiring encrypted information, a master key, revoked decryption apparatus information indicating revoked decryption apparatus, and relation information indicating a relation between a respective sub key and a respective decryption apparatus,
- deriving means for deriving a sub key based on said revoked decryption apparatus information, said relation information and said master key, and
- decrypting means for decrypting said encrypted information with said sub key; wherein said revoked decryption apparatus information and said relation information correspond to the revoked decryption apparatus information and the relation information acquired by encryption apparatus.

12. A decryption method for a broadcast decryption system, comprising the steps of:

- acquiring encrypted information, a master key, revoked decryption apparatus information indicating revoked decryption apparatus, and relation information indicating a relation between a respective sub key and a respective decryption apparatus,
- deriving a sub key based on said revoked decryption apparatus information, said relation information and said master key, and
- decrypting said encrypted information with said sub key; wherein said revoked decryption apparatus information and said relation information correspond to the revoked decryption apparatus information and the relation information acquired by encryption apparatus.

13. A decryption method according to claim 12, wherein said deriving step derives a sub key which cannot be derived by said revoked decryption apparatus.

14. A decryption method according to claim 13, wherein said relation information is based on Discrete Logarithm Problem.

* * * * *